US012277615B2

(12) United States Patent
Rose et al.

(10) Patent No.: US 12,277,615 B2
(45) Date of Patent: Apr. 15, 2025

(54) DETECTING AND VALIDATING IMPROPER RESIDENCY STATUS THROUGH DATA MINING, NATURAL LANGUAGE PROCESSING, AND MACHINE LEARNING

(71) Applicant: Deckard Technologies, Inc., La Jolla, CA (US)

(72) Inventors: Gregory Rose, San Diego, CA (US); Jessica Flanagan, Sydney (AU); Anthony Moriarty, Sydney (AU)

(73) Assignee: Deckard Technologies, Inc., La Jolla, CA (US)

( * ) Notice: Subject to any disclaimer, the term of this patent is extended or adjusted under 35 U.S.C. 154(b) by 404 days.

(21) Appl. No.: 16/396,584

(22) Filed: Apr. 26, 2019

(65) Prior Publication Data

US 2019/0333173 A1 Oct. 31, 2019

Related U.S. Application Data

(60) Provisional application No. 62/748,991, filed on Oct. 22, 2018, provisional application No. 62/718,751, (Continued)

(51) Int. Cl.
*G06Q 50/16* (2024.01)
*G06F 16/2458* (2019.01)
(Continued)

(52) U.S. Cl.
CPC ......... *G06Q 50/16* (2013.01); *G06F 16/2465* (2019.01); *G06F 16/29* (2019.01);
(Continued)

(58) Field of Classification Search
CPC ........ B64C 2201/128; B64C 2201/141; B64C 39/024; G01C 21/00; G05D 1/101;
(Continued)

(56) References Cited

U.S. PATENT DOCUMENTS 5,361,201 A * 11/1994 Jost ........................ G06Q 40/00
705/35
6,766,322 B1 7/2004 Bell
(Continued)

OTHER PUBLICATIONS

Bucks, "Airbnb Agreements with State and Local Tax Agencies", https://www.ahla.com/airbnb-agreements-state-and-local-tax-agencies, pp. 1-55 (Year: 2017).*

(Continued)

*Primary Examiner* — Lynda Jasmin
*Assistant Examiner* — Kimberly L Evans
(74) *Attorney, Agent, or Firm* — LOZA & LOZA, LLP; Kevin L. Soules

(57) ABSTRACT

Described are medias, systems, and computer-implemented methods to detect improper residency status by performing a data mining task to data source to detect one or more improper residency indicia, applying a machine learning algorithm to identify an initial candidate, calculating a probability that the initial candidate has an improper residency status, and validating the detection. Further described are medias, systems, and computer-implemented methods to detect improper occupancy tax status.

26 Claims, 25 Drawing Sheets

Related U.S. Application Data filed on Aug. 14, 2018, provisional application No. 62/695,564, filed on Jul. 9, 2018, provisional application No. 62/671,957, filed on May 15, 2018, provisional application No. 62/664,591, filed on Apr. 30, 2018.

(51) Int. Cl.

| | | |
|---|---|---|
| *G06F 16/29* | (2019.01) | |
| *G06F 40/268* | (2020.01) | |
| *G06F 40/279* | (2020.01) | |
| *G06F 40/30* | (2020.01) | |
| *G06N 5/048* | (2023.01) | |
| *G06N 20/00* | (2019.01) | |
| *G06Q 50/163* | (2024.01) | |
| *G06Q 50/26* | (2024.01) | |
| *H04L 67/10* | (2022.01) | |

(52) U.S. Cl.
CPC .............. *G06F 40/30* (2020.01); *G06N 5/048* (2013.01); *G06N 20/00* (2019.01); *G06Q 50/163* (2013.01); *G06Q 50/26* (2013.01); *G06F 40/268* (2020.01); *G06F 40/279* (2020.01); *G06F 2216/03* (2013.01); *H04L 67/10* (2013.01)

(58) Field of Classification Search
CPC .. G06Q 10/083; G06Q 30/0635; G06Q 10/10; G06Q 30/018; G06Q 99/00; G06Q 40/103; G06Q 40/123; G06Q 50/26; G06Q 40/00; G06Q 40/02; G06Q 10/101; G06Q 20/04; G06Q 20/40; G06Q 20/4016; G06Q 20/403; G06Q 20/4037; G06Q 30/0251; G06Q 30/0269; G06Q 30/0271; G06Q 30/0277; G06Q 30/06; G06Q 30/0609; G06Q 40/08; G06Q 40/12; G06Q 50/01; G06Q 50/16; G06Q 50/163; H04H 20/53; H04L 41/22; H04L 61/6022; H04L 61/6081; H04L 63/083; H04L 43/045; H04L 51/32; H04L 63/104; H04L 67/22; H04L 67/306; H04L 67/10; H04W 4/024; H04W 4/043; H04W 4/30; H04W 4/33; H04W 12/06; H04W 4/80; H04M 11/025; H04M 1/0291; H04M 2250/04; B82Y 10/00; B82Y 25/00; G01R 33/04; G01R 33/093; G11B 2005/3996; G11B 5/3906; G11C 11/16; G11C 11/161; G11C 11/1673; G11C 11/1675; H01L 27/228; H01L 43/08; H01L 43/10; H01L 43/12; A61K 31/00; A61K 31/4985; A61K 31/505; A61K 31/52; G06F 16/23; G06F 16/9024; G06F 16/2465; G06F 40/30; G06F 2216/03; G07F 7/08; G06N 20/00; G06N 5/003; G06N 20/20; G06N 5/022; G06N 20/10; G06N 3/044
USPC ................. 705/1.1, 31, 35, 51, 313; 725/14; 706/12, 46; 707/37
See application file for complete search history.

(56) References Cited

U.S. PATENT DOCUMENTS

| | | |
|---|---|---|
| 7,389,242 B2 | 6/2008 | Frost |
| 7,546,271 B1* | 6/2009 | Chmielewski ..... G06Q 30/0185 705/35 |
| 7,584,167 B1 | 9/2009 | Bell |
| 7,945,530 B2 | 5/2011 | Bell |
| 8,630,974 B2 | 1/2014 | Bell |
| 9,165,071 B2 | 10/2015 | Myslinski |
| 9,199,641 B2 | 12/2015 | Ferguson et al. |
| 9,645,988 B1* | 5/2017 | Warren ................ G06F 40/205 707/737 |
| 9,990,639 B1* | 6/2018 | Kong .................... G06Q 50/16 706/12 |
| 10,169,314 B2 | 1/2019 | Ditomaso et al. |
| 2003/0229592 A1* | 12/2003 | Florance ............... G06Q 50/16 705/51 |
| 2005/0096926 A1 | 5/2005 | Eaton et al. |
| 2008/0167883 A1 | 7/2008 | Thavildar |
| 2009/0182549 A1 | 7/2009 | Anisimovich et al. |
| 2010/0223083 A1 | 9/2010 | Wenzlau et al. |
| 2011/0131052 A1* | 6/2011 | Bucholz ................ G06Q 10/10 705/1.1 |
| 2012/0036053 A1* | 2/2012 | Miller .................. G06Q 40/123 705/31 |
| 2013/0036031 A1 | 2/2013 | Hutchinson |
| 2013/0074110 A1* | 3/2013 | Myslinski ............. G06Q 10/10 725/14 |
| 2013/0275281 A1* | 10/2013 | Jimenez ................ G06Q 50/26 705/31 |
| 2013/0332374 A1* | 12/2013 | Hartnett ................ G06Q 50/16 705/313 |
| 2014/0025548 A1 | 1/2014 | Serio |
| 2014/0058910 A1* | 2/2014 | Abeles ................. G06Q 50/265 705/31 |
| 2014/0164264 A1 | 6/2014 | Guttman et al. |
| 2014/0258032 A1 | 9/2014 | Psota et al. |
| 2015/0066738 A1 | 3/2015 | Tian et al. |
| 2015/0178827 A1* | 6/2015 | Qiu ........................ G06Q 40/02 705/35 |
| 2015/0178866 A1* | 6/2015 | Serio .................... G06Q 50/163 705/314 |
| 2015/0379655 A9* | 12/2015 | Sarver .................. G06Q 40/123 705/31 |
| 2017/0083825 A1* | 3/2017 | Battersby ............... G06N 20/00 706/12 |
| 2017/0236060 A1* | 8/2017 | Ignatyev ............. G06F 16/2365 706/46 |
| 2018/0033102 A1 | 2/2018 | Duault |
| 2018/0081949 A1 | 3/2018 | Ditomaso et al. |
| 2018/0081975 A1 | 3/2018 | Ditomaso et al. |
| 2018/0082221 A1 | 3/2018 | Ditomaso et al. |
| 2018/0101504 A1 | 4/2018 | Ditomaso et al. |
| 2018/0240031 A1* | 8/2018 | Huszar ................... G06F 16/22 706/12 |
| 2019/0066241 A1 | 2/2019 | Budlong |
| 2019/0066248 A1* | 2/2019 | McEachern .......... G06Q 40/123 705/31 |
| 2019/0087394 A1 | 3/2019 | Ditomaso et al. |
| 2019/0130282 A1* | 5/2019 | Quirk ....................... G06N 3/08 706/46 |
| 2019/0155917 A1 | 5/2019 | Zuluaga et al. |
| 2019/0156442 A1 | 5/2019 | Zuluaga et al. |
| 2019/0333175 A1* | 10/2019 | Rose ................... G06F 16/2465 705/313 |

OTHER PUBLICATIONS

Co-pending U.S. Appl. No. 16/396,575, filed Apr. 26, 2019.
Co-pending U.S. Appl. No. 16/396,581, filed Apr. 26, 2019.
PCT/US2019/029473 Invitation to Pay Additional Fees dated Jun. 19, 2019.
PCT/US2019/029473 International Search Report and Written Opinion dated Aug. 26, 2019.
U.S. Appl. No. 16/396,575 Office Action dated Sep. 26, 2019.
U.S. Appl. No. 16/396,581 Office Action dated Aug. 23, 2019.
U.S. Appl. No. 16/396,575 Office Action dated Jan. 16, 2020.
U.S. Appl. No. 16/396,581 Office Action dated Feb. 6, 2020.

* cited by examiner

FIG. 17

DETECTING AND VALIDATING IMPROPER RESIDENCY STATUS THROUGH DATA MINING, NATURAL LANGUAGE PROCESSING, AND MACHINE LEARNING

CROSS-REFERENCE

This application claims the benefit of U.S. Provisional Application No. 62/664,591, filed Apr. 30, 2018, U.S. Provisional Application No. 62/671,957, filed May 15, 2018, U.S. Provisional Application No. 62/695,564, filed Jul. 9, 2018, U.S. Provisional Application No. 62/718,751, filed Aug. 14, 2018, and U.S. Provisional Application No. 62/748,991, filed Oct. 22, 2018, each of which are hereby incorporated by reference in their entirety herein.

BACKGROUND OF THE INVENTION

The real estate improvement and repair expenditure market is tremendous. In 2015 alone, improvement and maintenance expenditure spent on both owner-occupied homes and rental units in the United States reportedly came to $340 billion. The reported total sales of home improvement retailers in 2017 the United States amounted to about $373.6 billion. According to data compiled by Home Improvement Research Institute, the home improvement market product sales are expected to grow at an average 3.9% pace until at least 2020.

Renovations, which generally concern changes to, development of, and/or replacement of an existing structure, are often classified as either historical or active renovations. Historical renovations generally refer to renovations that were finished at some time in the past, either by the current owner or a previous owner. Active renovations typically refer to renovations that are in progress. These active renovations are typically performed by people who buy a property, upgrade it, and resell it quickly (sometimes referred to as "flippers") or by longer term home owners who are upgrading their property either in preparation for selling it or with the intent to keep it for a long time.

SUMMARY OF THE INVENTION

Most modifications to existing buildings require one or more permits issued by the appropriate city or county authority. A majority of such modifications or renovations, however, are conducted without appropriate permits. When officials determine that unpermitted work is performed, a penalty is added to the permitting fee. The penalty can be directly proportional to the scale, cost, or both of the renovation. In case of historical renovations, the authority can further backdate the property tax shortfall that should have been paid had the property been reappraised.

Unpermitted renovations may not meet appropriate codes which have been imposed for safety of the owners, residents, tenants, neighbors, and the general public. Further, unpermitted renovations deny cities and authorities the renovation permit fees and accurate property tax assessments necessary to fund such enforcement and permitting processes. Indeed, in some cases the city has no way to know a property has been upgraded (for property assessment purposes) unless a permit is applied for, whether or not it is subsequently granted. Hence, a need to identify past and present unpermitted renovations, additions, modifications, and properties which may have been under-assessed for property tax purposes is needed. Note that on occasion, renovations are permitted but for whatever reason not reassessed. In some situations, the permit was not correct or there was some breakdown in the reassessment process due to manual error or data inaccuracies. Hence, a technological tool to address incorrectly permitted renovations or incorrectly processed permits (which both lead to a loss in property tax collection) is necessary.

In addition, it is a common occurrence that property owners don't pay their full property tax for a variety of reasons. One of the consequences of not identifying renovations is that homeowners are not paying property tax on the full value of the improvement. Identifying unpermitted renovations can be valuable for this reason. It is also of value to point out a discrepancy in the records, or a failure of process where a renovation was permitted but the property was not reassessed.

In addition, even if a particular property is identified as having been improperly renovated at some time in the past (meaning that the current assessment is likely incorrect and undervalued), there currently is no adequate tool to assist the appropriate authorities to know more precisely when the renovation has taken place. In many circumstances, the appropriate authority would like to appropriately reassess the property to increase the amount of property tax collected in the future. In addition, the authority can charge "escape fees," which are essentially billing for back taxes. Even if the improper assessment was the authority's mistake (e.g., for incorrectly recording the square footage of the property), authorities in some circumstances can charge up to four years of escape fees. However, if the improper assessment was the result of something done by the owners (e.g., when an owner fail to apply for appropriate permits), the authority can charge escape fees, in some cases, for up to eight prior years. Notably, escape fees are generally not a penalty. In some circumstances, the renovation that increased the property value was done only two years before, only two years of escape fees can be charged. Hence, it is advantageous to know when the renovation was done to help assist the authority assess the appropriate amount of escape fees. Furthermore, understanding when the renovation was done can further assist the authority in circumstances when the property has changed owners one or more times, with (or when done fraudulently without) re-assessment being done. In such situations, tools to assist the proper authorities to determine who is liable for the escape fees are needed.

Incomplete reporting, misreporting, or complete failure to report real estate transactions (along with the consequential avoidance of taxes and fees associated with ownership changes for real estate properties such as Proposition 13 in California) can also be an issue. Corporations that buy and flip a property can comprise an S-corporation, a C-corporation, an LLC, a trust, or a Title Holding Trust. In some situations, a Title Holding Trust exists to make tracing the ownership of property more difficult because the beneficiaries of trusts are not normally of public record. Further, some property purchases or sales by the corporation comprise a sale of the shareholding in the company instead of a listed real property. In some circumstances under the law, if the beneficial ownership of a trust or LLC changes by more than 49.9% (that is, less than 50.1% remains in the hands of the original owner(s)), the real property should be re-appraised for the purposes of property tax. Such transactions, even if they occur within multiple steps between multiple entities, can by law trigger a re-appraisal. However, many people fail to report the change in ownership in the required manner, thereby avoiding the re-assessment. In related manners, a transaction can be reported, but the value can be misreported or underreported. In sum, a tool to enable authorities to re-assess the properties appropriately in light of improperly reported real estate transactions to recover lost revenue and increase current and future revenue is needed.

Moreover, incomplete reporting, misreporting, or complete failure to report can also extend to determining residential status or occupancy taxes for properties. For federal tax purposes, people are allowed to have a primary residence and a vacation residence. States have different laws and different income sources based on residency such as vehicle registration fees and state income tax. Mortgage interest deductions depend on properties being used exclusively as residences. In some circumstances, there can be scenarios where a person improperly (whether intentionally or unintentionally) claim a property as a principal residence when it is being rented out or when the person was actually a resident for more than 50% of a tax year in a different state than the property at issue. On a similar vein, a number of places charge lodging or occupancy taxes for their properties. In some circumstances, the owners of these places charging occupancy taxes do not properly registered or remittance the appropriate amount of tax to the appropriate authorities. Hence, a tool to enable authorities to properly assess the properties for purposes of determining residency and occupancy tax is needed.

Governmental entities have a primary interest in detecting renovation events, but other parties might also find the information useful. For example real estate agents and real estate broker firms could be held liable for their part in selling a property with unpermitted renovations. Title insurance companies similarly would like to understand the renovation history of a property. Property insurance companies would like to be informed regularly of any increase in value of an insured property so as to charge an appropriate premium. Lawyers, architects, builders and so on might like to be made aware of potential clients who have to undertake remedial repairs due to unpermitted renovations that are not up to the appropriate code standards. Accordingly, a tool to enable a plurality of parties to detect renovation events is needed.

Public and private data sources can be useful in evaluating whether an unpermitted renovation event--both past and present--has occurred. For instance, data sources that reveal whether a property of interest has been purchased by a corporation with a history of frequent property turnover can indicate that the property currently has one or more unpermitted active renovation events performed by a flipper. The public database of permits can be checked to see if one or more have been issued. The probability of an unpermitted renovation in progress can then be increased by correlating other information about the property or the owner such as social media posts (e.g., Twitter®, Facebook®, Instagram®, Facebook®, Snapchat®), real estate-related listing services (e.g., multiple listing services (MLS), Craigslist®, AirBnB®, Zillow®, Redfin®, Realtor), data from building material suppliers or developers, credit card data, customer information from supply companies (e.g., Home Depot®, Lowes®, ACE®, plumbing supplies, Lumber Liquidators® Customer, Remodel Works®, Amazon®, etc.), tax records, demolition orders, dumpster orders, waste disposal records, portable restroom orders, or visual inspection. These correlations can also be applied to traditional owners. Public and private data sources can also be useful to identify misreported or unreported changes in ownership during real estate transactions. For instance, these data sources used to identify beneficial ownership can include the required disclosure of directors and shareholders of the corporation (which are often involved in flipping properties). In instances where trusts are involved, data sources in connection with the creation of the trust and the related chain can be considered along with rental or MLS data to identify any beneficial owners.

In another instance, any of the aforementioned sources can be combined with other sources (e.g., previously issued permits, lodged plans, registration of owners, lenders on properties, liens on properties, historical real estate listings) to inform whether a property of interest had one or more unpermitted historical renovation events because of changes in the property's square footage area (including current taxable square footage), valuation, bedroom count, or bathroom count. Further, the US Postal Service lists of addresses or any other address normalization service can be used to correlate new addresses with renovations associated with the building of unpermitted "Granny Flats", conversion of houses to multiple apartments, or converting garages to apartments might be detected.

Such techniques, when used in combination with trend machine learning methods are highly capable of accurately determining the probability of an unpermitted renovation event. Examples of such a trend can include, for instance, that a property purchased by a corporation is more likely to exhibit indicia of unpermitted renovations, because such corporations often "flip" and turnover such properties for profit. Such trends can be additionally determined regarding the probability of an unpermitted renovation with respect to other information about the property or the owner. Correlation of these multiple sources of data with machine learned trends can indicate that a property is being, or has been, renovated, graded on a probability range from unlikely, through to highly likely or virtually certain. This information can then be used by the appropriate authority to target their enforcement.

Moreover, in some instances, the authorities who enforce the various regulations have a limited number of inspectors and other sources. Hence, in some instances, it can occur that the ability to find such properties can exceed the ability of the appropriate authorities to undertake inspection or enforcement action. Accordingly, in some instances, it is beneficial to prioritize the list of properties for the authorities to optimize or maximize the efficiency of inspecting or taking enforcement action depending on the kind of renovation. Data mining techniques can be used to identify unpermitted renovations. In many instances, it is easier for the authority to act upon an active renovation than a historical one because the authority can just go to the property to observe the activity as it is going on. It is particularly advantageous to identify those properties while the renovation is still in progress. Further, it can be advantageous to prioritize renovation projects based on the estimated cost of the renovation, since some authorities charge higher fees and penalties based on the value of the renovation.

One aspect, disclosed herein is a non-transitory computer-readable storage media encoded with a computer program including instructions executable by a processor to create an application to detect an unpermitted renovation event and validate the detected event, the application comprising: a parameter setting module that defines a data set to be evaluated; a plurality of data ingestion interfaces, each interface connecting to a unique external data source, each interface configured to perform at least one of a natural language task process and a computer vision task process to its data source to detect one or more unpermitted renovation event indicia within the data set; a renovation detection module that applies a machine learning algorithm to identify an initial candidate based on the detection indicia within the data set; a renovation probability calculation module that calculates a probability that an unpermitted renovation event has taken or is taking place at the initial candidate; and a validation module that accepts verified data regarding the unpermitted renovation event and feeds back the verified data to the renovation probability calculation module to improve its prediction over time.

Optionally, in some embodiments, each interface is configured to perform a data mining task process to its data source to detect one or more unpermitted renovation event indicia within the data set. Optionally, in some embodiments, the data mining process comprises a natural language task process, numerical data mining task process, or a photographic data mining task process. Optionally, in some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points. Optionally, in some embodiments, the natural language task process comprises syntax interpretation, semantic interpretation, discourse interpretation, or speech interpretation. Optionally, in some embodiments, the syntax interpretation comprises lemmatization, morphological segmentation, part-of-speech tagging, parsing, sentence boundary disambiguation, stemming, word segmentation, or terminology extraction. Optionally, in some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, or word sense disambiguation. Optionally, in some embodiments, the discourse interpretation comprises automatic summarization, coreference resolution, or discourse analysis. Optionally, in some embodiments, the speech interpretation comprises speech recognition, speech segmentation, and text-to-speech. Optionally, in some embodiments, the computer image task process comprises object recognition, object identification, object detection, content-based image retrieval, optical character recognition, facial recognition, shape recognition, egomotion, object tracking, optical flow, or any combination thereof. Optionally, in some embodiments, the external data source comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, image processing of satellite, street view images, or the Internet. Optionally, in some embodiments, the detection of one or more unpermitted renovation event indicia comprises determining a square footage of a property, a change in the square footage of a property, a bed count of a property, a change in a bed count of a property, a bathroom count of a property, a change in a bathroom count of a property, a valuation of a property, a change in a valuation of the property, ownership of a property, a corporation owning a property, an owner with a history of flipping one or more properties, lenders on a property, or liens on a property. Optionally, in some embodiments, the calculation comprises applying an increased weighted factor that the unpermitted renovation event has taken place if a property is owned by a corporation. Optionally, in some embodiments, the calculation comprises applying an increased weighted factor that the unpermitted renovation event has taken place if one or more corporate officers have previously flipped properties. Optionally, in some embodiments, the calculation comprises applying an increased weighted factor that the unpermitted renovation event has taken place if a property owner's social media displays renovations. Optionally, in some embodiments, the calculation comprises applying an increased weighted factor that the unpermitted renovation event has taken place if a real estate listing displays renovations. Optionally, in some embodiments, the calculation comprises calculating whether a probability threshold has been met. Optionally, in some embodiments, the unpermitted renovation event comprises violations of building codes, past unpermitted renovations, present unpermitted renovations, additions to a property, upgrades to a property, or modifications to a property. Optionally, in some embodiments, the verified data is acquired by a public official inspecting a candidate property. Optionally, in some embodiments, the verified data is an issued permit for the renovated event at the initial candidate. Optionally, in some embodiments, the media further comprises a secondary screening module, wherein if the probability calculation module calculates a probability in excess of a predetermined threshold, the secondary screening module proceeds to conduct further screening procedures.

Another aspect, disclosed herein is a non-transitory computer-readable storage media encoded with a computer program including instructions executable by a processor to perform a method to detect an unpermitted renovation event and validate the detected event, the method comprising: a parameter setting module defining a data set to be evaluated; a plurality of data ingestion interfaces, each interface connecting to a unique external data source, each interface performing at least one of a natural language task process and a computer vision task process to its data source to detect one or more unpermitted renovation event indicia within the data set; a renovation detection module that applies a machine learning algorithm to identify an initial candidate based on the detection indicia within the data set; a renovation probability calculation module calculating a probability that an unpermitted renovation event has taken or is taking place at the initial candidate; a validation module that accepts verified data regarding the unpermitted renovation event and feeds back the verified data to the renovation probability calculation module to improve its prediction over time. Optionally, in some embodiments, each interface is configured to perform a data mining task process to its data source to detect one or more unpermitted renovation event indicia within the data set. Optionally, in some embodiments, the data mining process comprises a natural language task process, numerical data mining task process, or a photographic data mining task process.

Another aspect, disclosed herein is a system comprising a non-transitory computer-readable storage media encoded with a computer program including instructions executable by a processor to create an application to detect an unpermitted renovation event and validate the detected event, the application comprising: a parameter setting module that defines a data set to be evaluated; a plurality of data ingestion interfaces, each interface connecting to a unique external data source, each interface configured to perform at least one of a natural language task process and a computer vision task process to its data source to detect one or more unpermitted renovation event indicia within the data set; a renovation detection module that applies a machine learning algorithm to identify an initial candidate based on the detection indicia within the data set; a renovation probability calculation module that calculates a probability that an unpermitted renovation event has taken or is taking place at the initial candidate; a validation module that accepts verified data regarding the unpermitted renovation event and feeds back the verified data to the renovation probability calculation module to improve its prediction over time. Optionally, in some embodiments, each interface is configured to perform a data mining task process to its data source to detect one or more unpermitted renovation event indicia within the data set. Optionally, in some embodiments, the data mining process comprises a natural language task process, numerical data mining task process, or a photographic data mining task process.

Another aspect, disclosed herein is a platform comprising a non-transitory computer-readable storage media encoded with a computer program including instructions executable by a processor to create an application to detect an unpermitted renovation event and validate the detected event, the application comprising: a parameter setting module that defines a data set to be evaluated; a plurality of data ingestion interfaces, each interface connecting to a unique external data source, each interface configured to perform at least one of a natural language task process and a computer vision task process to its data source to detect one or more unpermitted renovation event indicia within the data set; a renovation detection module that applies a machine learning algorithm to identify an initial candidate based on the detection indicia within the data set; a renovation probability calculation module that calculates a probability that an unpermitted renovation event has taken or is taking place at the initial candidate; a validation module that accepts verified data regarding the unpermitted renovation event and feeds back the verified data to the renovation probability calculation module to improve its prediction over time. Optionally, in some embodiments, each interface is configured to perform a data mining task process to its data source to detect one or more unpermitted renovation event indicia within the data set. Optionally, in some embodiments, the data mining process comprises a natural language task process, numerical data mining task process, or a photographic data mining task process. Optionally, the data mining process comprises a predetermined algorithm. Optionally, the data mining process comprises a machine learning based algorithm. Optionally, in some embodiments, the data mining process comprises other forms of interpretation of data.

Another aspect, disclosed herein is a non-transitory computer-readable storage media encoded with a computer program including instructions executable by a processor to create an application to prioritize inspection of unpermitted renovation candidates and validate the prioritization, the application comprising: a parameter setting module that defines a data set to be evaluated; a plurality of data ingestion interfaces, each interface connected to a unique external data source, each interface configured to perform a data mining task process to its data source to detect one or more unpermitted renovation event indicia within the data set; a renovation detection module that applies a machine learning algorithm to identify a plurality of unpermitted renovation candidates based on the detection indicia within the data set; a renovation probability calculation module that calculates a probability that an unpermitted renovation event has taken or is taking place at each unpermitted renovation candidate; an active renovation probability calculation module that calculates a probability that each unpermitted renovation event is an active renovation event; an active renovation completion estimator module that assigns a value estimating the time until the active renovation event is completed; an unpermitted renovation candidate to inspector location distance calculation module that calculates a distance between the plurality of unpermitted renovation candidates and a location of an inspector; an inspection prioritization module that provides an order for the inspector to prioritize inspecting the plurality of unpermitted renovation candidates based on the probability that the unpermitted renovation event is an active renovation event, the estimated value regarding the time until the active renovation event is completed, and the distance between the plurality of unpermitted renovation candidates and the location of the inspector; and a prioritization validation module that accepts verified data regarding the unpermitted renovation event, active renovation event, or time until the active renovation event is complete and feeds back the verified data to the renovation detection calculation module and active renovation probability calculation module to improve their prediction over time. Optionally, in some embodiments, the storage media further comprises a renovation value calculation module that calculates a value of the unpermitted renovation event. Optionally, in some embodiments, the inspection prioritization module provides an order for the inspector to prioritize inspecting the plurality of unpermitted renovations candidates based on the calculated value of the unpermitted renovation event. Optionally, in some embodiments, the calculated value of the unpermitted renovation event comprises considering the unpermitted renovation event's impact on property tax values, dollars spent on the unpermitted renovation event, or amount of penalties or fees. Optionally, in some embodiments, the prioritization validation module accepts verified data regarding the value of the unpermitted renovation event and feeds back the verified data to the renovation value calculation module to improve its prediction over time. Optionally, in some embodiments, the prioritization comprises applying an increased priority factor as the value of the unpermitted event increases.

Optionally, in some embodiments, the active renovation probability calculation comprises applying an increased weighted factor that an active renovation event has taken place if a property is owned by a corporation. Optionally, in some embodiments, the active renovation probability calculation comprises applying an increased weighted factor that an active renovation event has taken place if one or more corporate officers have previously flipped properties. Optionally, in some embodiments, the active renovation probability calculation comprises applying an increased weighted factor that an active renovation event has taken place if a property owner's social media displays renovations. Optionally, in some embodiments, the active renovation probability calculation comprises applying an increased weighted factor that an active renovation event has taken place if a real estate listing displays renovations. Optionally, in some embodiments, the active renovation probability calculation comprises applying an increased weighted factor that an active renovation event has taken place if an unpermitted renovation candidate was acquired more recently. Optionally, in some embodiments, the prioritization comprises applying an increased priority factor as the probability than an unpermitted renovation event is an active renovation event. The prioritization comprises applying an increased priority factor as the value estimating the time until the active renovation event is completed approaches zero. Optionally, in some embodiments, the prioritization comprises applying an increased priority factor as the value estimating the time until the active renovation event is completed approaches zero. Optionally, in some embodiments, the storage media further comprises a renovation value calculation module that calculates a value of the unpermitted renovation event. Optionally, in some embodiments, the inspection prioritization module provides an order for the inspector to prioritize inspecting the plurality of unpermitted renovations candidates based on the calculated value of the unpermitted renovation event. Optionally, in some embodiments, the calculated value of the unpermitted renovation event comprises considering the unpermitted renovation event's impact on property tax values, dollars spent on the unpermitted renovation event, or amount of penalties or fees. Optionally, in some embodiments, the prioritization validation module accepts verified data regarding the value of the unpermitted renovation event and feeds back the verified data to the renovation value calculation module to improve its prediction over time. Optionally, in some embodiments, the prioritization comprises applying an increased priority factor as the value of the unpermitted event increases.

Another aspect, disclosed herein is a non-transitory computer-readable storage media encoded with a computer program including instructions executable by a processor to perform a method to prioritize inspection of unpermitted renovation candidates and validate the prioritization, the method comprising: a parameter setting module that defines a data set to be evaluated; a plurality of data ingestion interfaces, each interface connected to a unique external data source, each interface configured to perform a data mining task process to its data source to detect one or more unpermitted renovation event indicia within the data set; a renovation detection module that applies a machine learning algorithm to identify a plurality of unpermitted renovation candidates based on the detection indicia within the data set; a renovation probability calculation module that calculates a probability that an unpermitted renovation event has taken or is taking place at each unpermitted renovation candidate; an active renovation probability calculation module that calculates a probability that each unpermitted renovation event is an active renovation event; an active renovation completion estimator module that assigns a value estimating the time until the active renovation event is completed; an unpermitted renovation candidate to inspector location distance calculation module that calculates a distance between the plurality of unpermitted renovation candidates and a location of an inspector; an inspection prioritization module that provides an order for the inspector to prioritize inspecting the plurality of unpermitted renovation candidates based on the probability that the unpermitted renovation event is an active renovation event, the estimated value regarding the time until the active renovation event is completed, and the distance between the plurality of unpermitted renovation candidates and the location of the inspector; and a prioritization validation module that accepts verified data regarding the unpermitted renovation event, active renovation event, or time until the active renovation event is complete and feeds back the verified data to the renovation detection calculation module and active renovation probability calculation module to improve their prediction over time. Optionally, in some embodiments, the method further comprises a renovation value calculation module that calculates a value of the unpermitted renovation event. Optionally, in some embodiments, the inspection prioritization module provides an order for the inspector to prioritize inspecting the plurality of unpermitted renovations candidates based on the calculated value of the unpermitted renovation event. Optionally, in some embodiments, the calculated value of the unpermitted renovation event comprises considering the unpermitted renovation event's impact on property tax values, dollars spent on the unpermitted renovation event, or amount of penalties or fees. Optionally, in some embodiments, the prioritization validation module accepts verified data regarding the value of the unpermitted renovation event and feeds back the verified data to the renovation value calculation module to improve its prediction over time. Optionally, in some embodiments, the prioritization comprises applying an increased priority factor as the value of the unpermitted event increases.

Another aspect, disclosed herein is a system comprising a non-transitory computer-readable storage media encoded with a computer program including instructions executable by a processor to create an application to prioritize inspection of unpermitted renovation candidates and validate the prioritization, the application comprising: a parameter setting module that defines a data set to be evaluated; a plurality of data ingestion interfaces, each interface connected to a unique external data source, each interface configured to perform a data mining task process to its data source to detect one or more unpermitted renovation event indicia within the data set; a renovation detection module that applies a machine learning algorithm to identify a plurality of unpermitted renovation candidates based on the detection indicia within the data set; a renovation probability calculation module that calculates a probability that an unpermitted renovation event has taken or is taking place at each unpermitted renovation candidate; an active renovation probability calculation module that calculates a probability that each unpermitted renovation event is an active renovation event; an active renovation completion estimator module that assigns a value estimating the time until the active renovation event is completed; an unpermitted renovation candidate to inspector location distance calculation module that calculates a distance between the plurality of unpermitted renovation candidates and a location of an inspector; an inspection prioritization module that provides an order for the inspector to prioritize inspecting the plurality of unpermitted renovation candidates based on the probability that the unpermitted renovation event is an active renovation event, the estimated value regarding the time until the active renovation event is completed, and the distance between the plurality of unpermitted renovation candidates and the location of the inspector; and a prioritization validation module that accepts verified data regarding the unpermitted renovation event, active renovation event or time until the active renovation event is complete and feeds back the verified data to the renovation detection calculation module and active renovation probability calculation module to improve their prediction over time. Optionally, in some embodiments, the storage media further comprises a renovation value calculation module that calculates a value of the unpermitted renovation event. Optionally, in some embodiments, the inspection prioritization module provides an order for the inspector to prioritize inspecting the plurality of unpermitted renovations candidates based on the calculated value of the unpermitted renovation event. Optionally, in some embodiments, the calculated value of the unpermitted renovation event comprises considering the unpermitted renovation event's impact on property tax values, dollars spent on the unpermitted renovation event, or amount of penalties or fees. Optionally, in some embodiments, the prioritization validation module accepts verified data regarding the value of the unpermitted renovation event and feeds back the verified data to the renovation value calculation module to improve its prediction over time. Optionally, in some embodiments, the prioritization comprises applying an increased priority factor as the value of the unpermitted event increases.

Another aspect, disclosed herein is a platform comprising a non-transitory computer-readable storage media encoded with a computer program including instructions executable by a processor to create an application to prioritize inspection of unpermitted renovation candidates and validate the prioritization, the application comprising: a parameter setting module that defines a data set to be evaluated; a plurality of data ingestion interfaces, each interface connected to a unique external data source, each interface configured to perform a data mining task process to its data source to detect one or more unpermitted renovation event indicia within the data set; a renovation detection module that applies a machine learning algorithm to identify a plurality of unpermitted renovation candidates based on the detection indicia within the data set; a renovation probability calculation module that calculates a probability that an unpermitted renovation event has taken or is taking place at each unpermitted renovation candidate; an active renovation probability calculation module that calculates a probability that each unpermitted renovation event is an active renovation event; an active renovation completion estimator module that assigns a value estimating the time until the active renovation event is completed; an unpermitted renovation candidate to inspector location distance calculation module that calculates a distance between the plurality of unpermitted renovation candidates and a location of an inspector; an inspection prioritization module that provides an order for the inspector to prioritize inspecting the plurality of unpermitted renovation candidates based on the probability that the unpermitted renovation event is an active renovation event, the estimated value regarding the time until the active renovation event is completed, and the distance between the plurality of unpermitted renovation candidates and the location of the inspector; and a prioritization validation module that accepts verified data regarding the unpermitted renovation event, active renovation event, or time until the active renovation event is complete and feeds back the verified data to the renovation detection calculation module and active renovation probability calculation module to improve their prediction over time. Optionally, in some embodiments, the storage media further comprises a renovation value calculation module that calculates a value of the unpermitted renovation event. Optionally, in some embodiments, the inspection prioritization module provides an order for the inspector to prioritize inspecting the plurality of unpermitted renovations candidates based on the calculated value of the unpermitted renovation event. Optionally, in some embodiments, the calculated value of the unpermitted renovation event comprises considering the unpermitted renovation event's impact on property tax values, dollars spent on the unpermitted renovation event, or amount of penalties or fees. Optionally, in some embodiments, the prioritization validation module accepts verified data regarding the value of the unpermitted renovation event and feeds back the verified data to the renovation value calculation module to improve its prediction over time. Optionally, in some embodiments, the prioritization comprises applying an increased priority factor as the value of the unpermitted event increases.

Another aspect provided herein is a non-transitory computer-readable storage media encoded with a computer program including instructions executable by a processor to create an application to detect an improper real estate transfer event, the application comprising: a parameter setting module that defines a data set to be evaluated; a plurality of data ingestion interfaces, each interface connecting to a unique external data source, each interface configured to perform a data mining task process to its data source to detect one or more real estate transfer indicia within the data set; an improper transfer detection module that applies a machine learning algorithm to identify an initial candidate based on the real estate transfer indicia within the data set; an improper real estate transfer probability calculation module that calculates a probability that the improper real estate transfer event has taken place at the initial candidate; a validation module that accepts verified data regarding the real estate transfer event and feeds back the verified data to the improper real estate transfer probability calculation module to improve its calculation over time.

Optionally, in some embodiments, the real estate indicia comprises a valuation of a property, a change in a valuation of the property, a current ownership of the property, a past ownership of the property, a lender on a property, an ownership percentage of the property, or one or more liens on a property. Optionally, in some embodiments, the machine learning algorithm identifies an initial candidate if at least one of the current ownership and the past ownership of the initial candidate comprises a corporation. Optionally, in some embodiments, the machine learning algorithm identifies an initial candidate if the corporation comprises a title holding trust. Optionally, in some embodiments, the machine learning algorithm identifies an initial candidate if the ownership percentage of the property changes by more than 49.9%. Optionally, in some embodiments, the calculation comprises applying an increased weighted factor that the improper real estate transfer event has taken place if at least one of the current ownership and the past ownership of the initial candidate comprises a corporation. Optionally, in some embodiments, the calculation comprises applying an increased weighted factor that the improper real estate transfer event has taken place if the corporation comprises a title holding trust. Optionally, in some embodiments, the calculation comprises applying an increased weighted factor that the improper real estate transfer event has taken place if the ownership percentage of the property changes by more than 49.9%. Optionally, in some embodiments, the calculation comprises calculating whether a probability threshold has been met. Optionally, in some embodiments, the verified data is acquired by a public official inspecting the candidate property. Optionally, in some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points. Optionally, in some embodiments, the data mining task process comprises a natural language process, numerical data mining process, or a photographic data mining task process. Optionally, in some embodiments, the natural language task process comprises syntax interpretation, semantic interpretation, discourse interpretation, or speech interpretation. Optionally, in some embodiments, the syntax interpretation comprises lemmatization, morphological segmentation, part-of-speech tagging, parsing, sentence boundary disambiguation, stemming, word segmentation, or terminology extraction. Optionally, in some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, or word sense disambiguation. Optionally, in some embodiments, the discourse interpretation comprises automatic summarization, coreference resolution, or discourse analysis. Optionally, in some embodiments, the speech interpretation comprises speech recognition, speech segmentation, and text-to-speech. Optionally, in some embodiments, the external data source comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, or the Internet. Optionally, in some embodiments, the application further comprises a historical transfer database receiving and storing a plurality of the real estate transfer indicia from the plurality of data ingestion interfaces, and wherein the historical transfer database transmits one or more of the plurality of stored real estate transfer indicia to the improper transfer detection module. Optionally, in some embodiments, the plurality of stored real estate transfer indicia comprises a sequence of transfers regarding a real estate unit. Optionally, in some embodiments, the historical transfer database further receives a plurality of the initial candidates from the improper real estate transfer detection module and appends the each of the initial candidates to at least one of the stored real estate transfer indicia. Optionally, in some embodiments, the improper transfer detection module applies the machine learning algorithm to identify the initial candidate based further on the initial candidates appended to the plurality of stored real estate transfer indicia.

Another aspect provided herein is a non-transitory computer-readable storage media encoded with a computer program including instructions executable by a processor to create an application to determine when one or more unpermitted renovation events has taken place to an unpermitted renovation candidate, the application comprising: an unpermitted renovation candidate module that presents an unpermitted renovation candidate; a parameter setting module that defines a data set to be evaluated; a set of first data ingestion interfaces, each first interface connecting to a first data source, each interface configured to perform a data mining task process to a first data source to determine an initial time range within the data set when at least one unpermitted renovation event has taken place at the unpermitted renovation candidate; a set of second data ingestion interfaces, each second interface connecting to a second data source, each interface configured to perform a data mining task process to the second data source to detect one or more unpermitted renovation timing indicia within the data set when the at least one unpermitted renovation event has taken place at the unpermitted renovation candidate; a renovation timing estimation module that applies a machine learning algorithm to present a refined renovation time range based on the detected initial time range and the detected unpermitted renovation timing indicia; and a validation module that accepts verified data regarding the timing of the unpermitted renovation event and feeds back the verified data to the renovation timing estimation module to improve its prediction over time.

In some embodiments, the initial time range comprises a time range from a current time to when the unpermitted renovation event was assessed according to the first data source. In some embodiments, the first data source comprises city property records, county property records, city permit records, county permit records, and state business records. In some embodiments, the second data source comprises public sources, licensed data feeds, sources depicting historical water usage at the unpermitted renovation candidate, sources depicting historical energy usage at the unpermitted renovation candidate, contractor web sites, Yelp, Craigslist, Wayback Machine, financial documents, photographs from aerial surveys, Google Earth, Google Streetview, rental records for dumpsters, rental records for portable restrooms, serial numbers, manufacturer warranty records, Home Owner's Association records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, or the Internet. In some embodiments, the unpermitted renovation timing indicia comprises increase in water usage, decrease in water usage, increase in energy usage, decrease in energy usage, permanent change in water usage, permanent change in energy usage, records of renovations from Internet sources, documentation reflecting refinanced mortgages, documentation reflecting home equity lines of credit, photographs depicting structural changes, records reflecting renovation work, records reflecting renovation waste, serial numbers reflecting new appliances, windows, or air conditioners, or manufacturer warranty records reflecting dates of installation. In some embodiments, the refined renovation time range comprises a narrower time range than the initial time range. In some embodiments, the application further comprises a second data source filter module configured to allow a user to filter the second data mining task process to the second data source.

Another aspect provided herein is a non-transitory computer-readable storage media encoded with a computer program including instructions executable by a processor to create an application to detect an improper residency status for a real estate property, the application comprising: a parameter setting module that defines a data set to be evaluated; a plurality of data ingestion interfaces, each interface connecting to a unique external data source, each interface configured to perform a data mining task process to its data source to detect one or more improper residency indicia within the data set; an improper residency detection module that applies a machine learning algorithm to identify an initial candidate based on the improper residency indicia within the data set; a residency probability calculation module that calculates a probability that the initial candidate has an improper residency status; and a validation module that accepts verified data regarding the residency status and feeds back the verified data to the improper residency probability calculation module to improve its calculation over time.

In some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points. In some embodiments, the data mining task process comprises a natural language process, numerical data mining process, a photographic data mining task process, or any combination thereof. In some embodiments, the natural language task process comprises syntax interpretation, semantic interpretation, discourse interpretation, speech interpretation, or any combination thereof. In some embodiments, the syntax interpretation comprises lemmatization, morphological segmentation, part-of-speech tagging, parsing, sentence boundary disambiguation, stemming, word segmentation, terminology extraction, or any combination thereof. In some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, word sense disambiguation, or any combination thereof. In some embodiments, the discourse interpretation comprises automatic summarization, coreference resolution, discourse analysis, or any combination thereof. In some embodiments, the speech interpretation comprises speech recognition, speech segmentation, text-to-speech, or both. In some embodiments, the external data source comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, the Internet, or any combination thereof. In some embodiments, the detection of one or more improper residency indicia comprises water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change, a frequency of phone calls, a frequency of credit card purchases, or any combination thereof.

Another aspect provided herein is a non-transitory computer-readable storage media encoded with a computer program including instructions executable by a processor to create an application to detect an improper occupancy tax status for a real estate property, the application comprising: a parameter setting module that defines a data set to be evaluated; a plurality of data ingestion interfaces, each interface connecting to a unique external data source, each interface configured to perform a data mining task process to its data source to detect one or more improper occupancy tax indicia within the data set; an improper occupancy tax detection module that applies a machine learning algorithm to identify an initial candidate based on the improper occupancy tax indicia within the data set; an occupancy tax probability calculation module that calculates a probability that the initial candidate has an improper occupancy tax status; and a validation module that accepts verified data regarding the occupancy tax status and feeds back the verified data to the improper occupancy tax probability calculation module to improve its calculation over time.

In some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points. In some embodiments, the data mining task process comprises a natural language process, numerical data mining process, a photographic data mining task process, or any combination thereof. In some embodiments, the natural language task process comprises syntax interpretation, semantic interpretation, discourse interpretation, speech interpretation, or any combination thereof. In some embodiments, the syntax interpretation comprises lemmatization, morphological segmentation, part-of-speech tagging, parsing, sentence boundary disambiguation, stemming, word segmentation, terminology extraction, or any combination thereof. In some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, word sense disambiguation, or any combination thereof. In some embodiments, the discourse interpretation comprises automatic summarization, coreference resolution, discourse analysis, or any combination thereof. In some embodiments, the speech interpretation comprises speech recognition, speech segmentation, and text-to-speech, or any combination thereof. In some embodiments, the external data source comprises AirBnB®, VRBO®, city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, the Internet, or any combination thereof. In some embodiments, the detection of one or more improper occupancy tax indicia comprises water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change, a frequency of phone calls, a frequency of credit card purchases, or any combination thereof.

Another aspect provided herein is a non-transitory computer-readable storage media encoded with a computer program including instructions executable by a processor to create an application to detect an improper residency status for a real estate property, the application comprising: a parameter setting module that defines a data set to be evaluated; a plurality of data ingestion interfaces, each interface connecting to a unique external data source, each interface configured to perform a data mining task process to its data source to detect one or more improper residency indicia within the data set; an improper residency detection module that applies a machine learning algorithm to identify an initial candidate based on the improper residency indicia within the data set; a residency probability calculation module that calculates a probability that the initial candidate has an improper residency status; and a validation module that accepts verified data regarding the residency status and feeds back the verified data to the improper residency probability calculation module to improve its calculation over time.

In some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, an area code, or an area defined by at least three GPS points. In some embodiments, the data mining task process comprises a natural language process, numerical data mining process, a photographic data mining task process, or any combination thereof. In some embodiments, the natural language task process comprises syntax interpretation, semantic interpretation, discourse interpretation, speech interpretation, or any combination thereof. In some embodiments, the syntax interpretation comprises lemmatization, morphological segmentation, part-of-speech tagging, parsing, sentence boundary disambiguation, stemming, word segmentation, terminology extraction, or any combination thereof. In some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, word sense disambiguation, or any combination thereof. In some embodiments, the discourse interpretation comprises automatic summarization, coreference resolution, discourse analysis, or any combination thereof. In some embodiments, the speech interpretation comprises speech recognition, speech segmentation, text-to-speech, or both. In some embodiments, the external data source comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, the Internet, or any combination thereof. In some embodiments, the detection of one or more improper residency indicia comprises a water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change, or any combination thereof. In some embodiments, the improper residency status comprises improper occupancy tax status. In some embodiments, the improper residency indicia comprises improper occupancy tax indicia. In some embodiments, the external data source comprises a home leasing website, AirBnB®, VRBO®, or any combination thereof. In some embodiments, improper occupancy tax indicia comprises a frequency of phone calls, a frequency of credit card purchases, or any combination thereof.

Another aspect provided herein is a computer-implemented system comprising: a computer-readable storage device coupled to at least one processor and having instructions stored thereon which, when executed by the at least one processor, causes the at least one processor to perform operations comprising: defining, from a parameter setting module, a data set to be evaluated; performing a data mining task from a plurality of data ingestion interfaces, wherein each interface is connected to a unique external data source, to its data source to detect one or more improper residency indicia within the data set; applying, from an improper residency detection module, a machine learning algorithm to identify an initial candidate based on the improper residency indicia within the data set; calculating, from a residency probability calculation module, a probability that the initial candidate has an improper residency status; accepting, from a validation module, verified data regarding the residency status; and feeding back the verified data from to the improper residency probability calculation module to improve its calculation over time. In some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, an area code, or an area defined by at least three GPS points. In some embodiments, the data mining process comprises a natural language process, numerical data mining process, a photographic data mining task process, or any combination thereof. In some embodiments, the external data source comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, the Internet, or any combination thereof. In some embodiments, improper residency indicia comprises a water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change, or any combination thereof. In some embodiments, the improper residency status comprises improper occupancy tax status. In some embodiments, the improper residency indicia comprises improper occupancy tax indicia. In some embodiments, the external data source comprises a home leasing website, AirBnB®, VRBO®, or any combination thereof. In some embodiments, improper occupancy tax indicia comprises a frequency of phone calls, a frequency of credit card purchases, or any combination thereof.

Another aspect provided herein is a computer-implemented method for detecting improper residency status comprising: defining, from a parameter setting module, a data set to be evaluated; performing a data mining task from a plurality of data ingestion interfaces, wherein each interface is connected to a unique external data source, to its data source to detect one or more improper residency indicia within the data set; applying, from an improper residency detection module, a machine learning algorithm to identify an initial candidate based on the improper residency indicia within the data set; calculating, from a residency probability calculation module, a probability that the initial candidate has an improper residency status; accepting, from a validation module, verified data regarding the residency status; and feeding back the verified data from to the improper residency probability calculation module to improve its calculation over time. In some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, an area code, or an area defined by at least three GPS points. In some embodiments, the data mining process comprises a natural language process, numerical data mining process, a photographic data mining task process, or any combination thereof. In some embodiments, the external data source comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, the Internet, or any combination thereof. In some embodiments, improper residency indicia comprises a water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change, or any combination thereof. In some embodiments, the improper residency status comprises improper occupancy tax status, and the improper residency indicia comprises improper occupancy tax indicia. In some embodiments, the external data source comprises a home leasing website, AirBnB®, VRBO®, or any combination thereof, and wherein improper occupancy tax indicia comprises a frequency of phone calls, a frequency of credit card purchases, or any combination thereof.

Another aspect provided herein is a non-transitory computer-readable storage media encoded with a computer program including instructions executable by a processor to create an application to detect an improper residency status for a real estate property, the application comprising: a parameter setting module that defines a data set to be evaluated; a plurality of data ingestion interfaces, each interface connecting to a unique external data source, each interface configured to perform a data mining task process to its data source to detect one or more improper residency indicia within the data set; an improper residency detection module that applies a machine learning algorithm to identify an initial candidate based on the improper residency indicia within the data set; a residency probability calculation module that calculates a probability that the initial candidate has an improper residency status; and a validation module that accepts verified data regarding the residency status and feeds back the verified data to the improper residency probability calculation module to improve its calculation over time.

In some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, an area code, or an area defined by at least three GPS points. In some embodiments, the data mining task process comprises a natural language process, numerical data mining process, a photographic data mining task process, or any combination thereof. In some embodiments, the natural language task process comprises syntax interpretation, semantic interpretation, discourse interpretation, speech interpretation, or any combination thereof. In some embodiments, the syntax interpretation comprises lemmatization, morphological segmentation, part-of-speech tagging, parsing, sentence boundary disambiguation, stemming, word segmentation, terminology extraction, or any combination thereof. In some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, word sense disambiguation, or any combination thereof. In some embodiments, the discourse interpretation comprises automatic summarization, coreference resolution, discourse analysis, or any combination thereof. In some embodiments, the speech interpretation comprises speech recognition, speech segmentation, text-to-speech, or both. In some embodiments, the external data source comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, the Internet, or any combination thereof. In some embodiments, the detection of one or more improper residency indicia comprises a water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change, or any combination thereof. In some embodiments, the improper residency status comprises improper occupancy tax status. In some embodiments, the improper residency indicia comprises improper occupancy tax indicia. In some embodiments, the external data source comprises a home leasing website, AirBnB®, VRBO®, or any combination thereof. In some embodiments, improper occupancy tax indicia comprises a frequency of phone calls, a frequency of credit card purchases, or any combination thereof.

Another aspect provided herein is a computer-implemented system comprising: a computer-readable storage device coupled to at least one processor and having instructions stored thereon which, when executed by the at least one processor, causes the at least one processor to perform operations comprising: defining, by a parameter setting module, a data set to be evaluated; detecting, by a plurality of data ingestion interfaces, one or more improper residency indicia within the data set, wherein each interface connects to a unique external data source, and wherein each interface performs a data mining task process to its data source to detect the one or more improper residency indicia; identifying an initial candidate by applying a machine learning algorithm to the improper residency indicia within the data set; calculating, by an improper residency probability calculation module, a probability that the improper residency event has taken place at the initial candidate; accepting, by a validation module, verified data regarding the improper residency event; and feeding back the verified data from to the improper residency probability calculation module to improve its calculation over time.

In some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, an area code, or an area defined by at least three GPS points. In some embodiments, the data mining process comprises a natural language process, numerical data mining process, a photographic data mining task process, or any combination thereof. In some embodiments, the external data source comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, the Internet, or any combination thereof. In some embodiments, improper residency indicia comprises a water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change, or any combination thereof. In some embodiments, the improper residency status comprises an improper occupancy tax status. In some embodiments, the improper residency indicia comprises an improper occupancy tax indicia. In some embodiments, the external data source comprises a home leasing website, AirBnB, VRBO, or any combination thereof. In some embodiments, improper occupancy tax indicia comprises a frequency of phone calls, a frequency of credit card purchases, or any combination thereof.

Another aspect provided herein is a computer-implemented method for detecting improper residency status comprising: defining, by a parameter setting module, a data set to be evaluated; detecting, by a plurality of data ingestion interfaces, one or more improper residency indicia within the data set, wherein each interface connects to a unique external data source, and wherein each interface performs a data mining task process to its data source to detect the one or more improper residency indicia; identifying an initial candidate by applying a machine learning algorithm to the improper residency indicia within the data set; calculating, by an improper residency probability calculation module, a probability that the improper residency event has taken place at the initial candidate; accepting, by a validation module, verified data regarding the improper residency event; and feeding back the verified data from to the improper residency probability calculation module to improve its calculation over time.

In some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, an area code, or an area defined by at least three GPS points. In some embodiments, the data mining process comprises a natural language process, numerical data mining process, a photographic data mining task process, or any combination thereof. In some embodiments, the external data source comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, the Internet, or any combination thereof. In some embodiments, improper residency indicia comprises a water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change, or any combination thereof. In some embodiments, the improper residency status comprises an improper occupancy tax status, and the improper residency indicia comprises improper occupancy tax indicia. In some embodiments, the external data source comprises a home leasing website, AirBnB®, VRBO®, or any combination thereof, and wherein improper occupancy tax indicia comprises a frequency of phone calls, a frequency of credit card purchases, or any combination thereof.

Also, in some instances, a technological tool to improve graphic user interfaces to effectively display reported events and unreported events is needed. One aspect, disclosed herein, is a non-transitory computer-readable storage media encoded with a computer program including instructions executable by a processor to create a real estate event timeline application, the application comprising: (i) a reported timeline module configured to a provide a first timeline and at least one reported event node, wherein the timeline comprises information of reported real estate events; (ii) an unreported timeline module configured to provide a second timeline and at least one unreported event node, wherein the timeline comprises information of unreported real estate events; and (iii) a comparative timeline module configured to provide the first timeline and second timeline, wherein the first timeline and second timeline are linked so that scrolling moves them both simultaneously.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 17 is a non-limiting example of a graphic user interface on a desktop; in this case, an interface for viewing a timeline and overview of publicly available events throughout a property's existence;

DETAILED DESCRIPTION OF THE INVENTION

Application to Detect an Unpermitted Renovation Event and Validate the Detected Event Described herein, in certain embodiments, are non-transitory computer-readable storage media encoded with a computer program including instructions executable by a processor to create an application to detect an unpermitted renovation event and validate the detected event.

Figure 1A:
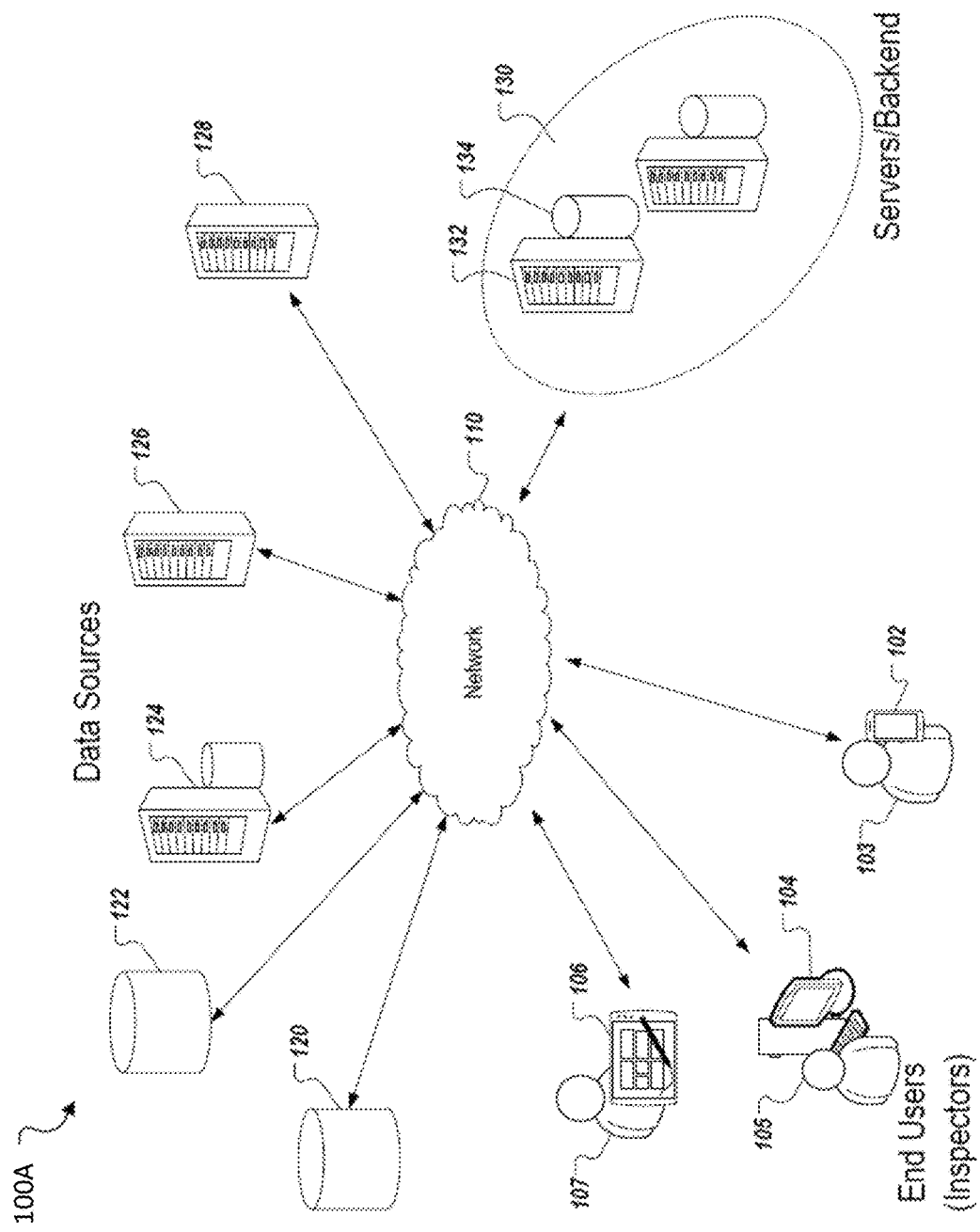
FIG. 1A is a non-limiting example of a schematic diagram; in this case, a first exemplary application to detect an unpermitted renovation event and validate the detected event, in accordance with some embodiments.

FIG. 1A is a non-limiting example of a schematic diagram; in this case, a first exemplary application to detect an unpermitted renovation event and validate the detected event. FIG. 1 depicts an example environment 100A that can be employed to execute embodiments of the present disclosure. The example system 100A includes computing devices 102, 104, 106, 108, a back-end system 130, and a network 110. In some embodiments, the network 110 includes a local area network (LAN), wide area network (WAN), the Internet, or a combination thereof, and connects web sites, devices (e.g., the computing devices 102, 104, 106, 108) and back-end systems (e.g., the back-end system 130). In some embodiments, the network 110 can be accessed over a wired and/or a wireless communications link. For example, mobile computing devices (e.g., the smartphone device 102 and the tablet device 106), can use a cellular network to access the network 110. In some examples, the users 122-126 may be working as agents for one of the participating clients in the consortium, such as described above. In some examples, the users 122-126 may be working as agents for different clients in the consortium.

In the depicted example, the back-end system 130 includes at least one server system 132 and a data store 134. In some embodiments, the at least one server system 132 hosts one or more computer-implemented services employed within the described system, such as XYZ, that users 122-126 can interact with using the respective computing devices 102-106. For example, the computing devices 102-106 may be used by respective users 122-126 XYZ through services hosted by the back-end system 130. In some embodiments, the back-end system 130 provides an application programming interface (API) services with which the server computing device 108 may communicate.

In some embodiments, back-end system 130 may include server-class hardware type devices. In some embodiments, back-end system 130 includes computer systems using clustered computers and components to act as a single pool of seamless resources when accessed through the network 110. For example, such embodiments may be used in data center, cloud computing, storage area network (SAN), and network attached storage (NAS) applications. In some embodiments, back-end system 130 is deployed using a virtual machine(s).

The computing devices 102, 104, 106 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 102 is a smartphone, the computing device 104 is a desktop computing device, and the computing device 106 is a tablet-computing device. The server computing device 108 may include any appropriate type of computing device, such as described above for computing devices 102-106 as well as computing devices with server-class hardware. In some embodiments, the server computing device 108 may include computer systems using clustered computers and components to act as a single pool of seamless resources. It is contemplated, however, that embodiments of the present disclosure can be realized with any of the appropriate computing devices, such as those mentioned previously.

Figure 1B:
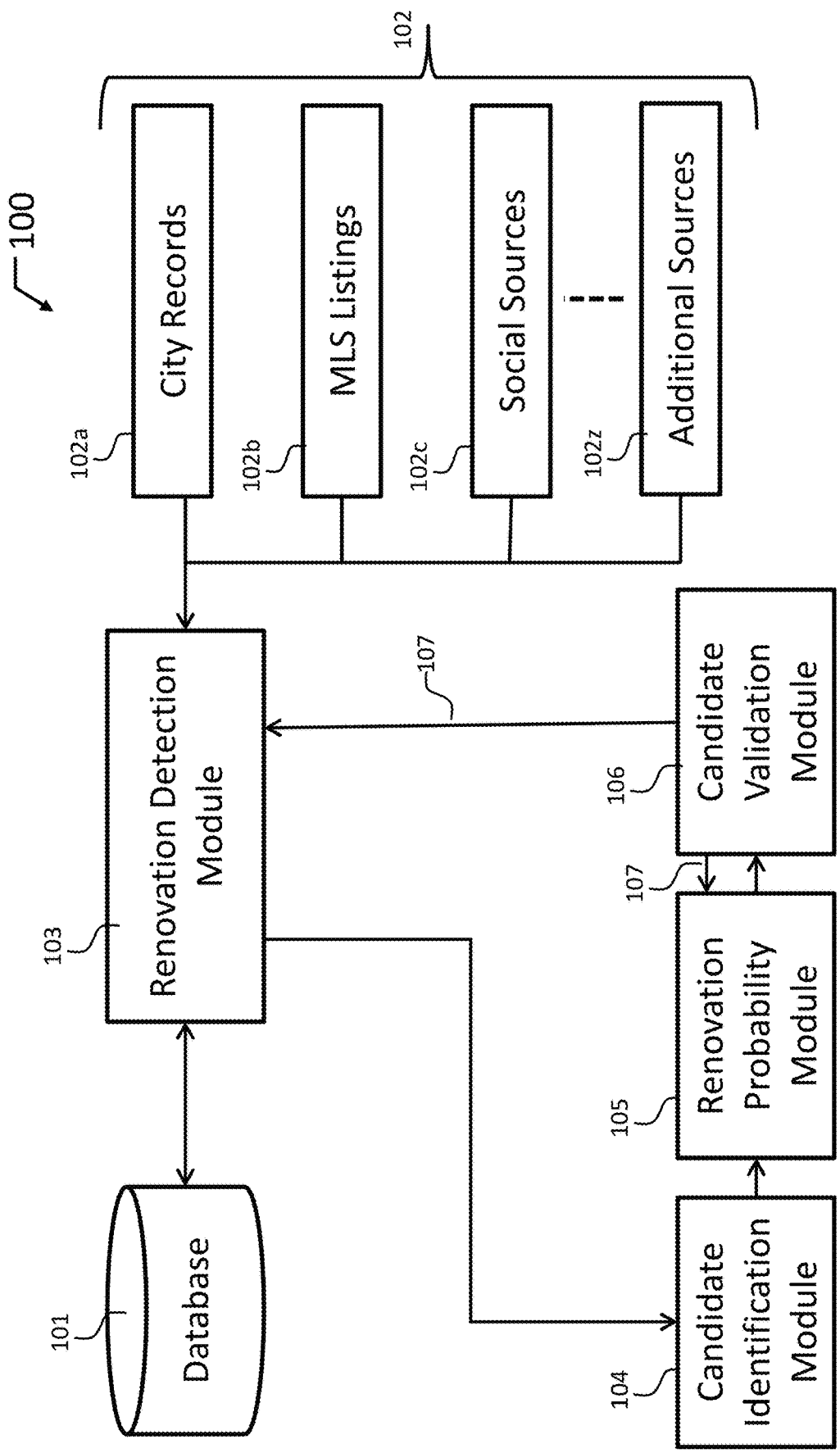
FIG. 1B is a non-limiting example of a schematic diagram; in this case, a second exemplary application to detect an unpermitted renovation event and validate the detected event, in accordance with some embodiments.

FIG. 1B is a schematic diagram; in this case, an exemplary application to detect an unpermitted renovation event and validate the detected event, in accordance with some embodiments. As seen in FIG. 1B, the exemplary schematic diagram of an exemplary application to detect an unpermitted renovation event and validate the detected event 100 comprises: a database 101; an external data source 102 comprising city records 102a, MLS listings 102b, social listings 102c, and additional sources 102z; a renovation detection module 103; a candidate identification module 104; a renovation probability module 105; and a candidate validation module 106. Alternatively, the elements of FIG. 1B delineate a schematic diagram of an exemplary system, method, and a platform.

Per FIG. 1, the renovation detection module 103 is configured to receive a data set from the database 101, and to receive data from an external data source 102. Optionally, in some embodiments, the external data source 102 comprises city records 102a, MLS listings 102b, social listings 102c, and additional sources 102z. Optionally, in some embodiments, the external data source 102 comprises at least one of city records 102a, MLS listings 102b, and social listings 102c.

Optionally, in some embodiments, the data set from the external data source 102 is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points. Optionally, in some embodiments, the external data source 102 comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, or the Internet. Optionally, in some embodiments, rental listings can include AirBnB® or Craigslist®.

Optionally, in some embodiments, the renovation detection module 103 comprises a plurality of data ingestion interfaces, each interface connecting to one external data source 102. Optionally, in some embodiments, the renovation detection module 103 comprises a plurality of data ingestion interfaces comprising at least one of a city records data ingestion interface, an MLS listings data ingestion interface, and a social listings data ingestion interface. Optionally, in some embodiments, each interface is configured to perform at least one of a natural language task process and a computer vision task process to its data source. Optionally, in some embodiments, each interface is configured to detect one or more unpermitted renovation event indicia within the data set from the external data source 102. Optionally, in some embodiments, each interface is configured to perform a data mining task process to its data source to detect one or more unpermitted renovation event indicia within the data set. Optionally, in some embodiments, the data mining process comprises a natural language task process, numerical data mining task process, or a photographic data mining task process.

Optionally, in some embodiments, the natural language task process comprises syntax interpretation, semantic interpretation, discourse interpretation, or speech interpretation. Optionally, in some embodiments, the syntax interpretation comprises lemmatization, morphological segmentation, part-of-speech tagging, parsing, sentence boundary disambiguation, stemming, word segmentation, or terminology extraction. Optionally, in some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, or word sense disambiguation. Optionally, in some embodiments, the discourse interpretation comprises automatic summarization, coreference resolution, or discourse analysis. Optionally, in some embodiments, the speech interpretation comprises speech recognition, speech segmentation, and text-to-speech. Optionally, in some embodiments, the computer vision task process comprises analysis, object recognition, object identification, object detection, content-based image retrieval, optical character recognition, facial recognition, shape recognition, egomotion, object tracking, optical flow, or any combination thereof. In some embodiments, the natural language task process model employs word-level features, n-gram features, or both. The word-level features can be gleaned from textual descriptions. The textual descriptions can comprise stored property descriptions, headlines, property features, or any combination thereof. In some embodiments, the natural language task process model structures the textual descriptions. In some embodiments, the natural language task process model then presents the structured textual descriptions for model analysis. The model analysis can then rank the importance one or more of the structured textual descriptions by assessing their prevalence in the target data. In some cases the model analysis ignores one or more textual descriptions. In some cases the model analysis does not discard any textual descriptions.

Optionally, in some embodiments, the unpermitted renovation event comprises violations of building codes, past unpermitted renovations, present unpermitted renovations, additions to a property, upgrades to a property, or modifications to a property.

Optionally, in some embodiments, the renovation detection module 103 applies a machine learning algorithm to identify an initial candidate property based on the detection indicia within the data set from the external data source 102.

Optionally, in some embodiments, the detection of one or more unpermitted renovation event indicia comprises determining a square footage of a property, a change in the square footage of a property, a bed count of a property, a change in a bed count of a property, a bathroom count of a property, a change in a bathroom count of a property, a valuation of a property, a change in a valuation of the property, ownership of a property, a corporation owning a property, an owner with a history of flipping one or more properties, lenders on a property, a renovation scale, or liens on a property.

Per FIG. 1, the candidate identification module 104 can receive the initial candidate from the renovation detection module 103, identifies a candidate property, and send the candidate property to the renovation probability module 105. Optionally, in some embodiments, the renovation probability module 105 calculates a probability that an unpermitted renovation event has taken or is taking place at the candidate property. If the probability that an unpermitted renovation event has taken or is taking place at the candidate property is above a set threshold, the renovation probability module 105 can send at least one of the candidate and the probability to the candidate validation module 106.

Optionally, in some embodiments, the calculation comprises applying an increased weighted factor that the unpermitted renovation event has taken place if a property is owned by a corporation. Optionally, in some embodiments, the calculation comprises applying an increased weighted factor that the unpermitted renovation event has taken place if one or more corporate officers have previously flipped properties. Optionally, in some embodiments, the calculation comprises applying an increased weighted factor that the unpermitted renovation event has taken place if a property owner's social media displays renovations. Optionally, in some embodiments, the calculation comprises applying an increased weighted factor that the unpermitted renovation event has taken place if a real estate listing displays renovations. Optionally, in some embodiments, the calculation comprises calculating whether a probability threshold has been met.

Optionally, in some embodiments, the candidate validation module 106 receives at least one of the candidate and the probability to the candidate validation module, and a verified data 107 regarding the unpermitted renovation event. Per FIG. 1, the candidate validation module 106 can then feed back the verified data 107 to at least one of the renovation probability calculation module 105 and the renovation detection module 103 to improve its prediction over time. In some embodiments, the renovation detection module stores these calculations to improve predictions in the database 101.

Optionally, in some embodiments, the verified data 107 is acquired by a public official inspecting a candidate property. Optionally, in some embodiments, the verified data 107 is an issued permit for the renovated event at the initial candidate. Optionally, in some embodiments, the media further comprises a secondary screening module, wherein if the renovation probability module 105 calculates a probability in excess of a predetermined threshold, the secondary screening module proceeds to conduct further screening procedures.

Figure 2:
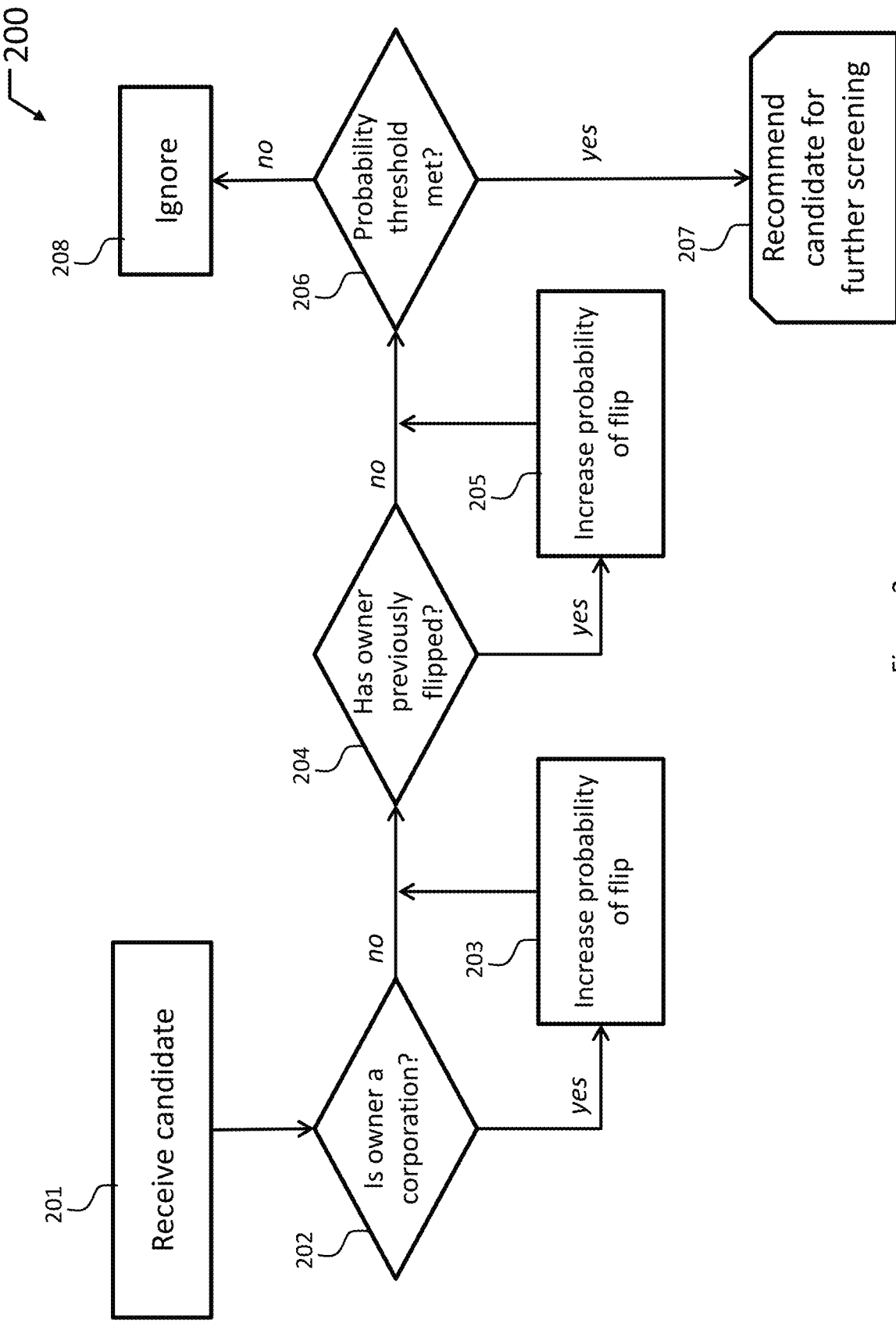
FIG. 2 is a non-limiting example of a schematic diagram; in this case, an exemplary process to identify an initial candidate, in accordance with some embodiments.

FIG. 2 is a schematic diagram; in this case, an exemplary process to identify an initial candidate, in accordance with some embodiments. As seen in FIG. 2, an initial candidate can be identified, wherein the renovation probability module 200 receives an initial candidate 201 from the initial candidate identification module, whereby the renovation probability module 200 determines whether or not the owner of the initial candidate property is a corporation 202. Optionally, in some embodiments, if the owner is a corporation, the probability that the renovation is a flip 203 is increased. Optionally, in some embodiments, if the owner is not a corporation, the probability that the renovation is a flip is not increased.

The renovation probability module 200 can then determine whether or not the owner of the initial candidate property has previously flipped a property 204. Optionally, in some embodiments, if the owner of the initial candidate property has previously flipped a property, the probability that the renovation is a flip is increased 205. Optionally, in some embodiments, if the owner of the initial candidate property has not previously flipped a property, the probability that the renovation is a flip is not increased. In some cases the probability that the renovation is a flip is increased 203 205 by a set probability value. In some cases the probability that the renovation is a flip is increased 203 205 by a variable probability value. Optionally, in other embodiments, the renovation probability module determines whether or not the owner of the initial candidate property has previously performed any number of unpermitted renovation act to a property. Optionally, in further embodiments, the renovation probability module performs the aforementioned steps for the unpermitted renovation act.

Per FIG. 2, the renovation probability module 200 can determine if a probability that the renovation is a flip reaches a certain threshold. Optionally, in some embodiments, if the probability threshold is met, the renovation probability module 200 recommends the initial candidate for further screening 207. Alternatively, if the probability threshold is not met, the probability module 200 can recommend that the initial candidate be ignored 208. Optionally, in some embodiments, if the probability threshold is not met, the probability module prioritizes candidates higher than others based on this stage and all properties will be fed into the next module. Optionally, in some embodiments, probability module 200 is configured to send the recommendation that the initial candidate requires further screening 207 to the candidate validation module.

Optionally, in some embodiments, the renovation probability module 200 can be further configured to receive a verified data from the validation module. The verified data can then be used to adjust the set or variable probability value the renovation is a flip is increased 203 205 by to improve its prediction over time. A prediction improvement can ensure that the initial candidates for further screening 207 require further screening, the initial candidate that are ignored 208 should be ignored, or both.

Optionally, in some embodiments, the unpermitted renovation event comprises violations of building codes, past unpermitted renovations, present unpermitted renovations, additions to a property, upgrades to a property, or modifications to a property. Optionally, in some embodiments, the verified data is acquired by a public official inspecting an initial candidate property. Optionally, in some embodiments, the verified data is an issued permit for the renovated event at the initial candidate. Optionally, in some embodiments, the media further comprises a secondary screening module, wherein if the probability calculation module calculates a probability in excess of a predetermined threshold, the secondary screening module proceeds to conduct further screening procedures.

Figure 3:
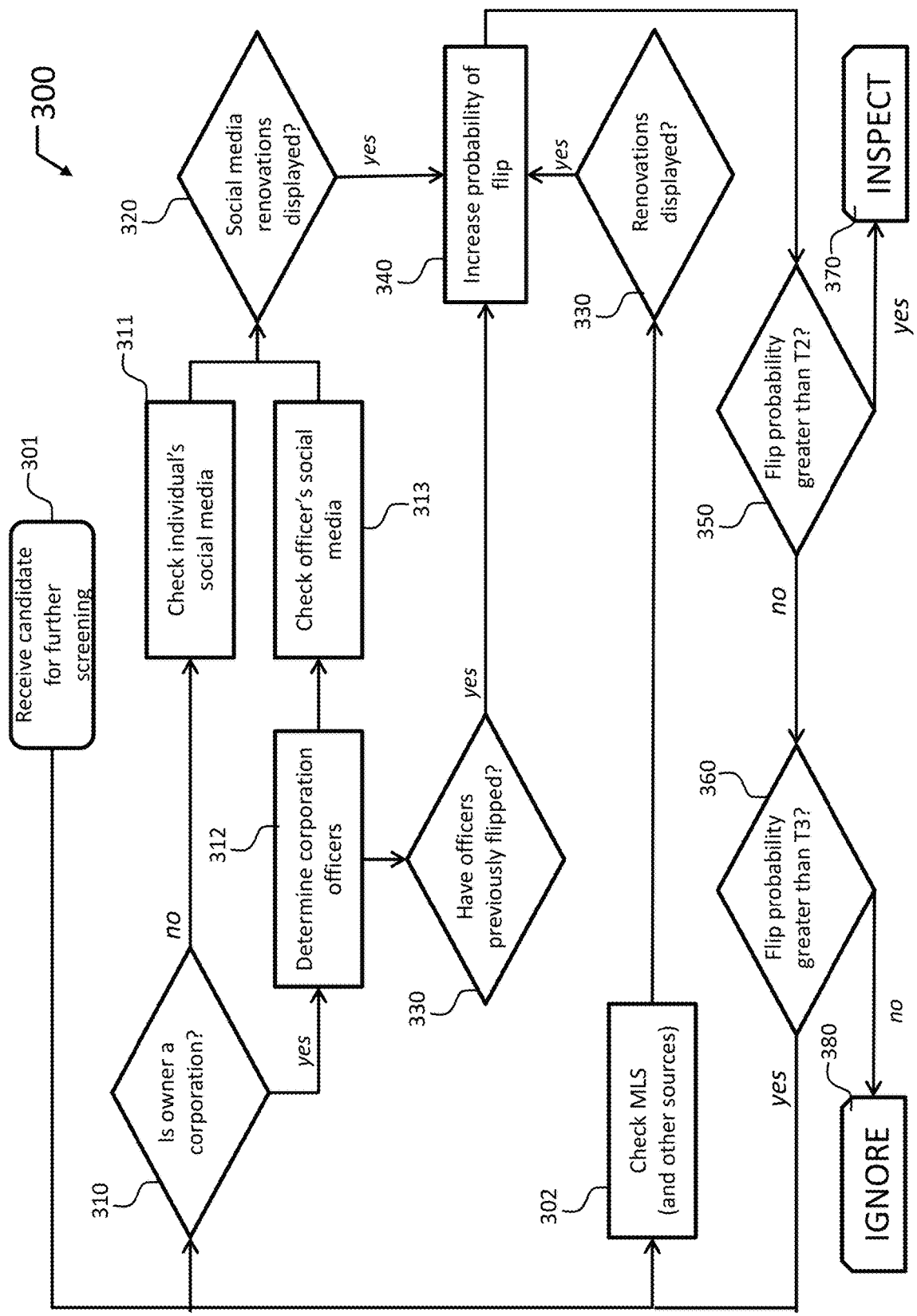
FIG. 3 is a non-limiting example of a schematic diagram; in this case, an exemplary process to calculate a probability that an unpermitted renovation event has taken place.

FIG. 3 is a schematic diagram; in this case, an exemplary process to calculate a probability that an unpermitted renovation event has taken place. As seen in FIG. 3, the renovation probability module 300 can calculate a probability that an unpermitted renovation event has taken place by receiving a candidate for further screening 201 from the renovation probability module, whereby the renovation probability module 300 determines whether or not the owner of the candidate property is a corporation 310. Optionally, in some embodiments, if the owner of the candidate property is not a corporation, or if the owner is an individual, the renovation probability module 300 checks the individual's social media 311. Alternatively, if the owner of the candidate property is a corporation, or is not an individual, the renovation probability module 300 determines the officer or officers of the corporation 312 and checks the officer's or officers' social media 313. Optionally, in some embodiments, if either the individual's social media 311 or the officer social media 313 displays renovations 320, then the probability of a flip is increased 340. Additionally, if the owner of the candidate property is a corporation, or is not an individual, the renovation probability module 300 can determine whether or not the officer of the corporation have previously flipped a property 330, and increase the probability of a flip 340 if such evidence is found.

Additionally, in series or in parallel, the renovation probability module 300 can check MLS listings and other sources 302 to determine whether renovations are displayed 330, whereby the probability of a flip is increased 340 if such evidence is found.

Additionally, the renovation probability module 300 can then determine whether or not the probability of a flip is greater than a T2 threshold 350. Optionally, in some embodiments, the T2 threshold comprises a set threshold or a variable threshold, whereby flip probabilities above the T2 value are highly indicative of a flip, and potential unpermitted renovations associated with the flip. Per FIG. 3, the renovation probability module 300 submits an instruction to inspect the candidate property 370 if the probability of a flip is greater than the T2 threshold. Alternatively, if the probability of a flip is less than the T2 threshold, the renovation probability module 300 determines whether or not the probability of a flip is greater than a T3 threshold 360. Optionally, in some embodiments, the T3 threshold comprises a set threshold or a variable threshold, whereby flip probabilities above the T3 value are moderately indicative of a flip and require further evidence and/or analysis to increase the certainty of a flip before inspection, and whereby T3 represents a lower probability than T2. Per FIG. 3, the renovation probability module 300 submits an instruction to ignore the candidate property 380 if the probability of a flip is less than the T3 threshold. Alternatively, if the probability of a flip is greater than the T3 threshold (and less than the T2 threshold 350) the renovation probability module 300 performs further research and analysis by rechecking the individual's or corporation's social media 311 313 and checking MLS and other sources 302.

Optionally, in some embodiments, the renovation probability module 300 is further configured to feed back the verified data to the renovation probability calculation module to improve its prediction over time.

Figure 7:
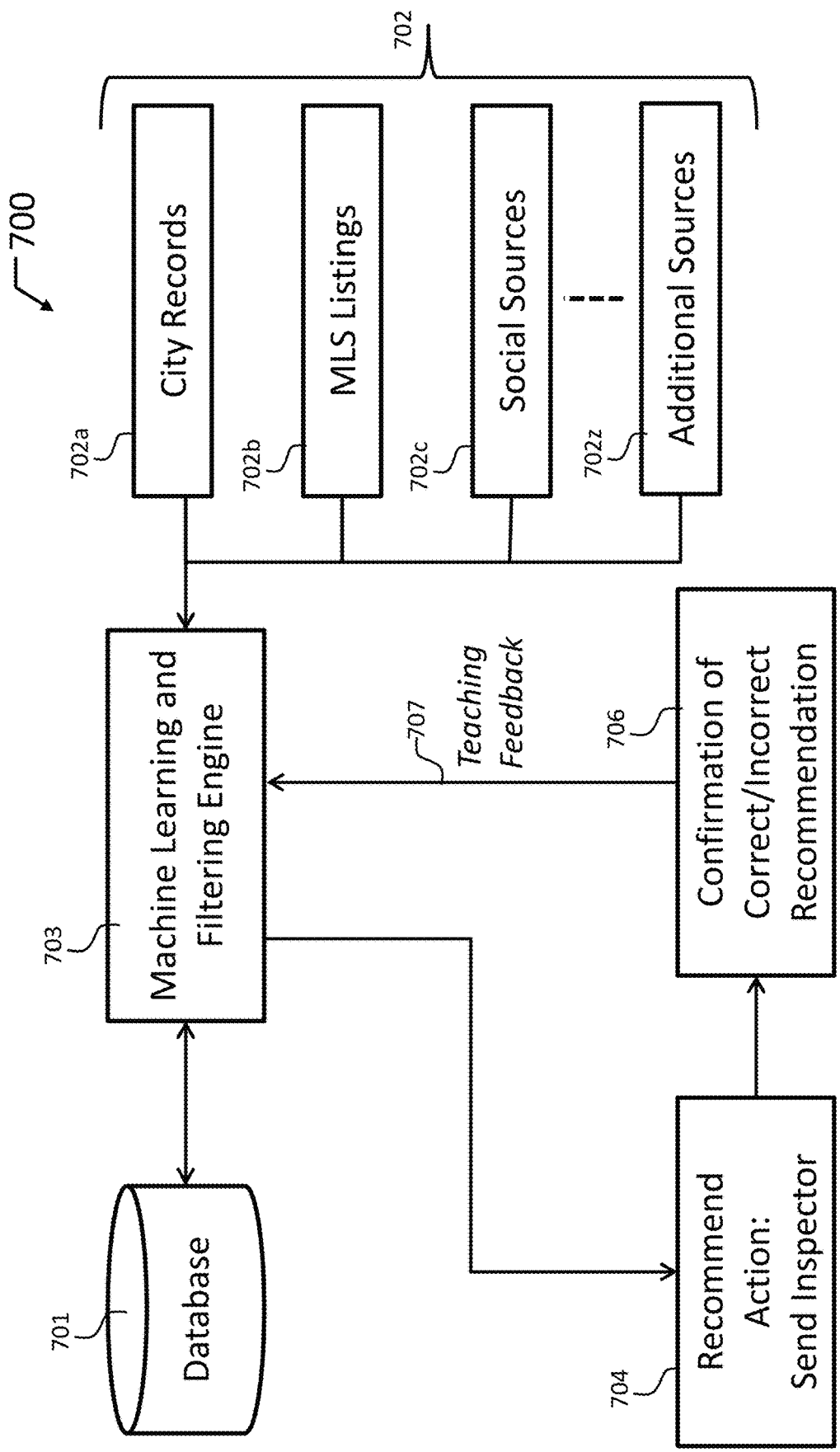
FIG. 7 is a non-limiting example of a schematic diagram; in this case, an exemplary application to detection an unpermitted renovation event and validate the detected event, in accordance with some embodiments.

FIG. 7 is an exemplary schematic diagram of an exemplary application to detect an unpermitted renovation event and validate the detected event, in accordance with some embodiments. As seen in FIG. 7, the exemplary schematic diagram of an exemplary application to detect an unpermitted renovation event and validate the detected event 700 comprises: a database 701; an external data source 702 comprising city records 702a, MLS listings 702b, social listings 702c, and additional sources 702z; a machine learning and filtering engine 703; a recommended action to send an inspector 704; and a confirmation of a correct/incorrect recommendation 706.

Per FIG. 7, the machine learning and filtering engine 703 is configured to receive a data set from the database 701, and to receive data from an external data source 702. Optionally, in some embodiments, the external data source 702 comprises city records 702a, MLS listings 702b, social listings 702c, and additional sources 702z. Optionally, in some embodiments, the external data source 702 comprises at least one of city records 702a, MLS listings 702b, and social listings 702c.

Optionally, in some embodiments, the data set from the external data source 702 is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points. Optionally, in some embodiments, the external data source 702 comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, or the Internet. Optionally, in some embodiments, rental listings can include AirBnB or Craigslist.

Optionally, in some embodiments, the machine learning and filtering engine 703 comprises a plurality of data ingestion interfaces, each interface connecting to one external data source 702. Optionally, in some embodiments, the machine learning and filtering engine 703 comprises a plurality of data ingestion interfaces comprising at least one of a city records data ingestion interface, an MLS listings data ingestion interface, and a social listings data ingestion interface. Optionally, in some embodiments, each interface is configured to perform at least one of a natural language task process and a computer vision task process on its data source. Optionally, in some embodiments, each interface is configured to detect one or more unpermitted renovation event indicia within the data set from the external data source 702. Optionally, in some embodiments, each interface is configured to perform a data mining task process to its data source to detect one or more unpermitted renovation event indicia within the data set. Optionally, in some embodiments, the data mining process comprises a natural language task process, numerical data mining task process, or a photographic data mining task process.

Optionally, in some embodiments, the natural language task process comprises syntax interpretation, semantic interpretation, discourse interpretation, or speech interpretation. Optionally, in some embodiments, the syntax interpretation comprises lemmatization, morphological segmentation, part-of-speech tagging, parsing, sentence boundary disambiguation, stemming, word segmentation, or terminology extraction. Optionally, in some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, or word sense disambiguation. Optionally, in some embodiments, the discourse interpretation comprises automatic summarization, coreference resolution, or discourse analysis. Optionally, in some embodiments, the speech interpretation comprises speech recognition, speech segmentation, and text-to-speech. Optionally, in some embodiments, the computer vision task process comprises object recognition, object identification, object detection, content-based image retrieval, optical character recognition, facial recognition, shape recognition, egomotion, object tracking, optical flow, or any combination thereof.

Optionally, in some embodiments, the unpermitted renovation event comprises violations of building codes, past unpermitted renovations, present unpermitted renovations, additions to a property, upgrades to a property, or modifications to a property.

Optionally, in some embodiments, the machine learning and filtering engine 703 applies a machine learning algorithm to identify an initial candidate property based on the detection indicia within the data set from the external data source 702.

Optionally, in some embodiments, the detection of one or more unpermitted renovation event indicia comprises determining a square footage of a property, a change in the square footage of a property, a bed count of a property, a change in a bed count of a property, a bathroom count of a property, a change in a bathroom count of a property, a valuation of a property, a change in a valuation of the property, ownership of a property, a corporation owning a property, an owner with a history of flipping one or more properties, lenders on a property, a renovation scale, or liens on a property.

Per FIG. 7, the recommended action to send an inspector 704 can be sent by the machine learning and filtering engine 703, whereby the confirmation of correct/incorrect recommendation 706 is then initiated. Optionally, in some embodiments, the machine learning and filtering engine 703 calculates a probability that an unpermitted renovation event has taken or is taking place at the candidate property. If the probability that an unpermitted renovation event has taken or is taking place at the candidate property is above a set threshold, the machine learning and filtering engine 703 sends an instruction for the confirmation of correct/incorrect recommendation 706.

Optionally, in some embodiments, the calculation comprises applying an increased weighted factor that the unpermitted renovation event has taken place if a property is owned by a corporation. Optionally, in some embodiments, the calculation comprises applying an increased weighted factor that the unpermitted renovation event has taken place if one or more corporate officers have previously flipped properties. Optionally, in some embodiments, the calculation comprises applying an increased weighted factor that the unpermitted renovation event has taken place if a property owner's social media displays renovations. Optionally, in some embodiments, the calculation comprises applying an increased weighted factor that the unpermitted renovation event has taken place if a real estate listing displays renovations. Optionally, in some embodiments, the calculation comprises calculating whether a probability threshold has been met.

Optionally, in some embodiments, the confirmation of a correct/incorrect recommendation 706 is initiated by at least one of the candidate and the probability to the candidate validation module, and a verified data 707 regarding the unpermitted renovation event. Per FIG. 7, the confirmation of a correct/incorrect recommendation 706 can then feed back the verified data 707 to at least one of the renovation probability calculation module 703 and the machine learning and filtering engine 703, based on whether or not the correct or incorrect recommendation is provided, to improve its prediction over time.

Optionally, in some embodiments, the verified data 707 is acquired by a public official inspecting a candidate property. Optionally, in some embodiments, the verified data 707 is an issued permit for the renovated event at the initial candidate. Optionally, in some embodiments, the media further comprises a secondary screening module, wherein if the renovation probability module 705 calculates a probability in excess of a predetermined threshold, the secondary screening module proceeds to conduct further screening procedures.

Another aspect disclosed herein is a computer-implemented method of training a neural network for detection of an unpermitted renovation event, the method comprising: collecting a data from a data source by a plurality of data ingestion interfaces; applying one or more data mining task processes to the data from a data source to determine one or more digital unpermitted renovation event indicia; creating a first training set comprising the collected data from a data source, the digital unpermitted renovation event indicia, and a set of digital permitted renovation event indicia; training the neural network in a first stage using the first training set; creating a second training set for a second stage of training comprising the first training set and digital permitted renovation event indicia that are incorrectly detected as unpermitted renovations after the first stage of training; and training the neural network in a second stage using the second training set.

Another aspect provided herein is a computer-implemented method of training a neural network for detection of an unpermitted renovation event, the method comprising: collecting a data from a data source by a plurality of data ingestion interfaces; applying one or more data mining task processes to the data from a data source to determine one or more digital unpermitted renovation event indicia; determining an initial candidate from the data from a data source based on the digital unpermitted event indicia; determining a probability that an unpermitted renovation event has taken or is taking place at the initial candidate creating a first training set comprising the collected digital unpermitted renovation event indicia, the determined probability that the unpermitted renovation event has taken or is taking place at the initial candidate and a set of digital permitted renovation event indicia; training the neural network in a first stage using the first training set; creating a second training set for a second stage of training comprising the first training set and the digital permitted renovation event indicia that are detected to have a set minimum probability that the unpermitted renovation event has taken or is taking place at the initial candidate, after the first stage of training; and training the neural network in a second stage using the second training set.

Another aspect provided herein is a computer-implemented method of training a neural network for detection of an active unpermitted renovation event, the method comprising: collecting a data from a data source by a plurality of data ingestion interfaces; applying one or more data mining task processes to the data from a data source to determine one or more digital active unpermitted renovation event indicia; determining an initial candidate from the data from a data source based on the digital active unpermitted event indicia; determining a probability that an active unpermitted renovation event has taken or is taking place at the initial candidate creating a first training set comprising the collected digital active unpermitted renovation event indicia, the determined probability that the active unpermitted renovation event has taken or is taking place at the initial candidate and a set of digital permitted renovation event indicia; training the neural network in a first stage using the first training set; creating a second training set for a second stage of training comprising the first training set and the digital permitted renovation event indicia that are detected to have a set minimum probability that the active unpermitted renovation event has taken or is taking place at the initial candidate, after the first stage of training; and training the neural network in a second stage using the second training set.

Another aspect disclosed herein is a computer-implemented method of training a neural network for detection of an improper real estate transfer, the method comprising: collecting a data from a data source by a plurality of data ingestion interfaces; applying one or more data mining task processes to the data from a data source to determine one or more digital improper real estate transfer indicia; creating a first training set comprising the collected data from a data source, the digital improper real estate transfer indicia, and a set of digital proper real estate transfer indicia; training the neural network in a first stage using the first training set; creating a second training set for a second stage of training comprising the first training set and digital proper real estate transfer indicia that are incorrectly detected as improper real estate transfers, after the first stage of training; and training the neural network in a second stage using the second training set.

Another aspect provided herein is a computer-implemented method of training a neural network for detection of an improper real estate transfer, the method comprising: collecting a data from a data source by a plurality of data ingestion interfaces; applying one or more data mining task processes to the data from a data source to determine one or more digital improper real estate transfer indicia; determining an initial candidate from the data from a data source based on the digital improper event indicia; determining a probability that an improper real estate transfer has taken or is taking place at the initial candidate creating a first training set comprising the collected digital improper real estate transfer indicia, the determined probability that the improper real estate transfer has taken or is taking place at the initial candidate and a set of digital proper real estate transfer indicia; training the neural network in a first stage using the first training set; creating a second training set for a second stage of training comprising the first training set and the digital proper real estate transfer indicia that are detected to have a set minimum probability that the improper real estate transfer has taken or is taking place at the initial candidate, after the first stage of training; and training the neural network in a second stage using the second training set.

Another aspect provided herein is a computer-implemented method of training a neural network for detection of an active improper real estate transfer, the method comprising: collecting a data from a data source by a plurality of data ingestion interfaces; applying one or more data mining task processes to the data from a data source to determine one or more digital active improper real estate transfer indicia; determining an initial candidate from the data from a data source based on the digital active improper event indicia; determining a probability that an active improper real estate transfer has taken or is taking place at the initial candidate creating a first training set comprising the collected digital active improper real estate transfer indicia, the determined probability that the active improper real estate transfer has taken or is taking place at the initial candidate and a set of digital proper real estate transfer indicia; training the neural network in a first stage using the first training set; creating a second training set for a second stage of training comprising the first training set and the digital proper real estate transfer indicia that are detected to have a set minimum probability that the active improper real estate transfer has taken or is taking place at the initial candidate, after the first stage of training; and training the neural network in a second stage using the second training set.

Another aspect provided herein is a computer-implemented method of training a neural network for detection of an active unpermitted renovation event, the method comprising: collecting a data from a data source by a plurality of data ingestion interfaces; applying one or more data mining task processes to the data from a data source to determine one or more digital active unpermitted renovation event indicia; determining an initial candidate from the data from a data source based on the digital active unpermitted event indicia; determining an estimated time range that an active unpermitted renovation event has taken or is taking place at the initial candidate creating a first training set comprising the collected digital active unpermitted renovation event indicia, the estimated time range that the active unpermitted renovation event has taken or is taking place at the initial candidate and a set of digital time ranges that an active unpermitted renovation event has taken place; training the neural network in a first stage using the first training set; creating a second training set for a second stage of training comprising the first training set and the digital permitted renovation event indicia that are detected to have a set minimum estimated time range that the active unpermitted renovation event has taken or is taking place at the initial candidate, after the first stage of training; and training the neural network in a second stage using the second training set.

Another aspect disclosed herein is a computer-implemented method of training a neural network for detection of an improper residency status, the method comprising: collecting a data from a data source by a plurality of data ingestion interfaces; applying one or more data mining task processes to the data from a data source to determine one or more digital improper residency status indicia; creating a first training set comprising the collected data from a data source, the digital improper residency status indicia, and a set of digital proper residency status indicia; training the neural network in a first stage using the first training set; creating a second training set for a second stage of training comprising the first training set and digital proper residency status indicia that are incorrectly detected as improper residencies after the first stage of training; and training the neural network in a second stage using the second training set.

Another aspect provided herein is a computer-implemented method of training a neural network for detection of an improper residency status, the method comprising: collecting a data from a data source by a plurality of data ingestion interfaces; applying one or more data mining task processes to the data from a data source to determine one or more digital improper residency status indicia; determining an initial candidate from the data from a data source based on the digital improper event indicia; determining a probability that an improper residency status has taken or is taking place at the initial candidate creating a first training set comprising the collected digital improper residency status indicia, the determined probability that the improper residency status has taken or is taking place at the initial candidate and a set of digital proper residency status indicia; training the neural network in a first stage using the first training set; creating a second training set for a second stage of training comprising the first training set and the digital proper residency status indicia that are detected to have a set minimum probability that the improper residency status has taken or is taking place at the initial candidate, after the first stage of training; and training the neural network in a second stage using the second training set.

Another aspect provided herein is a computer-implemented method of training a neural network for detection of an active improper residency status, the method comprising: collecting a data from a data source by a plurality of data ingestion interfaces; applying one or more data mining task processes to the data from a data source to determine one or more digital active improper residency status indicia; determining an initial candidate from the data from a data source based on the digital active improper event indicia; determining a probability that an active improper residency status has taken or is taking place at the initial candidate creating a first training set comprising the collected digital active improper residency status indicia, the determined probability that the active improper residency status has taken or is taking place at the initial candidate and a set of digital proper residency status indicia; training the neural network in a first stage using the first training set; creating a second training set for a second stage of training comprising the first training set and the digital proper residency status indicia that are detected to have a set minimum probability that the active improper residency status has taken or is taking place at the initial candidate, after the first stage of training; and training the neural network in a second stage using the second training set.

Another aspect disclosed herein is a computer-implemented method of training a neural network for detection of an improper tax status, the method comprising: collecting a data from a data source by a plurality of data ingestion interfaces; applying one or more data mining task processes to the data from a data source to determine one or more digital improper tax status indicia; creating a first training set comprising the collected data from a data source, the digital improper tax status indicia, and a set of digital proper tax status indicia; training the neural network in a first stage using the first training set; creating a second training set for a second stage of training comprising the first training set and digital proper tax status indicia that are incorrectly detected as improper tax status after the first stage of training; and training the neural network in a second stage using the second training set.

Another aspect provided herein is a computer-implemented method of training a neural network for detection of an improper tax status, the method comprising: collecting a data from a data source by a plurality of data ingestion interfaces; applying one or more data mining task processes to the data from a data source to determine one or more digital improper tax status indicia; determining an initial candidate from the data from a data source based on the digital improper event indicia; determining a probability that an improper tax status has taken or is taking place at the initial candidate creating a first training set comprising the collected digital improper tax status indicia, the determined probability that the improper tax status has taken or is taking place at the initial candidate and a set of digital proper tax status indicia; training the neural network in a first stage using the first training set; creating a second training set for a second stage of training comprising the first training set and the digital proper tax status indicia that are detected to have a set minimum probability that the improper tax status has taken or is taking place at the initial candidate, after the first stage of training; and training the neural network in a second stage using the second training set.

Another aspect provided herein is a computer-implemented method of training a neural network for detection of an active improper tax status, the method comprising: collecting a data from a data source by a plurality of data ingestion interfaces; applying one or more data mining task processes to the data from a data source to determine one or more digital active improper tax status indicia; determining an initial candidate from the data from a data source based on the digital active improper event indicia; determining a probability that an active improper tax status has taken or is taking place at the initial candidate creating a first training set comprising the collected digital active improper tax status indicia, the determined probability that the active improper tax status has taken or is taking place at the initial candidate and a set of digital proper tax status indicia; training the neural network in a first stage using the first training set; creating a second training set for a second stage of training comprising the first training set and the digital proper tax status indicia that are detected to have a set minimum probability that the active improper tax status has taken or is taking place at the initial candidate, after the first stage of training; and training the neural network in a second stage using the second training set.

At least one of the first stage of training and the second stage of training can employ a similarity metric to find large datasets which are similar to a small hand-annotated dataset. At least one of the first stage of training and the second stage of training can be refined and re-trained using human feedback. In some embodiments, at least one of the first stage of training and the second stage of training comprises a distant supervision method. The distant supervision method can create a large training set seeded by a small hand-annotated training set. The distant supervision method can comprise positive-unlabeled learning with the training set as the 'positive' class. The distant supervision method can employ a logistic regression model, a recurrent neural network, or both. The recurrent neural network can be advantageous for Natural Language Processing (NLP) machine learning. In some embodiments, at least one of the first stage of training and the second stage of training comprises a human annotated method. The human annotated method can employ labels can be provided by a hand-crafted heuristic. For example, the hand-crafted heuristic can comprise examining differences between public and county records. The semi-supervised labels can be determined using a clustering technique to find properties similar to those flagged by previous human annotated labels and previous semi-supervised labels. The semi-supervised labels can employ an XGBoost, a neural network, or both.

Assigning Unpermitted Renovation Visit to Inspectors

Figure 8:
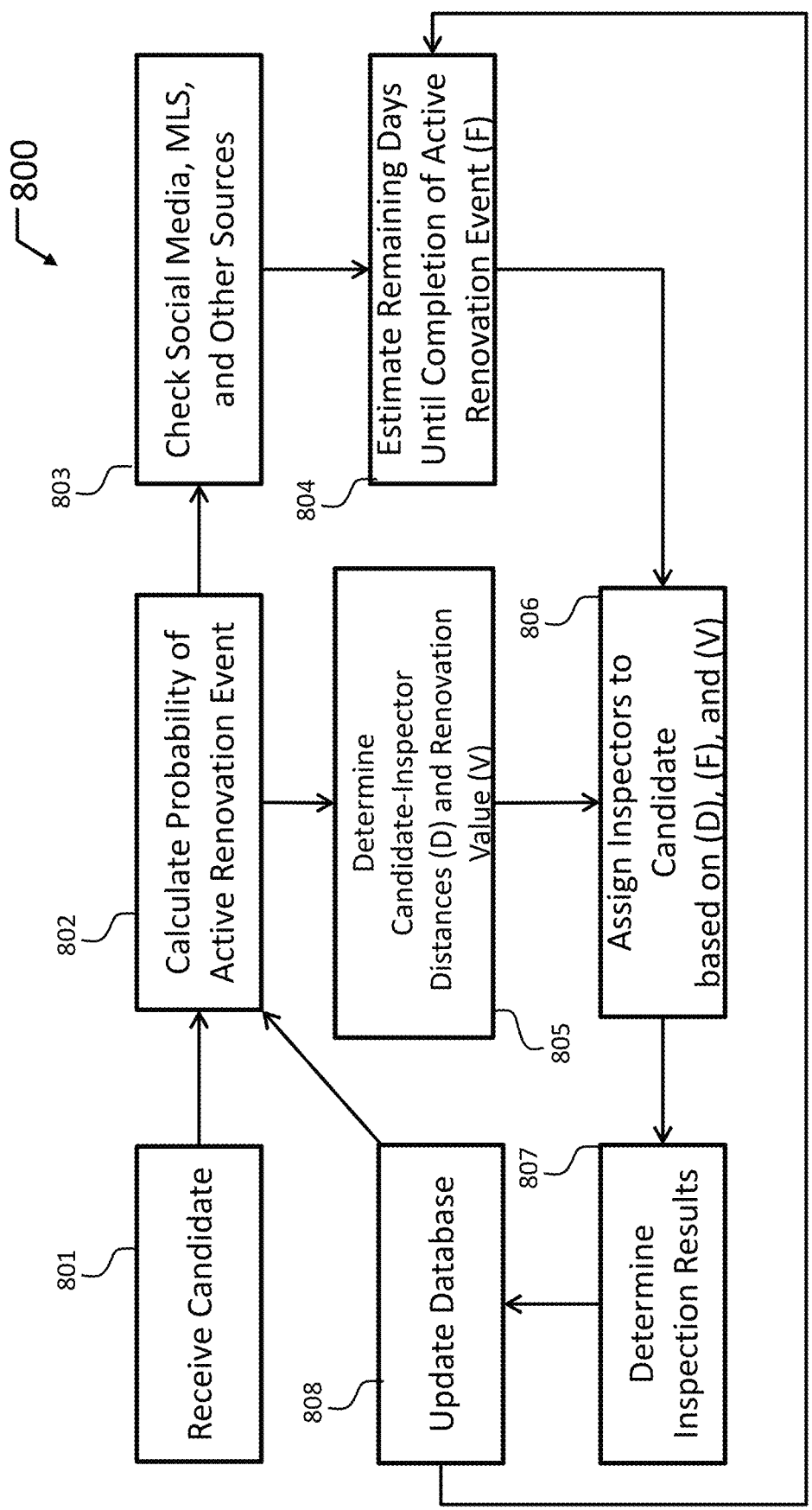
FIG. 8 is a non-limiting example of a schematic diagram; in this case, an exemplary application to assign unpermitted renovation visit to inspectors after receiving a candidate and validating the assignment, in accordance with some embodiments.

FIG. 8 is an exemplary schematic diagram of an exemplary application to assign unpermitted renovation visit to inspectors, in accordance with some embodiments. As seen in FIG. 8, the exemplary application to assign unpermitted renovation visit to inspectors 800 comprises a receiving a candidate 801, calculating a probability of active renovation event 802, checking social media, MLS, and other sources 803, determining remaining days until completion of active renovation event (F) 804, determining candidate-inspector distances 805, assigning inspectors to candidate based on (D) and (F) 806, determining inspection results 807, and updating the database 808. Alternatively, the application to assign unpermitted renovation visit to inspectors 800 comprises a receiving a candidate 801, calculating a probability of active renovation event 802, checking social media, MLS, and other sources 803, and determining remaining days until completion of active renovation event (F) 804. In some embodiments, the application to assign unpermitted renovation visit to inspectors 800 does not comprise determining candidate-inspector distances 805, assigning inspectors to candidate based on (D) and (F) 806, determining inspection results 807, or updating the database 808.

As seen in FIG. 8, the application to detect an unpermitted renovation event at a candidate and validate the detected event can further comprise an application to assign inspectors to the candidate 800. In some instances, the authorities who enforce the various regulations have a limited number of inspectors and other sources. Hence, in some instances, it can occur that the ability to find such properties can exceed the ability of the appropriate authorities to undertake inspection or enforcement action. Accordingly, in some instances, it is beneficial to prioritize the list of properties for the authorities to optimize or maximize the efficiency of inspecting or taking enforcement action depending on the kind of renovation. Optionally, in some embodiments, it is also or alternatively beneficial to prioritize the list of active renovation event by an estimation of the value of the renovation, amount of dollars spent on the renovation, the potential fee and penalties to be collected, or impact on property taxes.

Data mining techniques can be used to identify unpermitted renovations. In many instances, it is easier for the authority to act upon an active renovation than a historical one because the authority can just go to the property to observe the activity as it is going on. It is particularly advantageous to identify those properties while the renovation is still in progress. The inspection assignment applications herein are further configured to properly assign potential unpermitted properties to inspectors, to ensure that a maximum quantity and/or quality of potential evidence can be collected.

Per FIG. 8, in some embodiments, the application to assign unpermitted renovation visit to inspectors 800 comprises receiving a candidate 801, as determined per FIG. 1, 2, or 3. The application calculates the probability of an active renovation event occurring at the candidate 802. Optionally, in some embodiments, the application then checks social media, MLS data, and other sources 803 to determine an estimated remaining number of days until completion of the active renovation event (F) 804. Optionally, in some embodiments, the application can further determine the candidate-inspector distances (D) 805. Optionally, in some embodiments, the application can further determine the location of other scheduled inspections for the candidate-inspector. Optionally, in some embodiments, the application can further determine the infringement type and the appropriate candidate-inspector skill. Optionally, in some embodiments, the application can further determine whether there is the potential to inspect at an Open House (e.g., inspect indoors and easily access other areas in the property not normally easily viewable or accessible from outdoors) if one is scheduled. In further embodiments, the application can assign inspectors to the candidate based on the (D) distance from the property and the one or more candidates and (F) 806. Subsequently, the inspector can determine inspection results 807, and update the database 808 with any garnered information. Optionally, in some embodiments, the application to assign unpermitted renovation visit to inspectors 800 is permitted to run automatically every period of time to schedule and/or reschedule the property-inspector assignments. Optionally, in some embodiments, the period of time is equal to, one minute, thirty minutes, one hour, 12 hours, one day, one week, one month, or one year.

Optionally, in some embodiments, the calculation of the probability of an active renovation event is based on at least one of the recency of the purchase date, the recency of an unpermitted renovation indicia, the flip probability, and the determination that the owner is a corporation. The indicia of active renovations can comprise a current renovation probability factor that the predicted unpermitted renovation at the candidate property comprises an active renovation. Optionally, in some embodiments, checking social media, MLS data, and other sources 803 garners further indicia of active renovations. These further indicia can be used to recalculate the active renovation probability event factor, and/or to increase confidence in the active renovation event probability factor. Further, checking social media, MLS data, and other sources 803 can provide further evidence necessary to determine an estimated number of days remaining in the renovation (F) 804. Optionally, in some embodiments, the calculation of the probability of an active renovation event 802 is further associated with a determination of the number for remaining renovation days (F) 804. Checking social media, MLS data, and other sources 803 can comprise reviewing street or satellite images, determining specific social media indicia such as the terms "stage," "almost done," or "halfway there." Optionally, in some embodiments, the estimation is based on the remaining amount of time until completion of an active renovation event. Optionally, in some embodiments, the active renovation event is further prioritized by an estimation of the value of the renovation, since fees and penalties can depend on this value.

Such evidence necessary to determine an estimated number of days or time remaining in the renovation (F) 804 can comprise evidence of the purchase or use of materials, tools, or services associated with early or late stages of construction. Materials associated with early stages of construction can comprise, for example, wood or concrete, whereby materials associated with later stages of construction can comprise, for example, paint, plaster, appliances and fixtures. Tool rentals or purchases associated with early stages of construction can comprise, for example, demolition bins and jack hammers, whereby materials associated with later stages of construction can comprise, for example, paintbrushes, and tile cutters. Services associated with early stages of construction can comprise, for example, waste removal and plumbing, whereby services associated with later stages of construction can comprise, for example, electrical instillation, and appliance delivery.

The determination of a property-inspector distance (D) 805 ensures optimal use of the available inspectors. Optionally, in some embodiments, the property-inspector distance (D) comprises a distance between the address of the property and the inspector's home address, the governmental agency's address, a prior inspection property, or any combination thereof. The (D) value associated with one inspector can be equal to the (D) value of one or more other inspectors. The (D) value associated with one inspector can be unequal to the (D) value of one or more other inspectors. Optionally, in some embodiments, the prior inspection property comprises 2, 3, 4, 5, 6, 7, 8, 9, 10, or more inspection properties.

To ensure high inspector efficiency, and that the most amount of candidate properties are inspected during potential active construction, the inspector is assigned to inspect a property based on D and F 806. Optionally, in some embodiments, the inspector is assigned to inspect a property 806 by assigning properties in order by ascending D values and ascending F values. Optionally, in some embodiments, the inspector is assigned to inspect a property 806 by assigning properties in order by ascending F values and ascending D values. Optionally, in some embodiments, the D and F are used to calculate an inspection efficiency parameter (n), wherein a high n value correlates with inspection urgency and efficacy. Optionally, in some embodiments, the inspection efficiency parameter is calculated as:

$$n = \frac{1}{D + F}$$

In other embodiments, the inspection efficiency parameter is calculated as:

$$n = \frac{1}{aD + bD^2 + cF + eF^2 + gDF + h(DF)^2}$$

where (a), (b), (c), (e), (g), and (h) are set constants. Optionally, in some embodiments, at least one of the (a), (b), (c), (e), (g), and (h) constants are equal to zero. Optionally, in some embodiments, the (a), (b), (c), (e), (g), and (h) constants are determined by a machine learning algorithm. The (n) value can be calculated for each inspector within a plurality of inspectors. Alternatively, the inspection efficiency parameter can be based on the logarithm of F, which becomes more important as it approaches 1. As such, the inspection efficiency parameter is calculated as:

$$n = \frac{1}{D + \log(F - 1)}$$

Additional parameters, beyond (D) and (F) can be used to assign inspectors to properties, such as a parameter associated with the seniority of the inspector, a parameter associated with the specific skills of the inspector, a parameter associated with the inspection history of the inspector, the value of the renovation, or any combination thereof.

Further, the inspector is assigned to inspect a property based on D and F 806 to maximize the (n) value among a plurality of inspectors and the plurality of properties, whereby:

$$\sum_{i}^{K} \sum_{p}^{Q} n(i, p) = \text{Max}$$

where k is the number of inspectors, and wherein Q is the number of properties. In some cases, the inspector is further assigned to a property based on their current availability and schedule. Optionally, in some embodiments, two or more inspectors are assigned to the same number of properties. Optionally, in some embodiments, two or more inspectors are assigned to the different number of properties. Optionally, in some embodiments, the number of inspectors is 2 to about 10,000. Optionally, in some embodiments, the number of inspectors is at least 2.

Once the inspectors are assigned to inspect a property based on D and F 806, the inspection results are determined 807 by the assigned inspector, and the database can be updated 808 with any determined information. Optionally, in some embodiments, updating the database 808 improves the machine learning capabilities in this or other applications disclosed herein.

Figure 9:
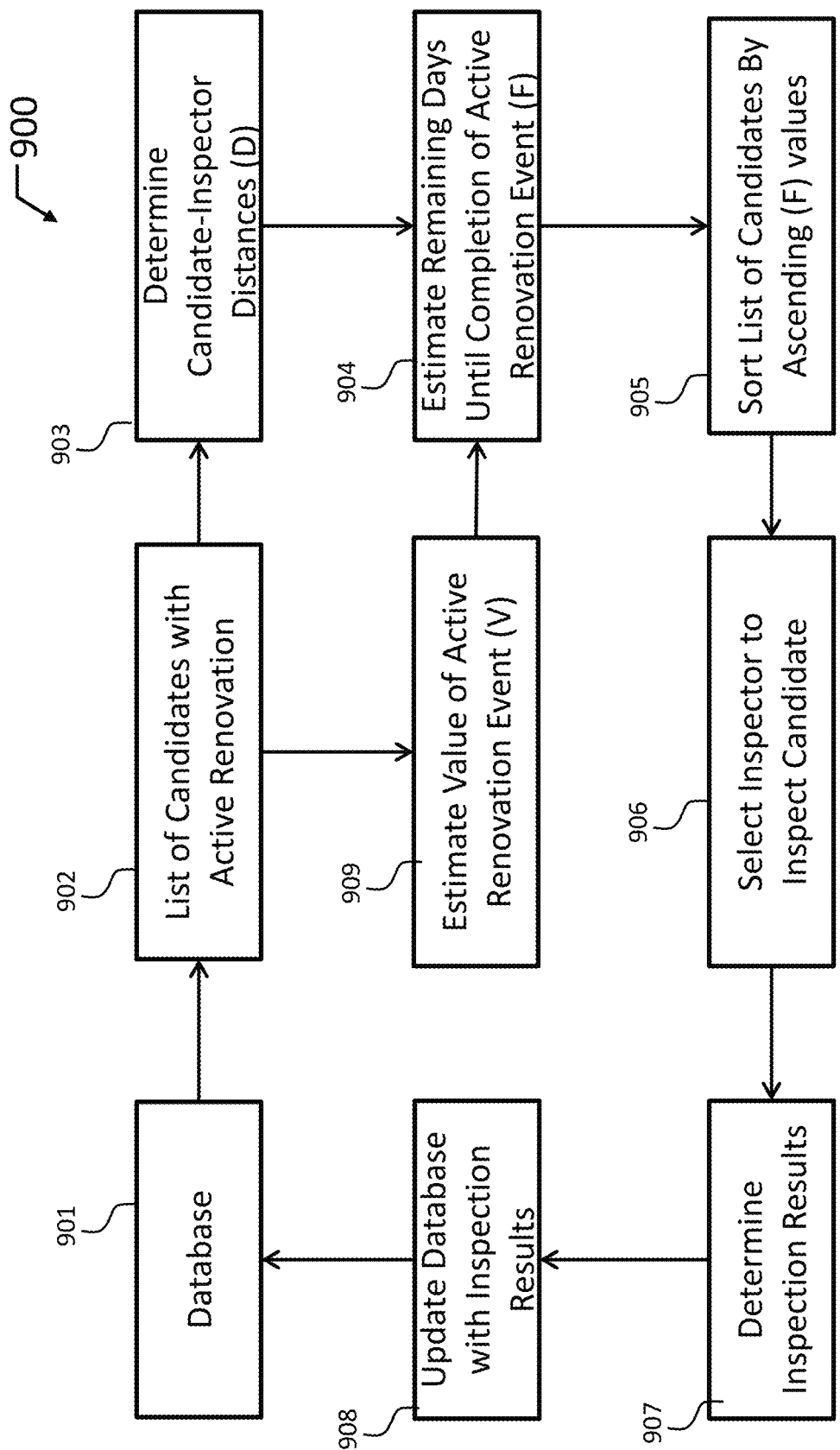
FIG. 9 is a non-limiting example of a schematic diagram; in this case, an exemplary application to prioritize inspection of unpermitted renovation candidates and validate the prioritization, in accordance with some embodiments.

Per FIG. 9, in some embodiments, the application to prioritize inspection of unpermitted renovation candidates and validate the prioritization 900 is provided herein. Optionally, in some embodiments, the application comprises a database 901. A list of candidates with active renovation is provided 902. The application determines the candidate-inspector distances (D) 903 and also estimates the remaining days until completion of active renovation event (F) 904. The application then sorts the list of candidates by ascending (F) values 905. Optionally, in some embodiments, the application additionally or alternatively sorts the list of candidates by an estimation of the value of the renovation. The application continues by selecting an inspector to inspect the candidate 906. Subsequently, the inspector can determine inspection results 907, and update the database 908 with any garnered information. Optionally, in some embodiments, the application to assign unpermitted renovation visit to inspectors 900 is permitted to run automatically every period of time to schedule and/or reschedule the property-inspector assignments. Optionally, in some embodiments, the period of time is equal to, one minute, thirty minutes, one hour, 12 hours, one day, one week, one month, or one year.

Optionally, in some embodiments, the database comprises of information from a plurality of data mining task processes. Optionally, in some embodiments, the data mining task process comprises a natural learning task process, numerical data mining task process, or a photographic data mining task process. Optionally, in some embodiments, the data mining task processes incorporates feeds from sources that are photographic or numerical.

Figure 10:
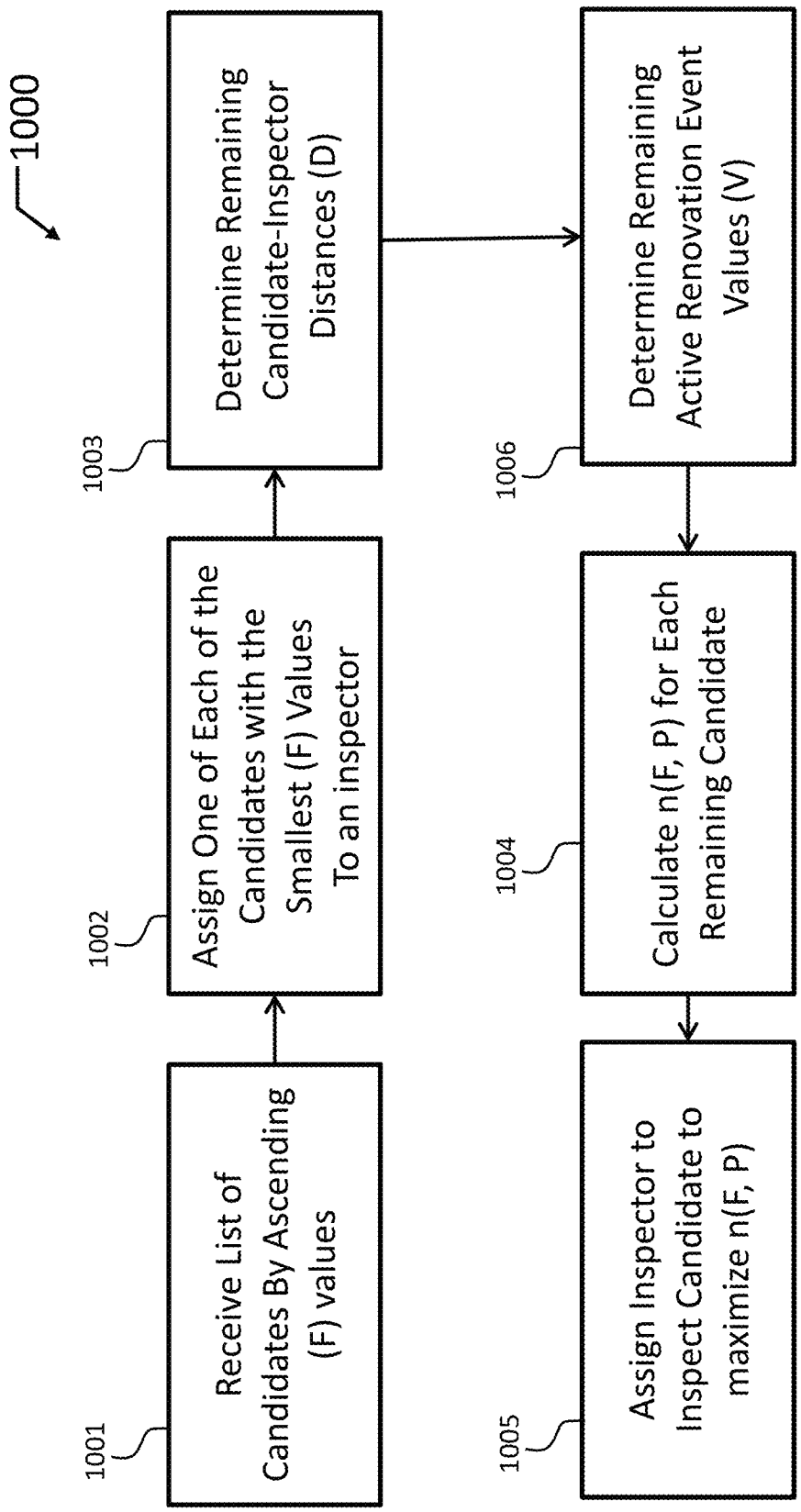
FIG. 10 is a non-limiting example of a schematic diagram; in this case, an exemplary application to prioritize inspection of unpermitted renovation candidates, in accordance with some embodiments.

Per FIG. 10, in some embodiments, the application to prioritize inspection of unpermitted renovation events 1000 is provided herein. Optionally, in some embodiments, the application receives a list of candidates by ascending (F) values 1001. The application then assigns one of each of the candidates with the smallest (F) values to an inspector 1002. The application then determines the remaining candidate-inspector distances (D) 1003. The application then calculates n (F,P) for each remaining candidate 1004. The application then assigns inspectors to inspect a candidate to maximize n (F,P) 1005. Optionally, in some embodiments, the application additionally or alternatively prioritizes the list of candidates by an estimation of the value of the renovation.

Detecting an Improper Real Estate Transfer Event

Additionally, provided herein are methods, systems, and platforms, which employ various data sources and techniques to identify undocumented current and past changes in ownership with missing or fraudulent value re-assessments. Further, detection of the true responsible directors and shareholders involved enables swift and judicious prosecution of any guilty parties.

Figure 11:
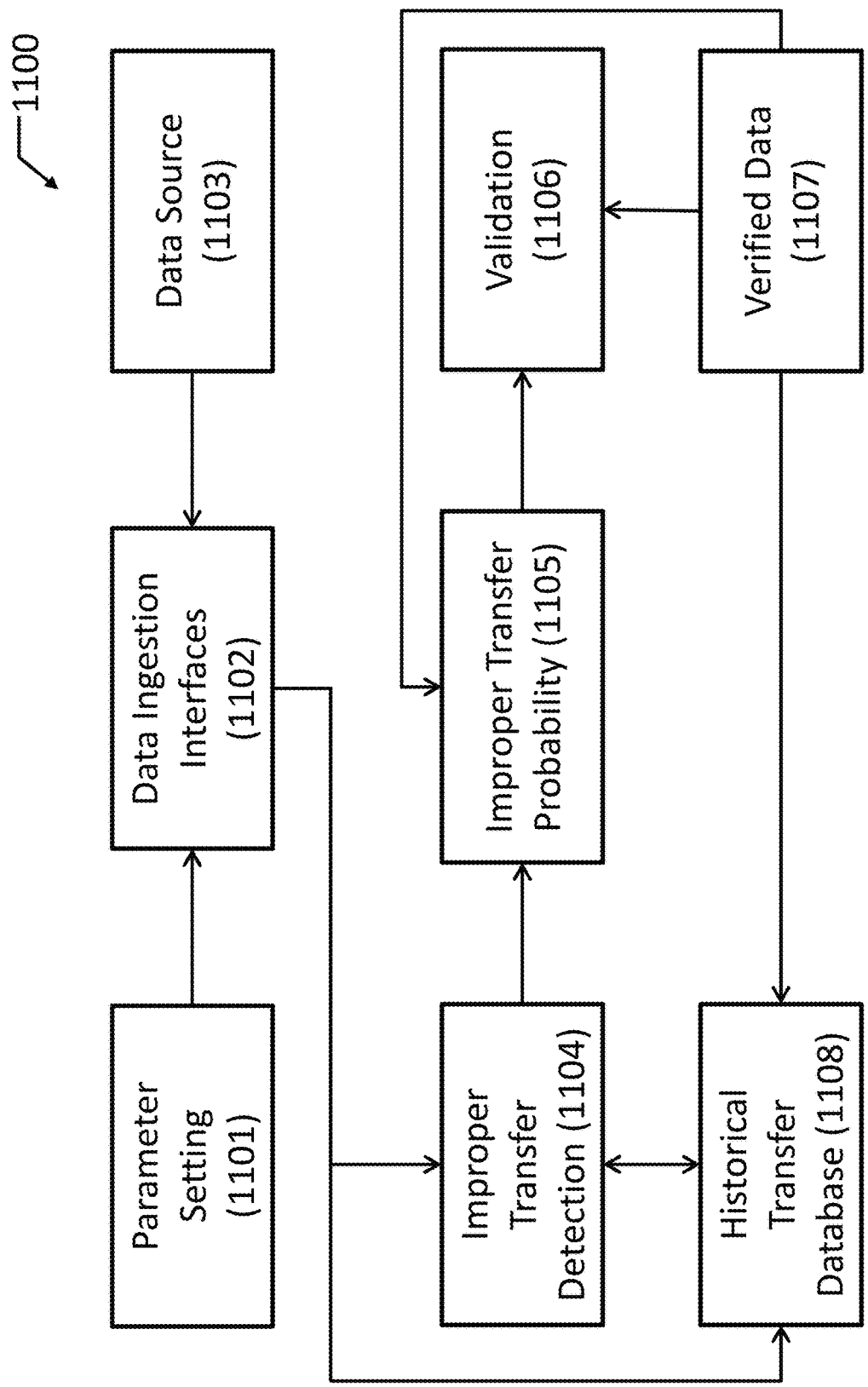
FIG. 11 is a non-limiting example of a schematic diagram; in this case, an exemplary application to detect an improper real estate transfer event, in accordance with some embodiments.

FIG. 11 shows an exemplary non-transitory computer-readable storage media encoded with a computer program including instructions executable by a processor to create an application to detect an improper real estate transfer event 1100. Optionally, in some embodiments, the application 1100 comprises a parameter setting module 1101, a plurality of data ingestion interfaces 1102, an improper transfer detection module 1104, an improper real estate transfer probability calculation module 1105, and a validation module 1106.

Optionally, in some embodiments, the parameter setting module 1101 defines a data set to be evaluated. Optionally, in some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points.

Optionally, in some embodiments, each of the plurality of data ingestion interfaces 1102 is connected to a unique external interface 1103. Each interface can be configured to perform a data mining task process to detect one or more real estate transfer indicia within the data set. Optionally, in some embodiments, the data mining task process comprises a natural language process, numerical data mining process, or a photographic data mining task process. Optionally, in some embodiments, the natural language task process comprises syntax interpretation, semantic interpretation, discourse interpretation, or speech interpretation. Optionally, in some embodiments, the syntax interpretation comprises lemmatization, morphological segmentation, part-of-speech tagging, parsing, sentence boundary disambiguation, stemming, word segmentation, or terminology extraction. Optionally, in some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, or word sense disambiguation. Optionally, in some embodiments, the discourse interpretation comprises automatic summarization, coreference resolution, or discourse analysis. Optionally, in some embodiments, the speech interpretation comprises speech recognition, speech segmentation, and text-to-speech. Optionally, in some embodiments, the external interfaces 1103 comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, or the Internet.

Optionally, in some embodiments, the improper transfer detection module 1104 applies a machine learning algorithm to identify an initial candidate based on the real estate transfer indicia within the data set. Optionally, in some embodiments, the real estate indicia comprises a valuation of a property, a change in a valuation of the property, a current ownership of the property, a past ownership of the property, a lender on a property, a ownership percentage of the property, or a liens on a property. Optionally, in some embodiments, the machine learning algorithm identifies an initial candidate if at least one of the current ownership and the past ownership of the initial candidate comprises a corporation. Optionally, in some embodiments, the machine learning algorithm identifies an initial candidate if the corporation comprises a title holding trust. Optionally, in some embodiments, the machine learning algorithm identifies an initial candidate if the ownership percentage of the property changes by more than 49.9%. A title holding trust can comprise a trust by which the real estate is conveyed to a trustee under an arrangement reserving to the beneficiaries the full management and control of the property. The beneficiaries of a title holding trust may not be of public record. Optionally, in some embodiments, the machine learning algorithm further determines the beneficiaries indirectly through public records and media.

The improper real estate transfer probability calculation module 1105 can calculate a probability that the improper real estate transfer event has taken place at the initial candidate. Optionally, in some embodiments, the calculation comprises applying an increased weighted factor that the improper real estate transfer event has taken place if at least one of the current ownership and the past ownership of the initial candidate comprises a corporation. Optionally, in some embodiments, the calculation comprises applying an increased weighted factor that the improper real estate transfer event has taken place if the corporation comprises a title holding trust. Optionally, in some embodiments, the calculation comprises applying an increased weighted factor that the improper real estate transfer event has taken place if the ownership percentage of the property changes by more than 49.9%. Optionally, in some embodiments, the calculation comprises applying an increased weighted factor that the improper real estate transfer event has taken place if the ownership percentage of the property changes without an associated assessment. Optionally, in some embodiments, the calculation further applying an increased weighted factor if the true beneficiaries have previously conducted an improper transfer. Optionally, in some embodiments, the weight factor comprises a parameter defining an importance associated with a particular real estate transfer indicia or value of the real estate transfer indicia.

Optionally, in some embodiments, the calculation comprises calculating whether a probability threshold has been met. Optionally, in some embodiments, the probability threshold can be modified by the validation module based on the verified data. If the corporation is detected to be a trust, the true ownership of the initial candidate can be detected by identifying the beneficial owners through public trust data, MLS data, social media data, or any other public or semi-public source. The improper real estate transfer event can comprise a misreported transaction value, a misreported sales value, a misreported property value, or any combination thereof.

Optionally, in some embodiments, the validation module 1106 accepts verified data 1107 regarding the real estate transfer event and feeds back the verified data 1107 to the improper real estate transfer probability calculation module 1105 to improve its calculation over time. Optionally, in some embodiments, the verified data 1107 is acquired by a public official inspecting the candidate property. The verified data 1107 by one or more inspectors can be received and/or distributed by any methods or systems described herein.

Optionally, in some embodiments, the application further comprises a historical transfer database 1108 receiving and storing a plurality of the real estate transfer indicia from the plurality of data ingestion interfaces. The historical transfer database 1108 can transmit one or more of the plurality of stored real estate transfer indicia to the improper transfer detection module 1104. Optionally, in some embodiments, the stored real estate transfer indicia comprises a sequence of transfers regarding a real estate unit. Optionally, in some embodiments, the historical transfer database 1108 further receives a plurality of the initial candidates from the improper real estate transfer detection module 1104 and appends the each of the initial candidates to at least one of the stored real estate transfer indicia. Optionally, in some embodiments, the historical transfer database 1108 stores verified data 1107. Optionally, in some embodiments, the improper transfer detection module 1104 applies the machine learning algorithm to identify the initial candidate based further on the initial candidates appended to the plurality of stored real estate transfer indicia.

The stored real estate transfer indicia can comprise real estate indicia over a certain period of time. The stored real estate transfer indicia can comprise a consecutive series of real estate indicia over a certain period of time. Storing the real estate transfer indicia can comprise appending the real estate transfer indicia to records associated with the property, the buyer, the seller, the loan officer, the zip code, or any combination thereof. In some embodiments, the historical transfer database remembers a sequence of transfers.

Determining when One or More Unpermitted Renovation Events has Taken Place

Additionally, provided herein are methods, systems, and platforms, which employ various data sources and techniques to determine when one or more unpermitted renovation events has taken place. Further, detection of the time of the unpermitted renovation enables accurate and fair collection of associated renovation taxes.

It can be assumed that a particular property as having been renovated at some time in the past has been identified, and hence that the current assessment is incorrect and probably undervalued. The appropriate authority would like to appropriately re-assess the property to increase the amount of property tax collected in future.

Federal, state, and county real estate taxes can employ "escape fees" to collect back taxes for misassessed valuations. For example, if the square footage of the property was recorded in error by the government, the property owner can owe four years of escape fees. However if the misassessment is at the fault of the owners, escape fees can be charged, for instance, for up to eight years. The escape fee can be dependent on the term during which the real estate property was incorrectly valued. As such, knowledge of the start date of such renovations is greatly advantageous towards proper escape fee collection.

Figure 12:
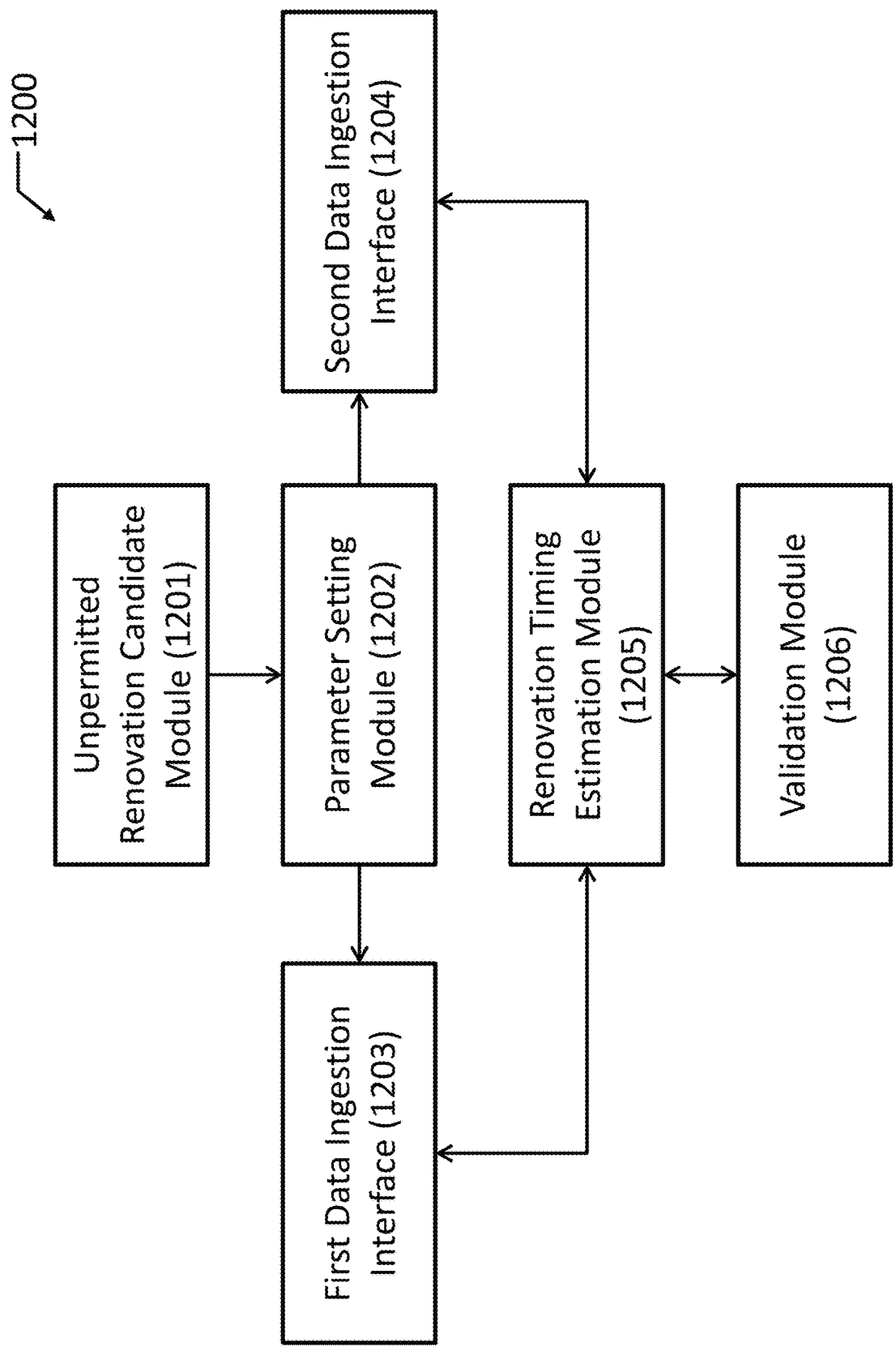
FIG. 12 is a non-limiting example of a schematic diagram; in this case, an exemplary application to determine when one or more unpermitted renovation events has taken place to an unpermitted renovation candidate, in accordance with some embodiments.

FIG. 12 shows an exemplary non-transitory computer-readable storage media encoded with a computer program including instructions executable by a processor to create an application to determine when one or more unpermitted renovation events has taken place to an unpermitted renovation candidate. Optionally, in some embodiments, the application 1200 comprises: an unpermitted renovation candidate module 1201, a parameter setting module 1202, a set of first data ingestion interfaces 1203, a set of second data ingestion interfaces 1204, a renovation timing estimation module 1205, and a validation module 1206. In some embodiments, the application 1200 further comprises a set of third data ingestion interfaces, a fourth set of data ingestion interfaces, or more sets of data ingestion interfaces. In some embodiments, at least one of the set of third data ingestion interfaces, the fourth set of data ingestion interfaces, or more of the sets of data ingestion interfaces can be initiated by a user.

In some embodiments, the application 1200 further comprises a second data source filter module. The second data source filter module can be configured to allow a user to filter the second data mining task process to the second data source.

The unpermitted renovation candidate module 1201 can present an unpermitted renovation candidate. The unpermitted renovation candidate can comprise an address, a GPS coordinate, a land plot indicator, or any combination thereof. The parameter setting module 1202 can define a data set to be evaluated.

Each of the first data ingestion interfaces 1203 can connect to a first data source. Each of the first data ingestion interfaces 1203 can be configured to perform a data mining task process to a first data source. The data mining task process can determine an initial time range within the data set. The initial time range can represent when at least one unpermitted renovation event has taken place at the unpermitted renovation candidate. In some embodiments, the initial time range comprises a time range from a current time to when the unpermitted renovation event was assessed according to the first data source. In some embodiments, the first data source comprises city property records, county property records, city permit records, county permit records, and state business records.

Each of the second set of second data ingestion interfaces 1204 can connect to a second data source. Each second data ingestion interfaces 1204 can be configured to perform a data mining task process to the second data source. The data mining task process can detect one or more unpermitted renovation timing indicia within the data set when the at least one unpermitted renovation event has taken place at the unpermitted renovation candidate. In some embodiments, the second data source comprises public sources, licensed data feeds, sources depicting historical water usage at the unpermitted renovation candidate, sources depicting historical energy usage at the unpermitted renovation candidate, contractor web sites, Yelp, Craigslist, Wayback Machine, financial documents, photographs from aerial surveys, Google Earth, Google Streetview, rental records for dumpsters, rental records for portable restrooms, serial numbers, manufacturer warranty records, Home Owner's Association records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, or the Internet.

In some embodiments, a third data ingestion interfaces can be configured to perform a data mining task process to a third data source. In some embodiments, a fourth data ingestion interfaces can be configured to perform a data mining task process to a fourth data source. The third data source can comprise a data source from the first data source, the second data source, or both. The fourth data source can comprise a data source from the first data source, the second data source, the third data source, or both. The third data source can comprise a data source that is not in the first data source, the second data source, or both. The fourth data source can comprise a data source that is not in the first data source, the second data source, or both.

In some embodiments, at least one of the first data source and the second data source comprises contractor records of renovations, contractor web site photos, or contractor web site testimonials. In some embodiments, at least one of the first data source and the second data source comprises an online review or an online listing by a contractor. In some embodiments, at least one of the first data source and the second data source comprises publicly available website data that is no longer actively displayed. Such archival data can be associated with a time of publication. Such archival data can be received by such sources as "the Wayback Machine." In some embodiments, at least one of the first data source and the second data source comprises a manufacturer warranty record including a date of installation.

The renovation timing estimation module 1205 can apply a machine learning algorithm to present a refined renovation time range. The renovation timing estimation module 1205 can alternatively or further apply a rule-based algorithm to present the refined renovation time range. In some embodiments, the renovation timing estimation module 1205 feeds input to the first ingestion interface 1203 to allow the first ingestion interface to focus its ingestion. In some embodiments, the renovation timing estimation module 1205 feeds input to the second ingestion interface 1204 to allow the second ingestion interface to focus its ingestion. The renovation timing estimation module 1205 can apply a machine learning algorithm to present a refined renovation time range based on the detected initial time range and the detected unpermitted renovation timing indicia. In some embodiments, the refined renovation time range comprises a narrower time range than the initial time range. In some embodiments, the unpermitted renovation timing indicia comprises increase in water usage, decrease in water usage, increase in energy usage, decrease in energy usage, permanent change in water usage, permanent change in energy usage, records of renovations from Internet sources, documentation reflecting refinanced mortgages, documentation reflecting home equity lines of credit, photographs depicting structural changes, records reflecting renovation work, records reflecting renovation waste, serial numbers reflecting new appliances, windows, or air conditioners, or manufacturer warranty records reflecting dates of installation. The renovation timing estimation module 1205 can further apply a machine learning algorithm to present a further refined renovation time range based on the detected unpermitted renovation indicia generated by the set of third data ingestion interfaces, the fourth set of data ingestion interfaces, or by more sets of data ingestion interfaces. The renovation timing estimation module 1205 can further apply a machine learning algorithm to present a first refined renovation time range, a second renovation time range, or more renovation time ranges based on the detected unpermitted renovation indicia generated by the set of third data ingestion interfaces, the fourth set of data ingestion interfaces, or by more sets of data ingestion interfaces.

An increase or decrease in water usage can indicate an unpermitted renovation event comprising the addition of landscaping features, a swimming pool, a kitchen, a bathroom, a sink, or any combination thereof. An increase or decrease in electricity usage can indicate an unpermitted renovation event comprising the addition of rooms, heating and ventilation equipment, kitchens, or both. A sudden increase in energy use can indicate the use of construction tools during an unpermitted renovation event.

At least one of the second data and the unpermitted renovation timing indicia can comprise aerial surveys, Google Earth, Google Streetview and other images, wherein at least one of the data mining task process and the machine learning algorithm performs a historical comparison of images, 3D data, or both to detect structure changes over time, evidence of construction workers and demolition, presence of dumpsters, bare roofs. At least one of the second data and the unpermitted renovation timing indicia can comprise financial documents such as refinanced mortgages and home equity lines of credit, which can be indicative, via the data mining task process or the machine learning algorithm, of the date of a renovation and the renovation value. At least one of the second data and the unpermitted renovation timing indicia can comprise a manufacturer instillation warrantee, wherein at least one of the data mining task process and the machine learning algorithm associate the date of installation therein can be associated with a candidate real estate property. At least one of the second data and the unpermitted renovation timing indicia can comprise HOA records wherein at least one of the data mining task process and the machine learning algorithm are configured to detect a requested renovation date. Some of the second data and the unpermitted renovation timing indicia can indicate that renovation that work was in progress on particular dates. Combinations of the second data and the unpermitted renovation timing indicia may can be used to determine if there were more than one renovation projects for the same candidate property.

The validation module 1206 can accept verified data regarding the timing of the unpermitted renovation event. The validation module 1206 can further feed back the verified data to the renovation timing estimation module 1205 to improve its prediction over time.

Detecting an Improper Residency Status for a Real Estate Property

Additionally, provided herein are methods, systems, and platforms, which employ various data sources and techniques to detect an improper residency status for a real estate property. Further, detection of improper residency status for a real estate property enables accurate and fair collection of associated residency taxes. The residency status can comprise a primary residence status and a vacation residence status. Primary residence status can be defined at a real estate property at which the owner or owners resides for more than half of the year. Vacation residence status can be defined at a real estate property at which the owner or owners resides for less than half of the year. Ownership of a primary residence is often associated with different tax laws and requirements than ownership of a vacation residence. Mortgage interest may only be deducted on properties that are used exclusively as a residence. Such improper residency status can comprise claiming a real estate property as a primary residence when it is a vacation residence status. Further, residency status can be used to determine which school or school district a child can attend.

Figure 13:
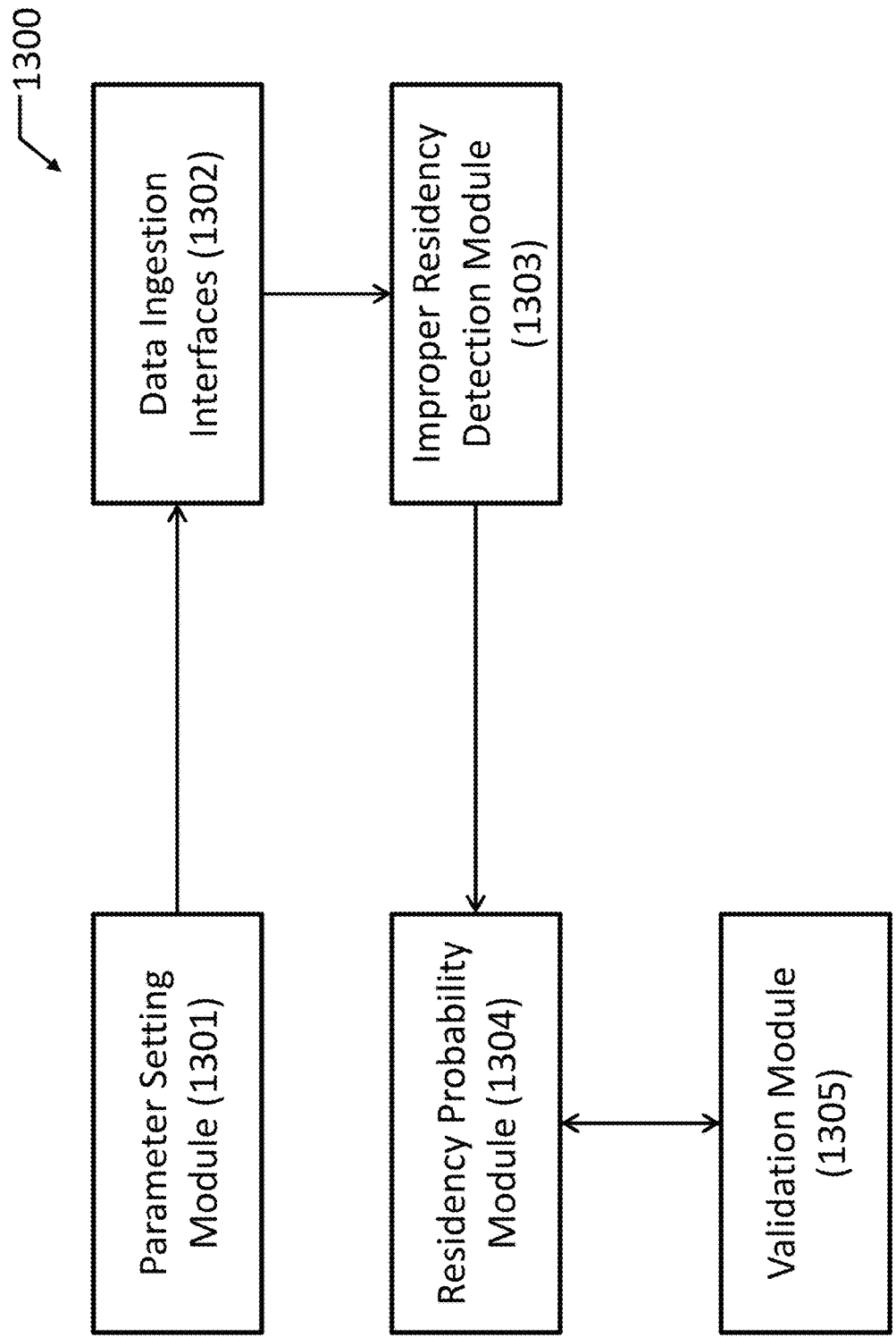
FIG. 13 is a non-limiting example of a schematic diagram; in this case, an exemplary application to detect an improper residency status for a real estate property, in accordance with some embodiments.

FIG. 13 shows an exemplary non-transitory computer-readable storage media encoded with a computer program including instructions executable by a processor to create an application to detect an improper residency status for a real estate property. Optionally, in some embodiments, the application 1300 comprises a parameter setting module 1301, a plurality of data ingestion interfaces 1302, an improper residency detection module 1303, a residency probability calculation module 1304, and a validation module 1305.

The parameter setting module 1301 can define a data set to be evaluated. In some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points.

Each data ingestion interface 1302 can connect to a unique external data source. Each data ingestion interface 1302 can be configured to perform a data mining task process to its data source. The data mining task process can detect one or more improper residency indicia within the data set.

In some embodiments, the data mining task process comprises a natural language process, numerical data mining process, a photographic data mining task process, or any combination thereof. In some embodiments, the natural language task process comprises syntax interpretation, semantic interpretation, discourse interpretation, speech interpretation, or any combination thereof. In some embodiments, the syntax interpretation comprises lemmatization, morphological segmentation, part-of-speech tagging, parsing, sentence boundary disambiguation, stemming, word segmentation, terminology extraction, or any combination thereof. In some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, word sense disambiguation, or any combination thereof. In some embodiments, the discourse interpretation comprises automatic summarization, coreference resolution, discourse analysis, or any combination thereof. In some embodiments, the speech interpretation comprises speech recognition, speech segmentation, text-to-speech, or both.

In some embodiments, the external data source comprises city property records, county property records, city permit records, county permit records, post office address database, state business records, historical real estate listings, rental listings, demolition orders, dumpster orders, portable restroom orders, customer account information from third party companies, social media, phone records, phone location records, cellphone location, address records, historical credit card history purchase records, satellite images, tax records, street views, online photographs, online videos, signs outside a property, demolition orders, dumpster orders, portable restroom orders, the Internet, or any combination thereof.

In some embodiments, the detection of one or more improper residency indicia comprises water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change a frequency of phone calls, a frequency of credit card purchases, or any combination thereof. Each improper residency indicia can be associated with a weight based on the correlation between that indicia and the probability of the improper residency status.

An increase in at least one of the water, electricity and gas usage can provide an improper residency indicia that a property listed as a vacation residence can actually comprise a primary residence. A decrease in water usage can provide an improper residency indicia that a property listed as a primary residence can actually comprise a vacation residence. Increased surrounding street parking occupancy, driveway parking occupancy, or both at a real estate property can provide an improper residency indicia that a property listed as a vacation residence can actually comprise a primary residence. Decreased surrounding street parking occupancy, driveway parking occupancy, or both at a real estate property can provide an improper residency indicia that a property listed as a primary residence can actually comprise a vacation residence. An increase in the frequency of package deliveries, window adjustment, visible room light changes, street-side trash can placement, mailbox flag status, garage door opening and closing, phone calls, credit card purchases or any combination thereof can provide an improper residency indicia that a property listed as a vacation residence can actually comprise a primary residence. A decrease in the frequency of package deliveries, window adjustment, visible room light changes, street-side trash can placement, mailbox flag status frequency, garage door opening and closing, phone calls, cellphone location, credit card purchases, or any combination thereof can provide an improper residency indicia that a property listed as a primary residence can actually comprise a vacation residence.

The package delivery frequency can comprise a number of packages delivered to the address within a set period. The window adjustment can comprise a frequency at which a window is opened, a window is closed, a window shade is opened, a window shade is closed, or any combination thereof. The visible room light frequency can comprise a frequency at which an interior or exterior light is turned on and off. The street-side trash can placement frequency can comprise a frequency at which trash is deposited on the street for pickup. The mailbox flag status frequency can comprise a frequency at which the mailbox flag which signals outgoing mail is raised. The garage door opening and closing frequency can comprise a frequency at which the garage door is opened or closed. The phone calls can be associated with the candidate property. The frequency of credit card purchases can be associated with an account that lists the candidate property The improper residency detection module 1303 can apply a machine learning algorithm to identify an initial candidate. The improper residency detection module 1303 can apply a machine learning algorithm to identify an initial candidate based on the improper residency indicia within the data set. The improper residency detection module 1303 can alternatively or additionally apply a rule-based algorithm to identify an initial candidate.

The residency probability calculation module 1304 can calculate a probability that the initial candidate has an improper residency status.

The validation module 1305 can accept verified data regarding the residency status. The validation module 1305 can further feed back the verified data to the improper residency probability calculation module 1304. The feed back the verified data to the improper residency probability calculation module 1304 can improve the calculations of the improper residency probability calculation module 1304 over time.

Detect an Improper Occupancy Tax Status for a Real Estate Property

Additionally, provided herein are methods, systems, and platforms, which employ various data sources and techniques to detect an improper occupancy tax status for a real estate property. Further, detection of improper occupancy tax status for a real estate property enables accurate and fair collection of associated occupancy taxes. In some embodiments, the methods, systems, and platforms can detect improper occupancy tax status for a plurality of properties.

Figure 14:
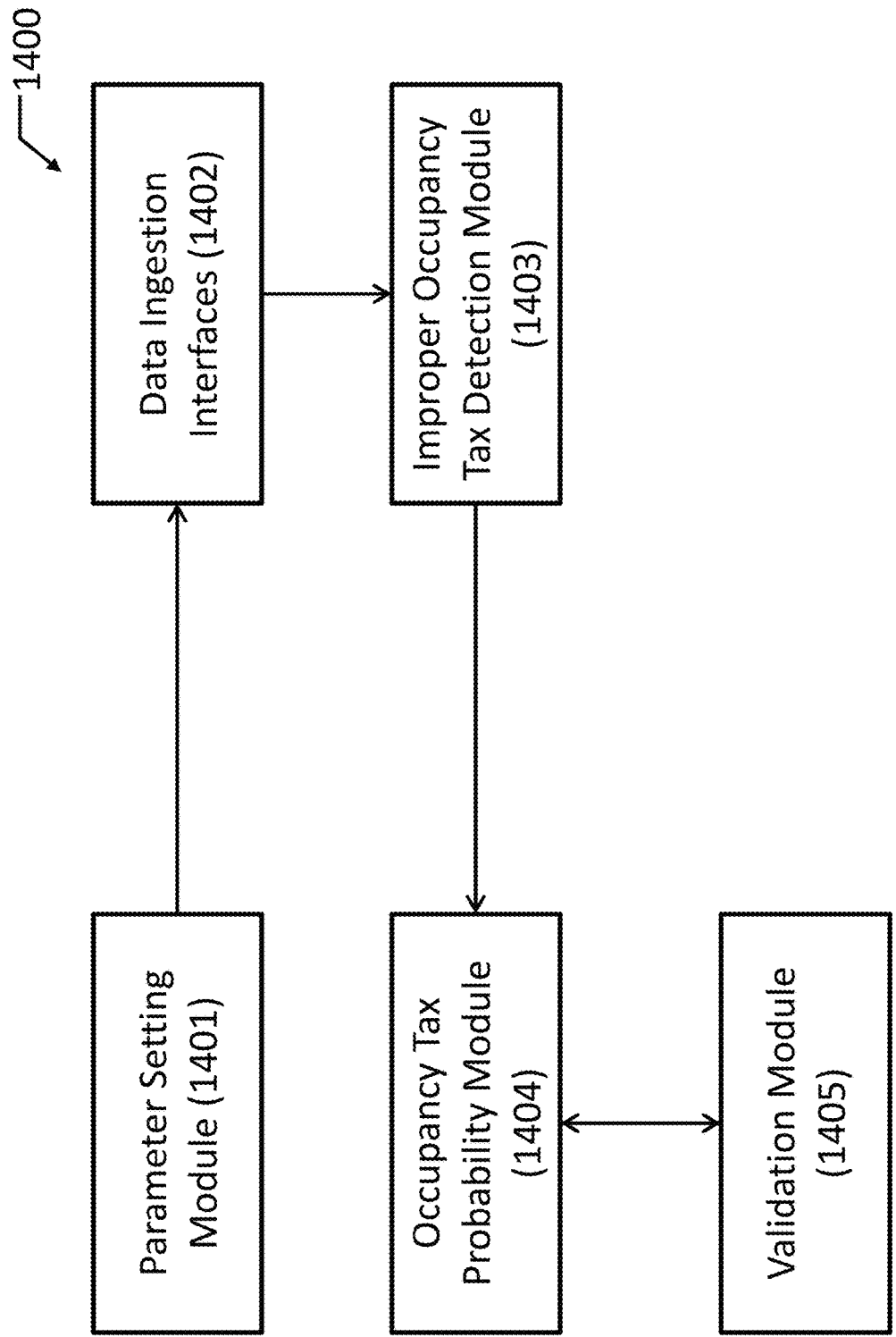
FIG. 14 is a non-limiting example of a schematic diagram; in this case, an exemplary application to detect an improper occupancy tax status for a real estate property, in accordance with some embodiments.

FIG. 14 shows an exemplary non-transitory computer-readable storage media encoded with a computer program including instructions executable by a processor to create an application to detect an improper residency status for a real estate property. Optionally, in some embodiments, the application 1400 comprises a parameter setting module 1401, a plurality of data ingestion interfaces 1402, an improper occupancy tax detection module 1403, an occupancy tax probability calculation module 1404, and a validation module 1405.

The parameter setting module 1401 can define a data set to be evaluated. In some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points.

Each of the plurality of data ingestion interfaces 1402 can connect to a unique external data source. Each interface can be configured to perform a data mining task process to its data source. Each interface can be configured to perform a data mining task process to its data source to detect one or more improper occupancy tax indicia within the data set.

The improper occupancy tax detection module 1403 can apply a machine learning algorithm to identify an initial candidate. The improper occupancy tax detection module 1403 can apply a machine learning algorithm to identify an initial candidate based on the improper occupancy tax indicia within the data set. The improper occupancy tax detection module 1403 can further or alternatively apply a rule-based algorithm to identify an initial candidate. In some embodiments, the data mining task process comprises a natural language process, numerical data mining process, a photographic data mining task process, or any combination thereof. In some embodiments, the natural language task process comprises syntax interpretation, semantic interpretation, discourse interpretation, speech interpretation, or any combination thereof. In some embodiments, the syntax interpretation comprises lemmatization, morphological segmentation, part-of-speech tagging, parsing, sentence boundary disambiguation, stemming, word segmentation, terminology extraction, or any combination thereof. In some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, word sense disambiguation, or any combination thereof. In some embodiments, the discourse interpretation comprises automatic summarization, coreference resolution, discourse analysis, or any combination thereof. In some embodiments, the speech interpretation comprises speech recognition, speech segmentation, and text-to-speech, or any combination thereof. In some embodiments, the external data source comprises AirBnB®, VRBO®, city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, the Internet, or any combination thereof.

In some embodiments, the detection of one or more improper occupancy tax indicia comprises water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change, or any combination thereof. Each improper occupancy tax indicia can be associated with a weight based on the correlation between that indicia and the probability of the improper occupancy tax status.

An increase in at least one of the water, electricity, and gas usage can provide an improper occupancy tax indicia that a residency number can be underreported. A decrease in water usage can provide an improper occupancy tax indicia that a residency number can be overreported. Increased surrounding street parking occupancy, driveway parking occupancy, or both at a real estate property can provide an improper occupancy tax indicia that a residency number can be underreported. Decreased surrounding street parking occupancy, driveway parking occupancy, or both at a real estate property can provide an improper occupancy tax indicia that a residency number can be overreported. An increase in the frequency of package deliveries, window adjustment, visible room light changes, street-side trash can placement, mailbox flag status, garage door opening and closing, phone calls, credit card purchases or any combination thereof can provide an improper occupancy tax indicia that a residency number can be underreported. A decrease in the frequency of package deliveries, window adjustment, visible room light changes, street-side trash can placement, mailbox flag status frequency, garage door opening and closing, phone calls, credit card purchases, or any combination thereof can provide an improper occupancy tax indicia that a residency number can be overreported.

The package delivery frequency can comprise a number of packages delivered to the address within a set period. The window adjustment can comprise a frequency at which a window is opened, a window is closed, a window shade is opened, a window shade is closed, or any combination thereof. The visible room light frequency can comprise a frequency at which an interior or exterior light is turned on and off. The street-side trash can placement frequency can comprise a frequency at which trash is deposited on the street for pickup. The mailbox flag status frequency can comprise a frequency at which the mailbox flag which signals outgoing mail is raised. The garage door opening and closing frequency can comprise a frequency at which the garage door is opened or closed. The phone calls can be associated with the candidate property. The frequency of credit card purchases can be associated with an account that lists the candidate property The occupancy tax probability calculation module 1404 can calculate a probability that the initial candidate has an improper occupancy tax status;

The validation module 1405 can accept verified data regarding the occupancy tax status. The validation module 1405 can further feed back the verified data to the improper occupancy tax probability calculation module 1404 to improve its calculation over time.

Machine Learning

In some embodiments, machine learning algorithms are utilized to aid in determining a consumer's preferred design elements. In some embodiments, the machine learning algorithm is used to detect an unpermitted renovation event, validate the detected event, or both.

In some embodiments, machine learning algorithms are utilized by the data ingestion interfaces to perform the data mining task, to detect one or more unpermitted renovation event indicia, or both. In some embodiments, machine learning algorithms are utilized by the renovation detection module to identify an initial candidate based on the detection indicia. In some embodiments, the machine learning algorithms utilized by the renovation detection module employ one or more forms of labels including but not limited to human annotated labels and semi-supervised labels. The human annotated labels can be provided by a hand-crafted heuristic. For example, the hand-crafted heuristic can comprise examining differences between public and county records. The semi-supervised labels can be determined using a clustering technique to find properties similar to those flagged by previous human annotated labels and previous semi-supervised labels. The semi-supervised labels can employ a XGBoost, a neural network, or both.

In some embodiments, machine learning algorithms are utilized by the renovation probability calculation module to calculate a probability that an unpermitted renovation event has taken or is taking place at the initial candidate. In some embodiments, the renovation probability calculation module calculates the probability that the unpermitted renovation event has taken or is taking place at the initial candidate using a distant supervision method. The distant supervision method can create a large training set seeded by a small hand-annotated training set. The distant supervision method can comprise positive-unlabeled learning with the training set as the 'positive' class. The distant supervision method can employ a logistic regression model, a recurrent neural network, or both. The recurrent neural network can be advantageous for Natural Language Processing (NLP) machine learning.

Examples of machine learning algorithms can include a support vector machine (SVM), a naïve Bayes classification, a random forest, a neural network, deep learning, or other supervised learning algorithm or unsupervised learning algorithm for classification and regression. The machine learning algorithms can be trained using one or more training datasets.

In some embodiments, the machine learning algorithm utilizes regression modeling, wherein relationships between predictor variables and dependent variables are determined and weighted. In one embodiment, for example, initial candidate can be a dependent variable and is derived from the detection indicia within the data set. In another embodiment, the one or more unpermitted renovation event indicia is a dependent variable derived from unique external data source. In yet another embodiment, the probability that an unpermitted renovation event has taken or is taking place at the initial candidate is a dependent variable derived from the following predictor variables: one or more unpermitted renovation event indicia, the unique external data source, and the data set.

In some embodiments, a machine learning algorithm is used to select catalogue images and recommend project scope. A non-limiting example of a multi-variate linear regression model algorithm is seen below: probability=$A_0$+$A_1(X_1)$+$A_2(X_2)$+$A_3(X_3)$+$A_4(X_4)$+$A_5(X_5)$+$A_6(X_6)$+$A_7(X_7)$ ... wherein $A_1$ ($A_1, A_2, A_3, A_4, A_5, A_6, A_7, \ldots$) are "weights" or coefficients found during the regression modeling; and $X_1$ ($X_1, X_2, X_3, X_4, X_5, X_6, X_7, \ldots$) are data collected from the User. Any number of $A_1$ and $X_1$ variable can be included in the model. For example, in a non-limiting example wherein there are 7 $X_1$ terms, $X_1$ is the number of unpermitted renovation event indicia, $X_2$ is the number of initial candidates, and $X_3$ is the probability that an unpermitted renovation event has taken or is taking place at the initial candidate. In some embodiments, the programming language "R" is used to run the model.]

In some embodiments, training comprises multiple steps. In a first step, an initial model is constructed by assigning probability weights to predictor variables. In a second step, the initial model is used to "recommend" initial candidates. In a third step, the validation module accepts verified data regarding the unpermitted renovation event and feeds back the verified data to the renovation probability calculation. At least one of the first step, the second step, and the third step can repeat one or more times continuously or at set intervals.

Digital Processing Device

Optionally, in some embodiments, the platforms, systems, media, and methods described herein include a digital processing device, or use of the same. In further embodiments, the digital processing device includes one or more hardware central processing units (CPUs) or general purpose graphics processing units (GPGPUs) that carry oust the device's functions. In still further embodiments, the digital processing device further comprises an operating system configured to perform executable instructions. Optionally, in some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, and media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

Optionally, in some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. Optionally, in some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony®

PS4®, Microsoft® Xbox 360®, Microsoft Xbox One, Nintendo® Wii®, Nintendo® Wii U®, and Ouya®.

Optionally, in some embodiments, the device includes a storage and/or memory device. The storage and/or memory device is one or more physical apparatuses used to store data or programs on a temporary or permanent basis. Optionally, in some embodiments, the device is volatile memory and requires power to maintain stored information. Optionally, in some embodiments, the device is non-volatile memory and retains stored information when the digital processing device is not powered. In further embodiments, the non-volatile memory comprises flash memory. Optionally, in some embodiments, the non-volatile memory comprises dynamic random-access memory (DRAM). Optionally, in some embodiments, the non-volatile memory comprises ferroelectric random access memory (FRAM). Optionally, in some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

Optionally, in some embodiments, the digital processing device includes a display to send visual information to a user. Optionally, in some embodiments, the display is a liquid crystal display (LCD). In further embodiments, the display is a thin film transistor liquid crystal display (TFT-LCD). Optionally, in some embodiments, the display is an organic light emitting diode (OLED) display. In various further embodiments, on OLED display is a passive-matrix OLED (PMOLED) or active-matrix OLED (AMOLED) display. Optionally, in some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

Optionally, in some embodiments, the digital processing device includes an input device to receive information from a user. Optionally, in some embodiments, the input device is a keyboard. Optionally, in some embodiments, the input device is a pointing device including, by way of non-limiting examples, a mouse, trackball, track pad, joystick, game controller, or stylus. Optionally, in some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 4:
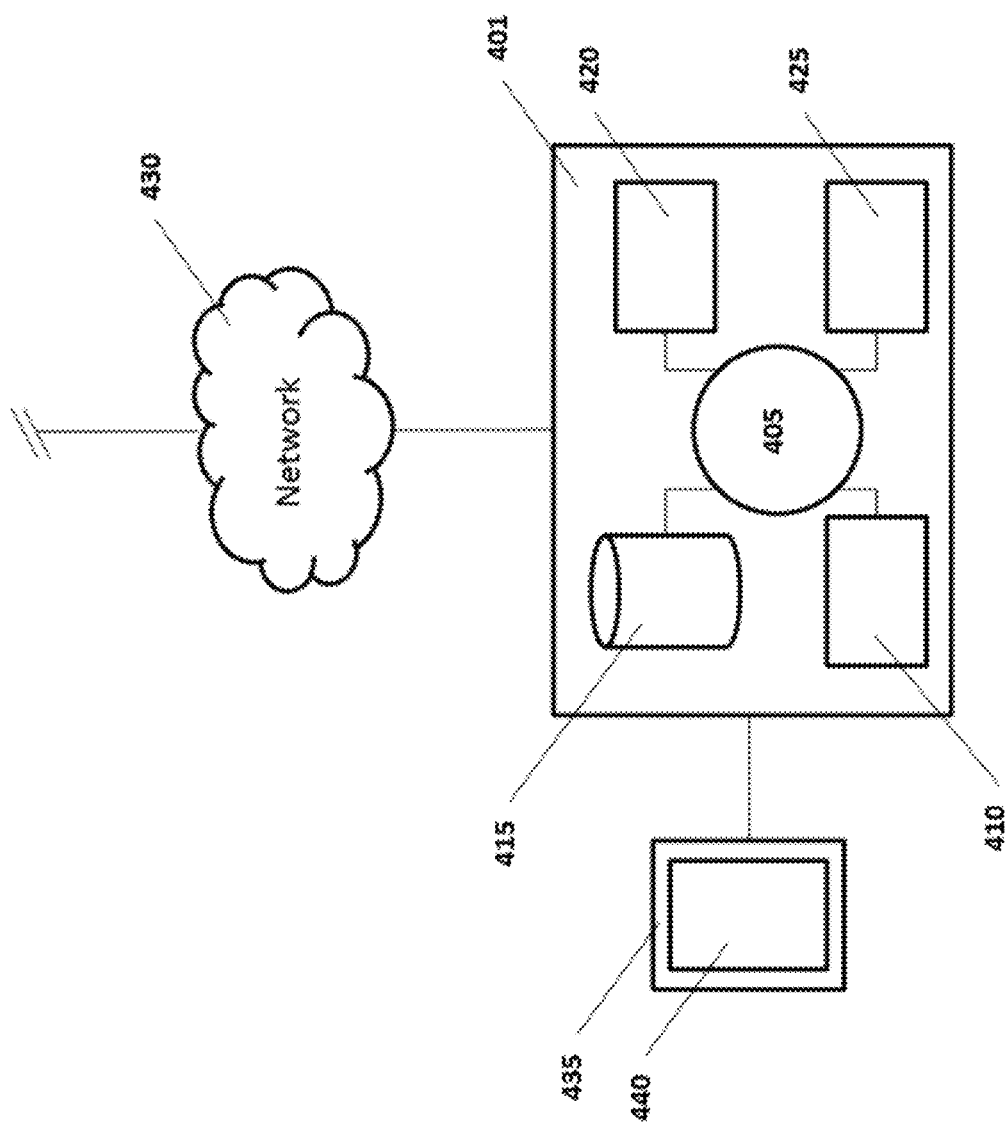
FIG. 4 shows a non-limiting example of a schematic diagram of a digital processing device; in this case, a device with one or more CPUs, a memory, a communication interface, and a display, in accordance with some embodiments.

FIG. 4 shows a schematic diagram of a digital processing device; in this case, a device with one or more CPUs, a memory, a communication interface, and a display, in accordance with some embodiments. Referring to FIG. 4, in a particular embodiment, a digital processing device 401 is programmed or otherwise configured to create an application to detect an unpermitted renovation event and validate the detected event. The non-transitory computer-readable storage media 401 is programmed or otherwise configured to create an application to detect an unpermitted renovation event and validate the detected event. In this embodiment, the digital processing device 401 includes a central processing unit (CPU, also "processor" and "computer processor" herein) 405, which is optionally a single core, a multi core processor, or a plurality of processors for parallel processing. The digital processing device 401 also includes memory or memory location 410 (e.g., random-access memory, read-only memory, flash memory), electronic storage unit 415 (e.g., hard disk), communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communication bus (solid lines), such as a motherboard. The storage unit 415 comprises a data storage unit (or data repository) for storing data. The digital processing device 401 is optionally operatively coupled to a computer network ("network") 430 with the aid of the communication interface 420. The network 430, in various cases, is the internet, an internet, and/or extranet, or an intranet and/or extranet that is in communication with the internet. The network 430, in some cases, is a telecommunication and/or data network. The network 430 optionally includes one or more computer servers, which enable distributed computing, such as cloud computing. The network 430, in some cases, with the aid of the device 401, implements a peer-to-peer network, which enables devices coupled to the device 401 to behave as a client or a server.

Continuing to refer to FIG. 4, the CPU 405 is configured to execute a sequence of machine-readable instructions, embodied in a program, application, and/or software. The instructions are optionally stored in a memory location, such as the memory 410. The instructions are directed to the CPU 105, which subsequently program or otherwise configure the CPU 405 to implement methods of the present disclosure. Examples of operations performed by the CPU 405 include fetch, decode, execute, and write back. The CPU 405 is, in some cases, part of a circuit, such as an integrated circuit. One or more other components of the device 401 are optionally included in the circuit. In some cases, the circuit is an application specific integrated circuit (ASIC) or a field programmable gate array (FPGA).

Continuing to refer to FIG. 4, the storage unit 415 optionally stores files, such as drivers, libraries and saved programs. The storage unit 415 optionally stores user data, e.g., user preferences and user programs. The digital processing device 401, in some cases, includes one or more additional data storage units that are external, such as located on a remote server that is in communication through an intranet or the internet.

Continuing to refer to FIG. 4, the digital processing device 401 optionally communicates with one or more remote computer systems through the network 430. For instance, the device 401 optionally communicates with a remote computer system of a user. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants.

Methods as described herein are optionally implemented by way of machine (e.g., computer processor) executable code stored on an electronic storage location of the digital processing device 401, such as, for example, on the memory 410 or electronic storage unit 415. The machine executable or machine readable code is optionally provided in the form of software. During use, the code is executed by the processor 405. In some cases, the code is retrieved from the storage unit 415 and stored on the memory 410 for ready access by the processor 405. In some situations, the electronic storage unit 415 is precluded, and machine-executable instructions are stored on the memory 410.

Non-Transitory Computer Readable Storage Medium

Optionally, in some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. Optionally, in some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

Optionally, in some embodiments, the platforms, systems, media, and methods disclosed herein include at least one computer program, or use of the same. A computer program includes a sequence of instructions, executable in the digital processing device's CPU, written to perform a specified task. Computer readable instructions can be implemented as program modules, such as functions, objects, Application Programming Interfaces (APIs), data structures, and the like, that perform particular tasks or implement particular abstract data types. In light of the disclosure provided herein, those of skill in the art will recognize that a computer program can be written in various versions of various languages.

The functionality of the computer readable instructions can be combined or distributed as desired in various environments. Optionally, in some embodiments, a computer program comprises one sequence of instructions. Optionally, in some embodiments, a computer program comprises a plurality of sequences of instructions. Optionally, in some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

Optionally, in some embodiments, a computer program includes a web application. In light of the disclosure provided herein, those of skill in the art will recognize that a web application, in various embodiments, utilizes one or more software frameworks and one or more database systems. Optionally, in some embodiments, a web application is created upon a software framework such as Microsoft® .NET or Ruby on Rails (RoR). Optionally, in some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application can be written in one or more markup languages, presentation definition languages, client-side scripting languages, server-side coding languages, database query languages, or combinations thereof. Optionally, in some embodiments, a web application is written to some extent in a markup language such as Hypertext Markup Language (HTML), Extensible Hypertext Markup Language (XHTML), or eXtensible Markup Language (XML). Optionally, in some embodiments, a web application is written to some extent in a presentation definition language such as Cascading Style Sheets (CSS). Optionally, in some embodiments, a web application is written to some extent in a client-side scripting language such as Asynchronous JavaScript and XML (AJAX), Flash® ActionScript, JavaScript, or Silverlight®. Optionally, in some embodiments, a web application is written to some extent in a server-side coding language such as Active Server Pages (ASP), ColdFusion®, Perl, Java™, Java Server Pages (JSP), Hypertext Preprocessor (PHP), Python™ Ruby, Tcl, Smalltalk, WebDNA®, or Groovy. Optionally, in some embodiments, a web application is written to some extent in a database query language such as Structured Query Language (SQL). Optionally, in some embodiments, a web application integrates enterprise server products such as IBM® Lotus Domino®. Optionally, in some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 5:
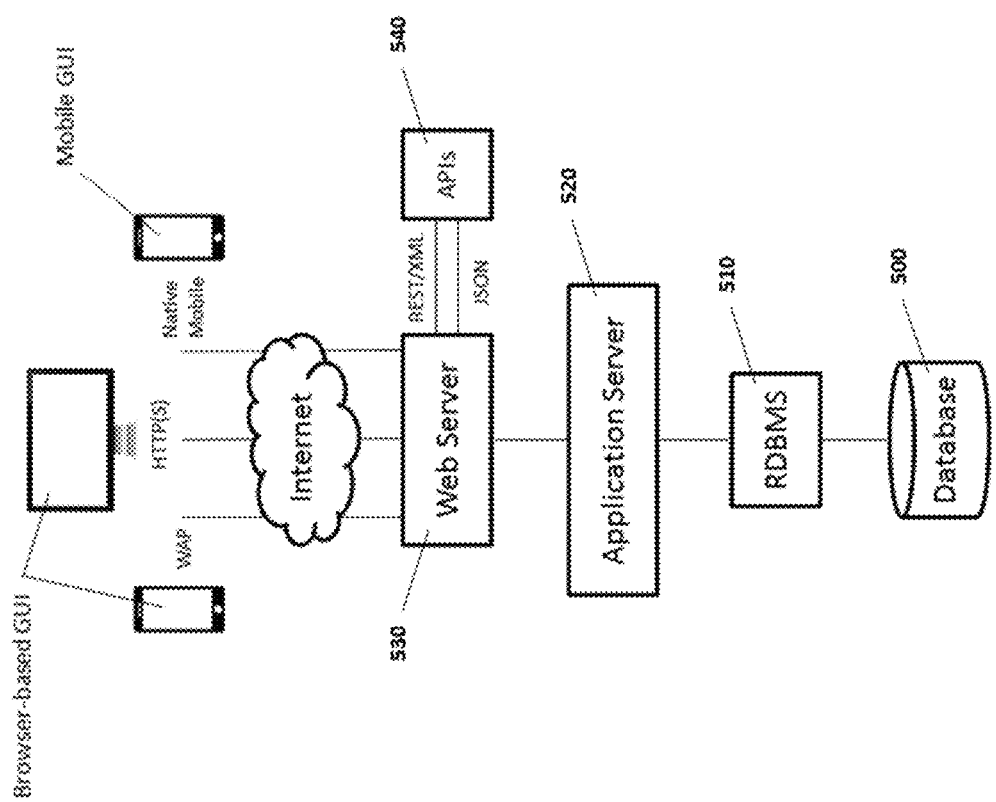
FIG. 5 shows a non-limiting example of a schematic diagram of a web/mobile application provision system; in this case, a system providing browser-based and/or native mobile user interfaces, in accordance with some embodiments.

Referring to FIG. 5, in a particular embodiment, an application provision system comprises one or more databases 500 accessed by a relational database management system (RDBMS) 510. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 520 (such as Java servers, .NET servers, PHP servers, and the like) and one or more web servers 530 (such as Apache, IIS, GWS and the like). The web server(s) optionally expose one or more web services via app application programming interfaces (APIs) 540. Via a network, such as the internet, the system provides browser-based and/or mobile native user interfaces.

Figure 6:
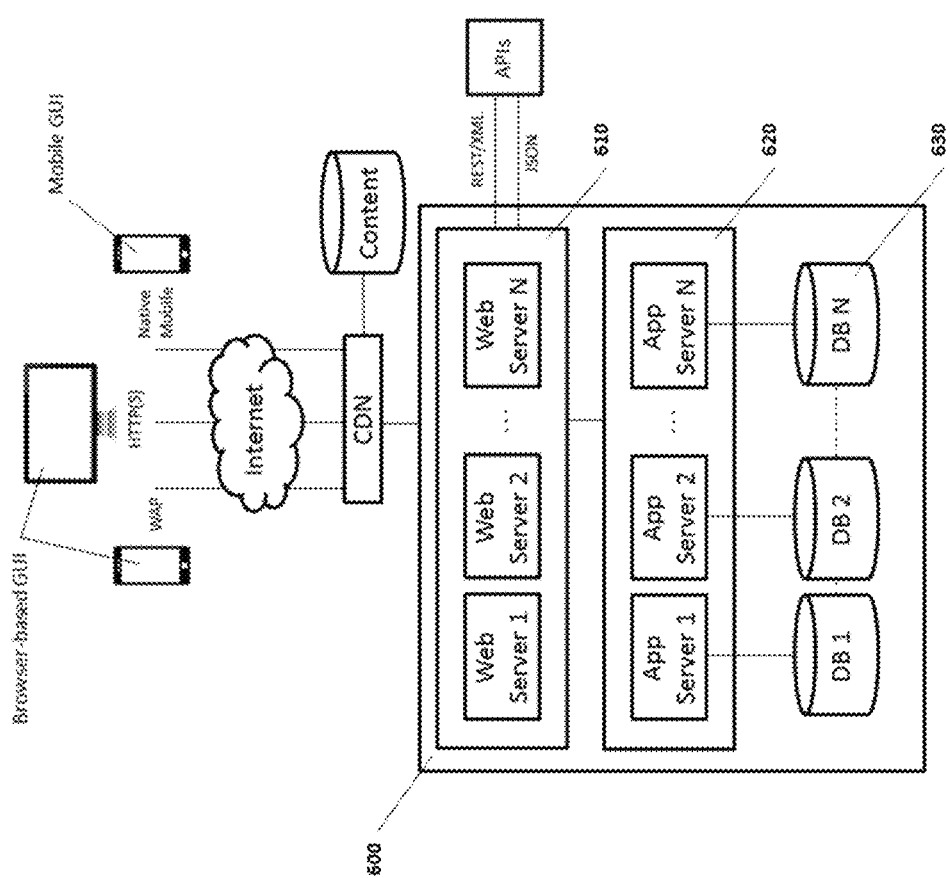
FIG. 6 shows a non-limiting example of a schematic diagram of a cloud-based web/mobile application provision system; in this case, a system comprising an elastically load balanced, auto-scaling web server and application server resources as well synchronously replicated databases, in accordance with some embodiments.

Referring to FIG. 6, in a particular embodiment, an application provision system alternatively has a distributed, cloud-based architecture 600 and comprises elastically load balanced, auto-scaling web server resources 610, and application server resources 620 as well synchronously replicated databases 630.

Mobile Application

Optionally, in some embodiments, a computer program includes a mobile application provided to a mobile digital processing device. Optionally, in some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

Optionally, in some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. Optionally, in some embodiments, a computer program includes one or more executable complied applications.

Web Browser Plug-in

Optionally, in some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. Optionally, in some embodiments, the web browser is a mobile web browser. Mobile web browsers (also called microbrowsers, minibrowsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

Optionally, in some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. Optionally, in some embodiments, software modules are in one computer program or application. In other embodiments, software modules are in more than one computer program or application. Optionally, in some embodiments, software modules are hosted on one machine. In other embodiments, software modules are hosted on more than one machine. In further embodiments, software modules are hosted on cloud computing platforms. Optionally, in some embodiments, software modules are hosted on one or more machines in one location. In other embodiments, software modules are hosted on one or more machines in more than one location.

Databases

Optionally, in some embodiments, the platforms, systems, media, and methods disclosed herein include one or more databases, or use of the same. In view of the disclosure provided herein, those of skill in the art will recognize that many databases are suitable for storing data from one or more sources related to a data set and/or a property. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase.

Optionally, in some embodiments, a database is internet-based. In further embodiments, a database is web-based. In still further embodiments, a database is cloud computing-based. In other embodiments, a database is based on one or more local computer storage devices.

Graphic User Interfaces

Optionally, in some embodiments, the platforms, systems, media, and methods disclosed herein are presented through one or more graphic user interfaces.

Figure 15:
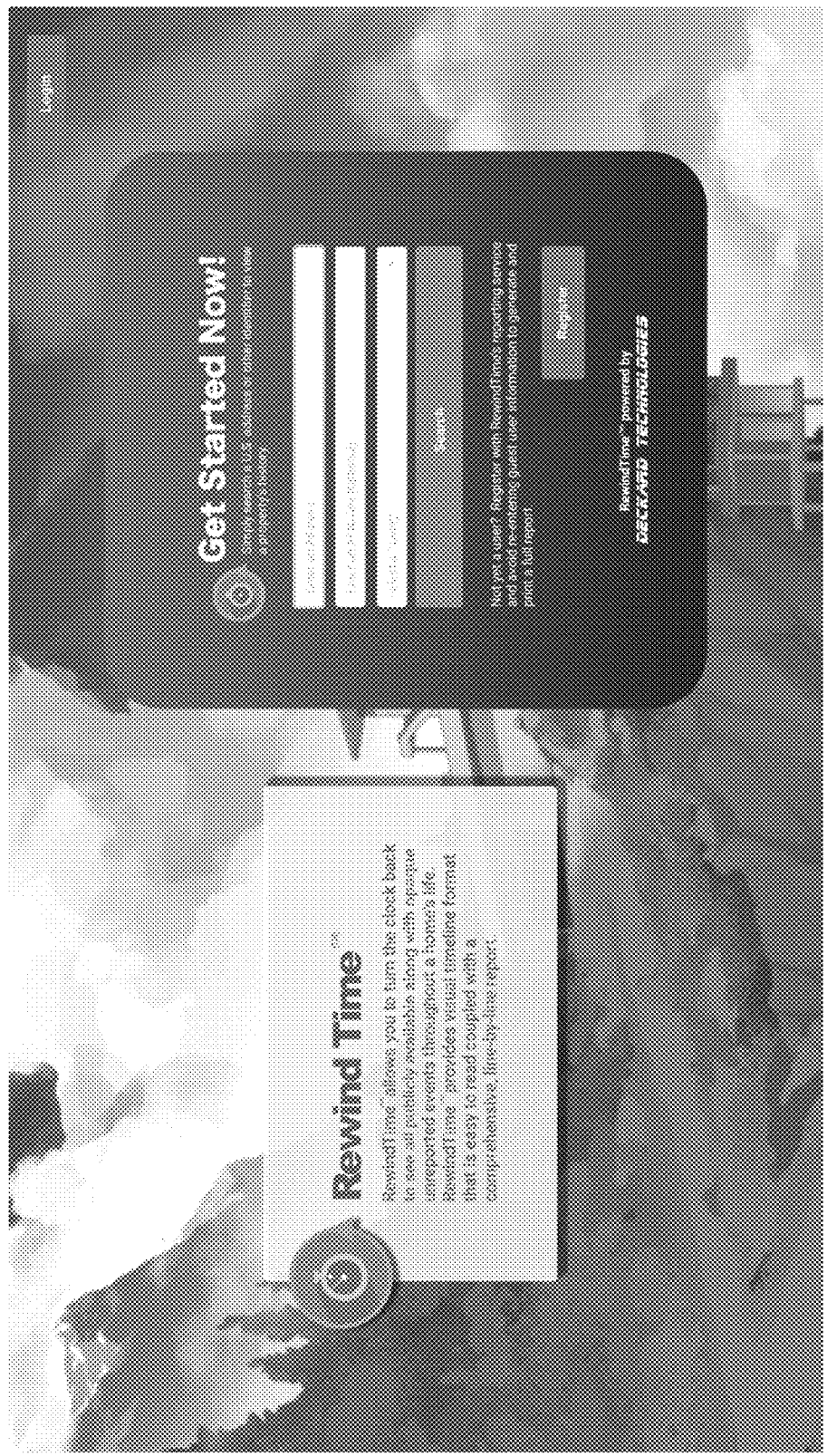
FIG. 15 is a non-limiting example of a graphic user interface; in this case, an interface for viewing publicly available along with opaque unreported events throughout a property's existence.
Figure 16:
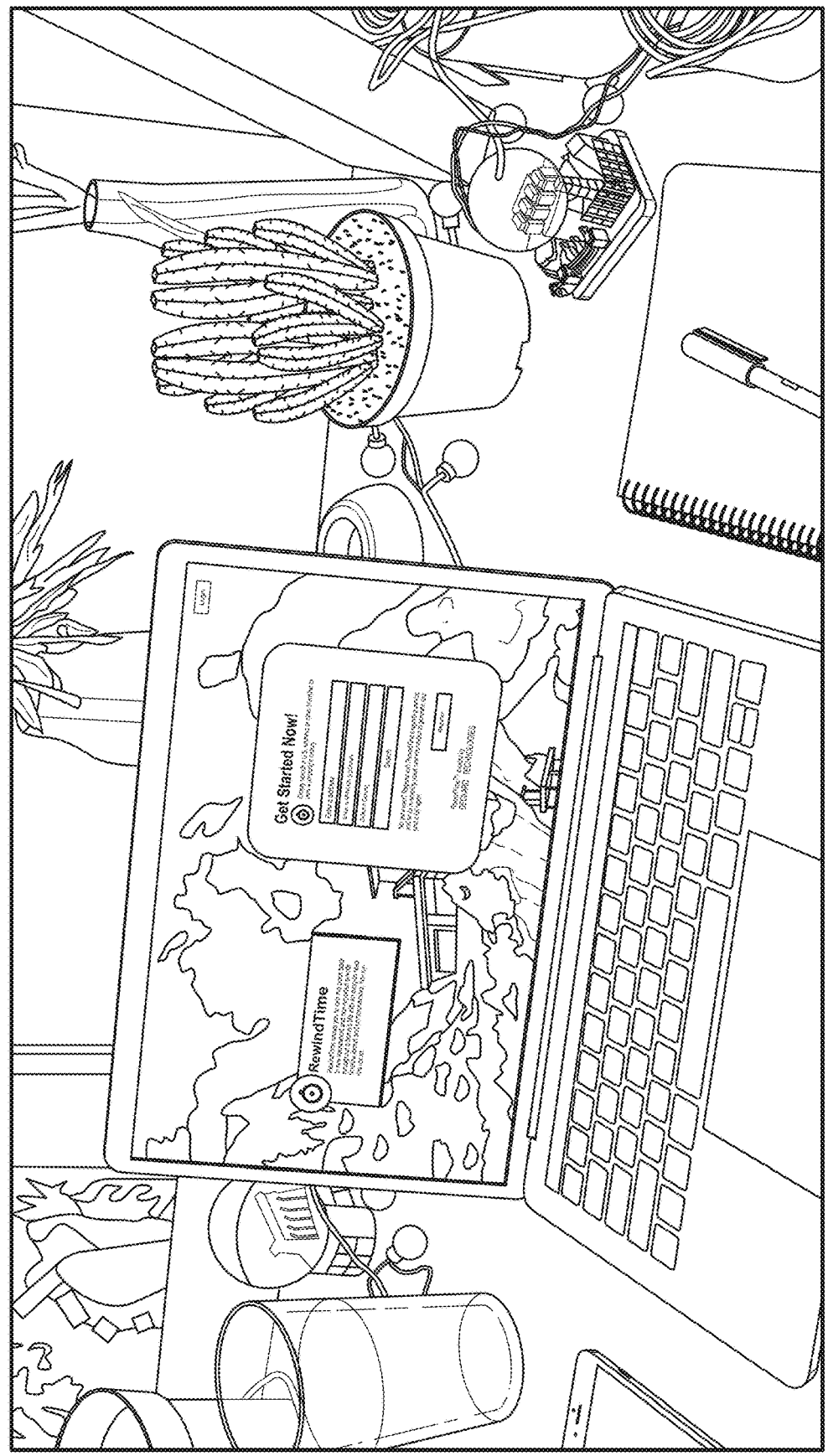
FIG. 16 is a non-limiting example of a graphic user interface on a laptop; in this case, an interface for viewing publicly available along with opaque unreported events throughout a property's existence.
Figure 17:
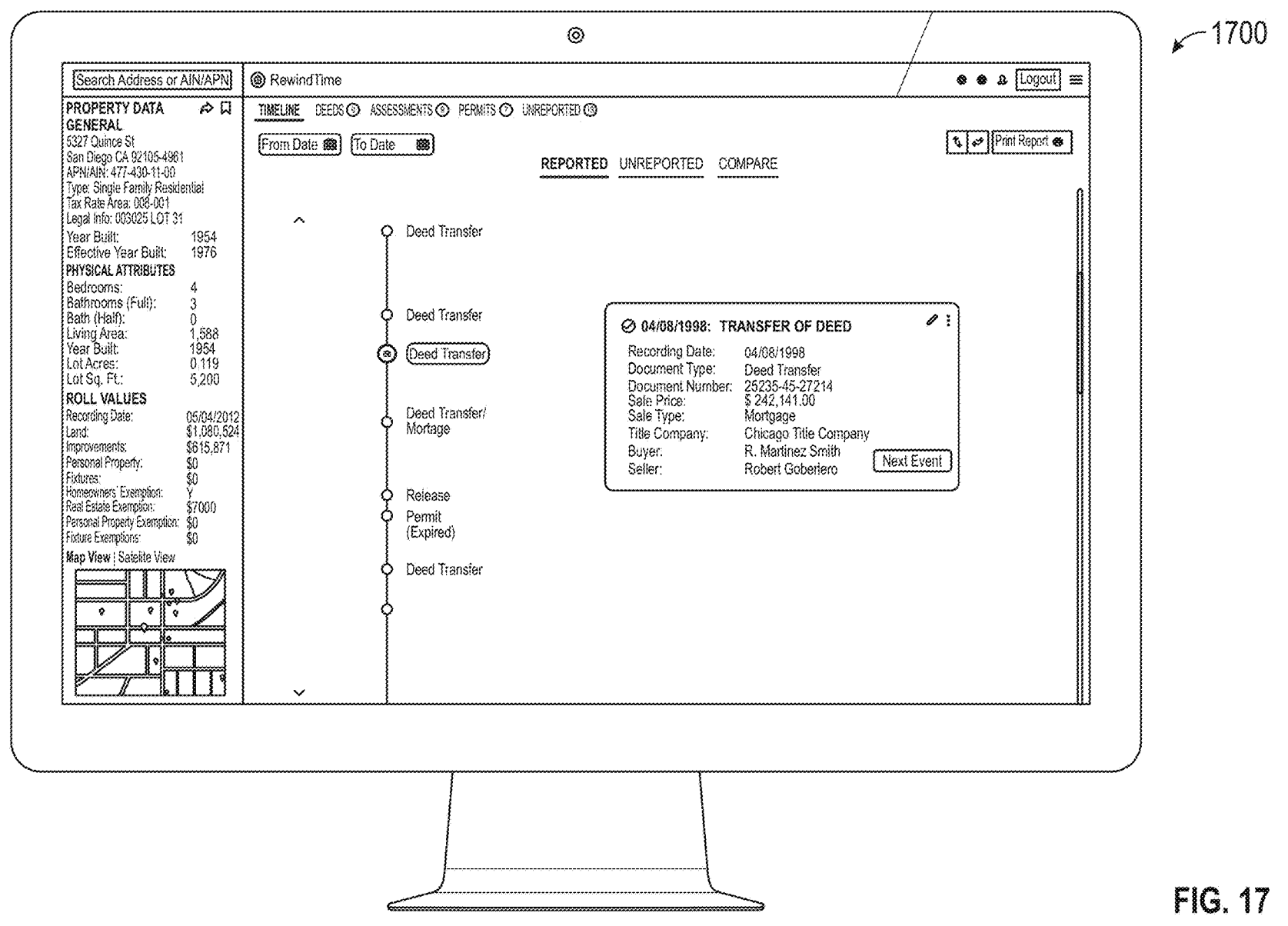

FIG. 15 is a non-limiting example of a graphic user interface 1500. In some embodiments, the graphic user interface offers an application for viewing publicly available along with opaque unreported events throughout a property's existence. In some embodiments, the application provides a visual timeline format that is easy to read coupled with a comprehensive, line-by-line report. FIG. 16 is a non-limiting example of the graphic user interface depicted in FIG. 15 on a laptop 1600. FIG. 17 is a non-limiting example of a graphic user interface on a desktop 1700. In other embodiments, the graphic user interface for viewing publicly available along with opaque unreported events can be displayed in any transitory storage medium.

Figure 18:
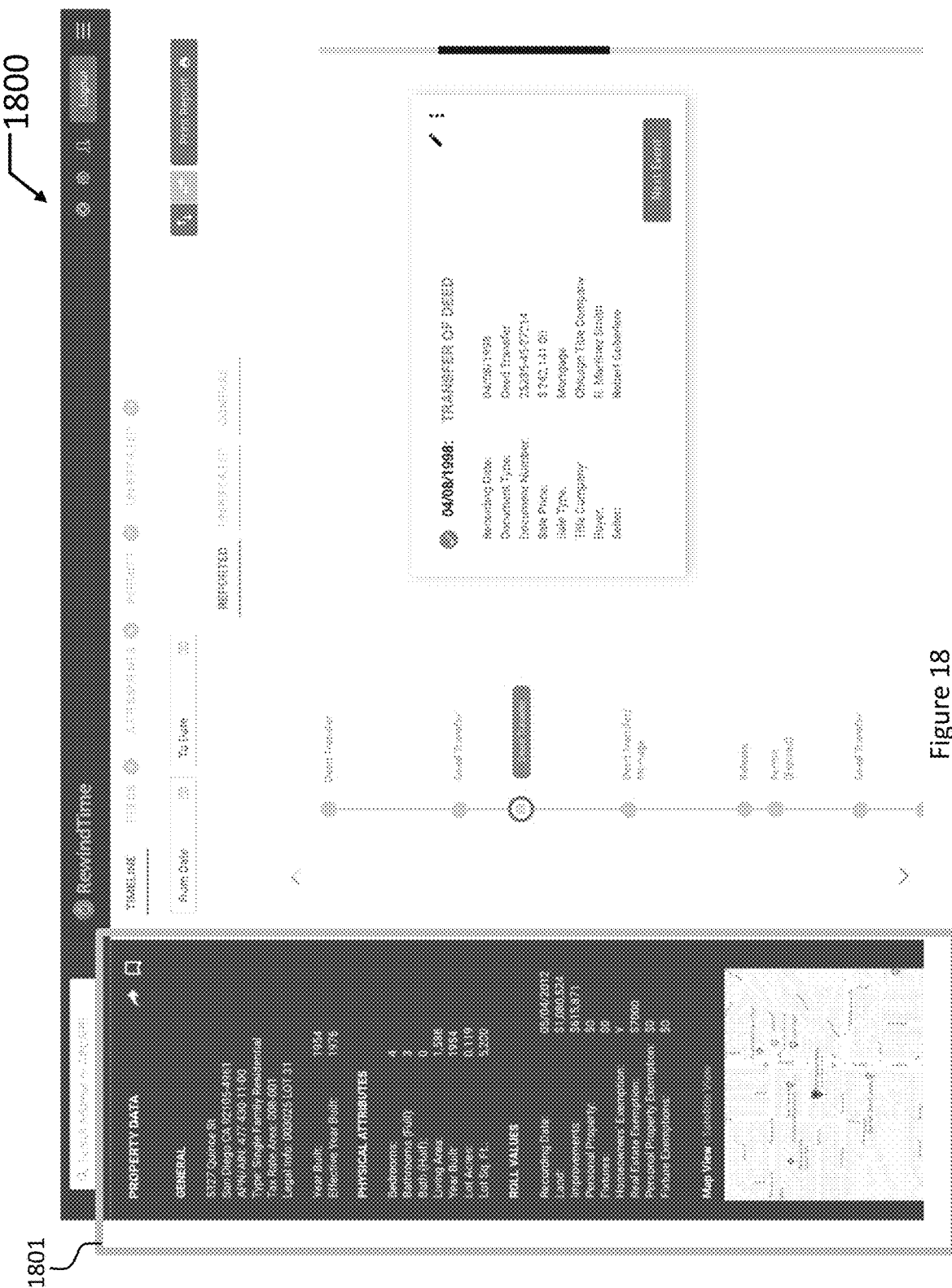
FIG. 18 is a non-limiting example of a graphic user interface; in this case, an interface for viewing a timeline and overview of publicly available events throughout a property's existence.

FIG. 18 is a non-limiting example of a graphic user interface; in this case, an interface for viewing a timeline and overview of publicly available events throughout a property's existence 1800. In some embodiments, the graphic user interface provides a side panel 1801 that provides an overview of a property's details. In some embodiments, the property details include the property address, APN/AIN number, type of property (e.g., single family residential, condo, townhome, multi-unit, etc.), tax rate area, legal info, year built, effective year built, physical attributes (e.g., number of bedroom, bathrooms, and baths; square footage, lot acreage; lot square footage), and roll values (e.g., recording data, fair market value of land and improvements, personal property, fixtures, homeowners' exemption, real estate exemption, personal property exemption, and fixture exemptions), and a map of the property.

Figure 19:
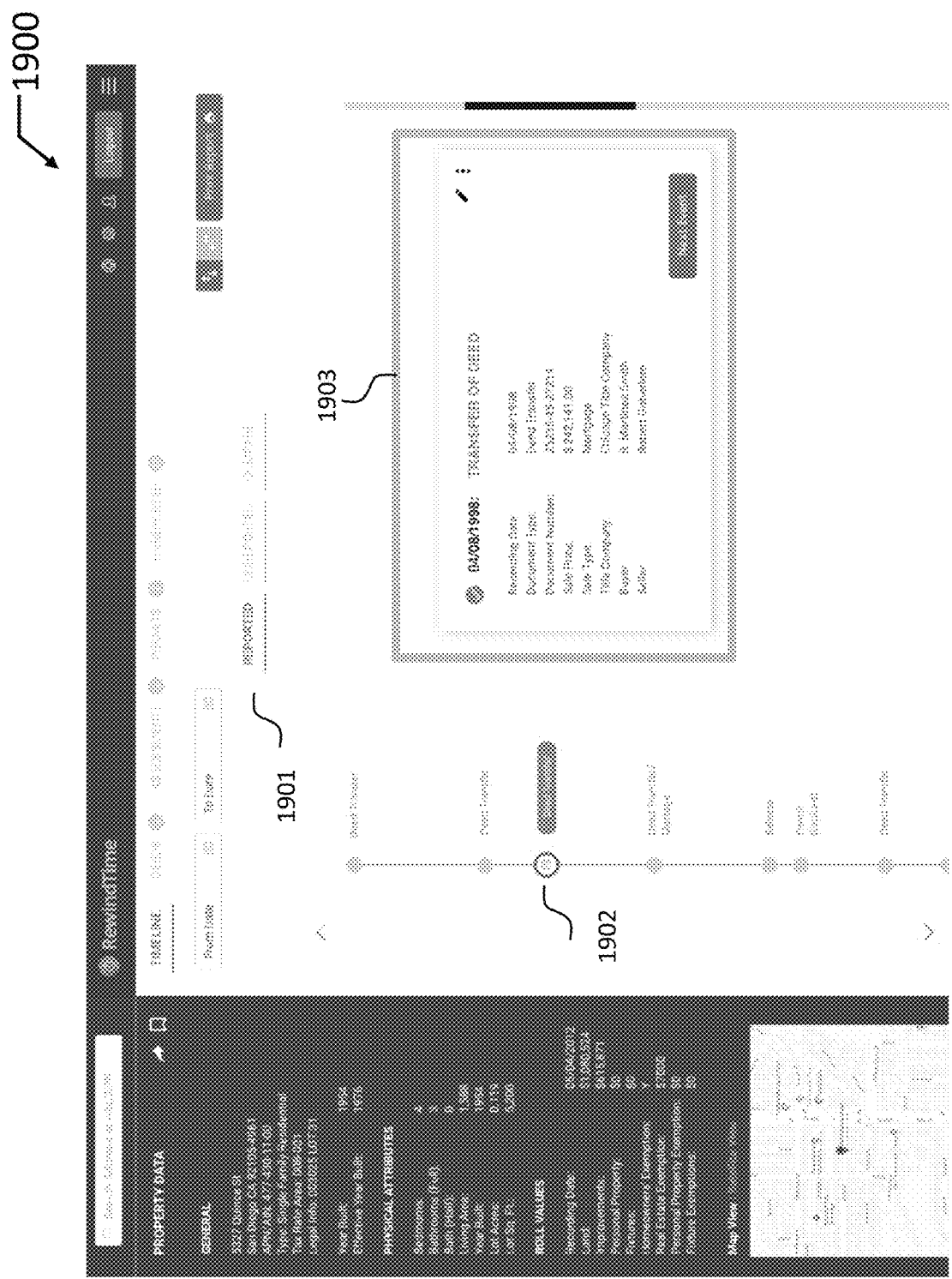
FIG. 19 is a non-limiting example of a graphic user interface; in this case, an interface for viewing a timeline and overview of publicly available events throughout a property's existence.

FIG. 19 is a non-limiting example of a graphic user interface; in this case, an interface for viewing a timeline and overview of publicly available events throughout a property's existence 1900. In some embodiments, the graphic user interface offers a REPORTED mode 1901, wherein a user can select a node 1902 on a timeline of reported events for a property of interest. In some embodiments, selecting a node 1902 will display information about the reported event 1903. By way of example, a reported event can comprise a transfer of deed. In such an example, additional information about the reported event can include the recorded data of the deed, document number, sale price, sale type, title company, buyer, and seller.

Figure 20:
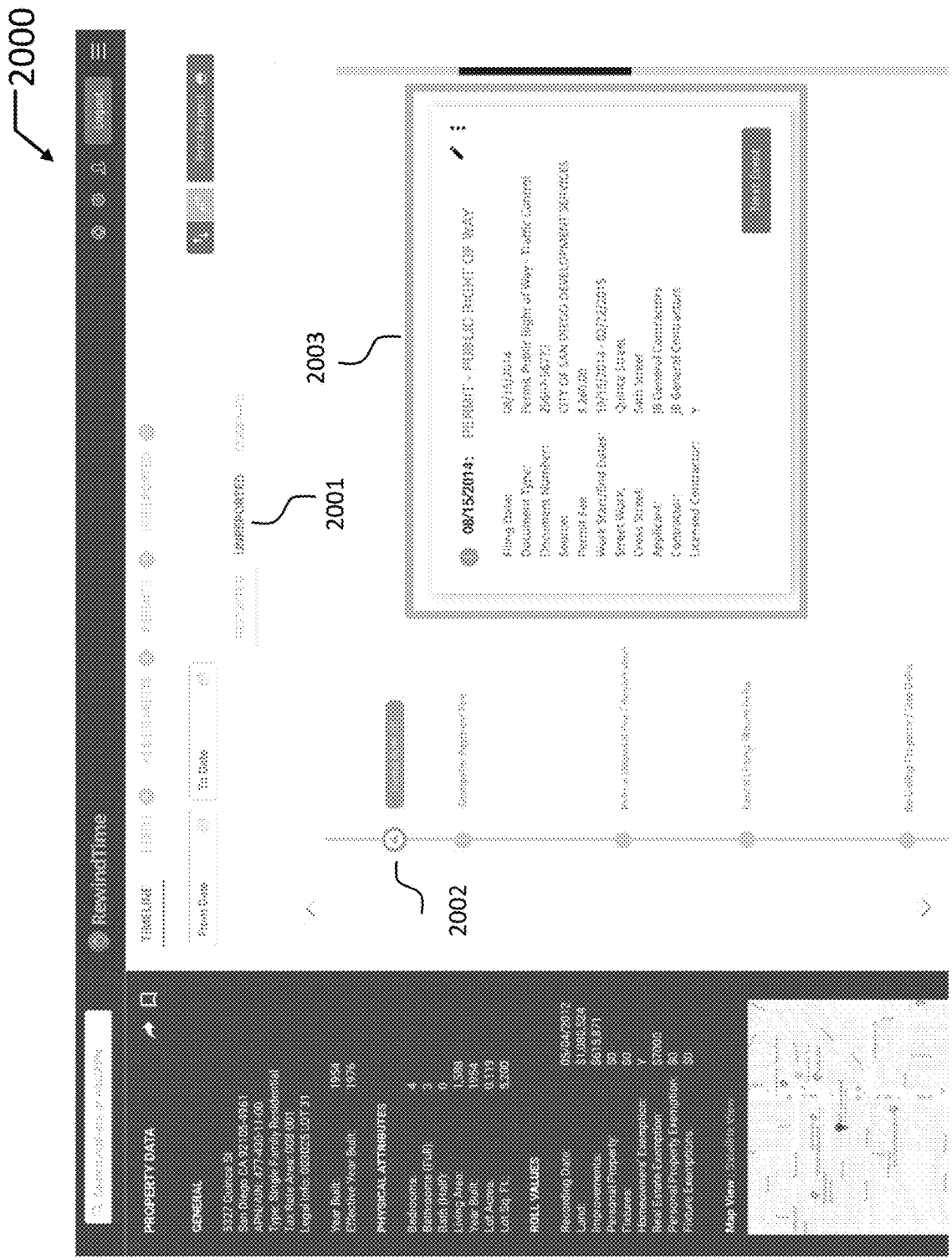
FIG. 20 is a non-limiting example of a graphic user interface; in this case, an interface for viewing a timeline and overview of opaque unreported events throughout a property's existence.

FIG. 20 is a non-limiting example of a graphic user interface; in this case, an interface for viewing a timeline and overview of opaque unreported events throughout a property's existence 2000. In some embodiments, the graphic user interface offers an UNREPORTED mode 2001, wherein a user can select a node 2002 on a timeline of unreported events for a property of interest. In some embodiments, selecting a node 2002 will display additional information about the unreported event 2003. By way of example, an unreported event can comprise of a permit—public right of way. In such an example, additional information about the unreported can include the filing date, document type, document number, source, permit fee, work start and work end dates, street work, cross street, applicant name, contractor name, and whether the contractor was licensed. In some embodiments, the unreported event comprises the unpermitted renovation events, improper real estate transfer event, or any combination thereof.

Figure 21:
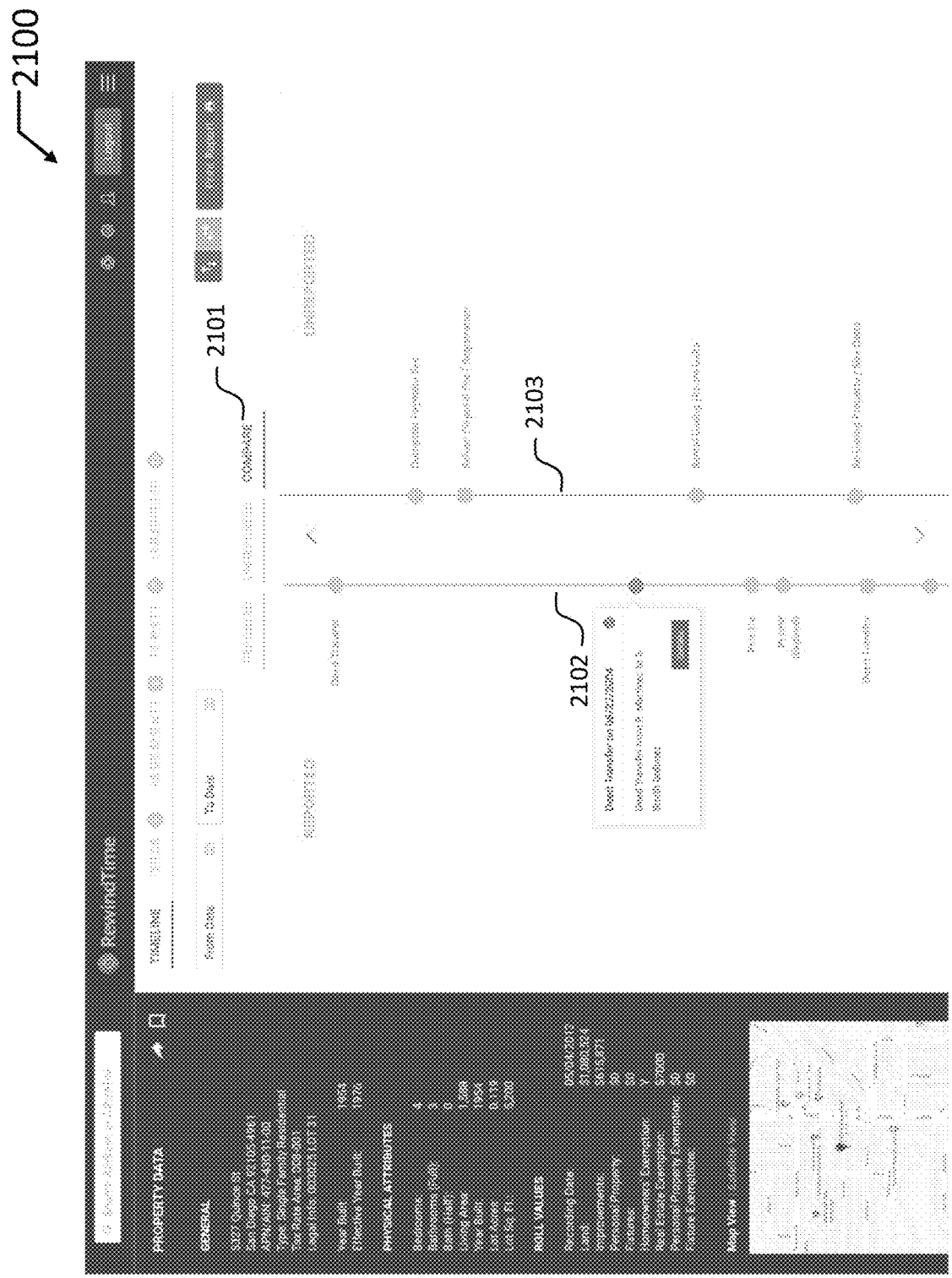
FIG. 21 is a non-limiting example of a graphic user interface; in this case, an interface for simultaneously viewing a timeline of publicly available along with opaque unreported events throughout a property's existence.

FIG. 21 is a non-limiting example of a graphic user interface; in this case, an interface for simultaneously viewing a timeline of publicly available along with opaque unreported events throughout a property's existence 2100. In some embodiments, the graphic user interface offers a COMPARE mode 2101, wherein a user can simultaneously view and compare a timeline of publicly available events throughout a property's existence 2102 and a timeline of opaque unreported events throughout the same property's existence 2103. In some embodiments, the timelines are linked so that a user scrolling up and down the interface will result in both timelines being scrolled through simultaneously. In some embodiments, the timeline of publicly available events throughout a property's existence 2102 comprises information known about a home. In some embodiments, the timeline of opaque unreported events throughout the same property's existence 2103 comprises unreported information relevant to identify when a home has been altered, potentially without proper permits. In some embodiments, events that span a time period rather than a specific date is portrayed through long bubbles rather than a single node. In some embodiments, events that span a time period of a specific data comprises events where suspected alterations were made to a home and not reported through a standard permit process. Optionally, in some embodiments, a plurality of timelines are provided and compared. Optionally, in some embodiments, a third timeline of unreported events with hard documentary evidence (e.g., construction) can be provided. In some embodiments, all the plurality of timelines are linked so that a user scrolling up and down the interface will result in all timelines being scrolled through simultaneously.

Figure 22:
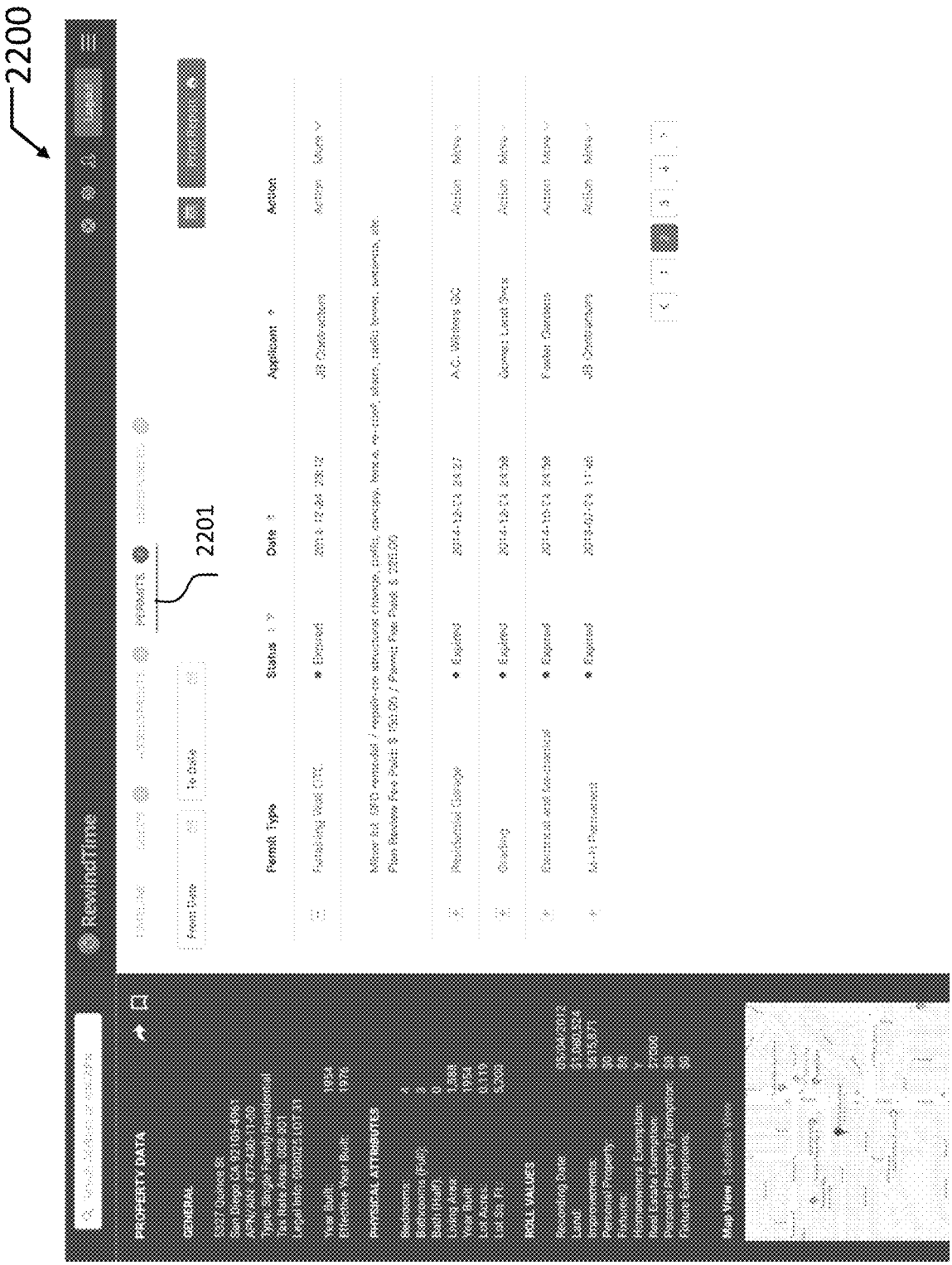
FIG. 22 is a non-limiting example of a graphic user interface; in this case, an interface for viewing and sorting records associated with a property of interest.

FIG. 22 is a non-limiting example of a graphic user interface; in this case, an interface for viewing and sorting records associated with a property of interest 2200. In some embodiments, a user can select a PERMIT module 2201. In some embodiments, line-by-line records can be viewed, sorted, and modified on the data grid 2202.

Figure 23:
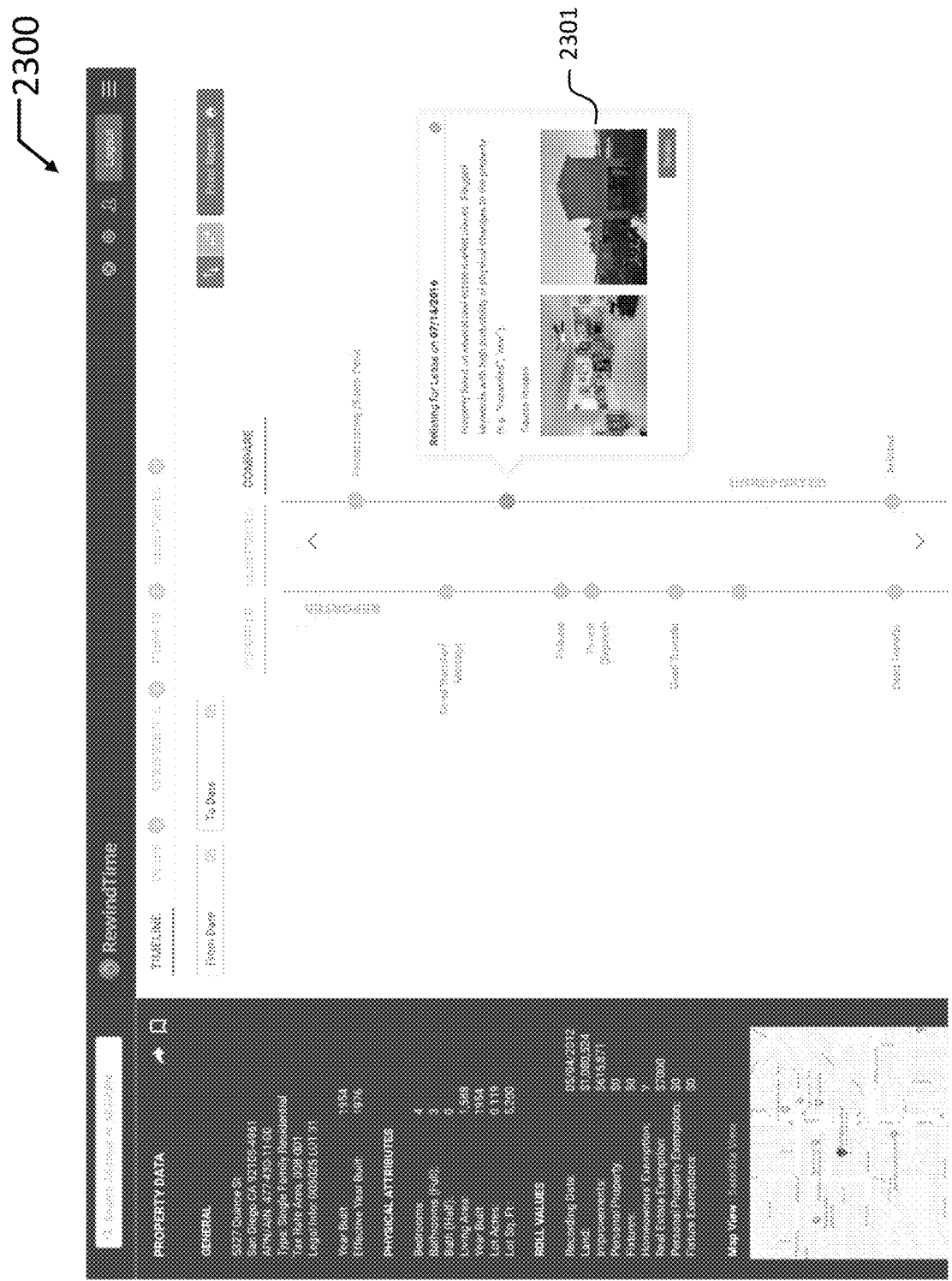
FIG. 23 is a non-limiting example of a graphic user interface; in this case, an interface for viewing images of the property interest.

FIG. 23 is a non-limiting example of a graphic user interface; in this case, an interface for viewing images of the property interest 2300. In some embodiments, unreported items can store the latest images of a property's listing 2301.

Figure 24:
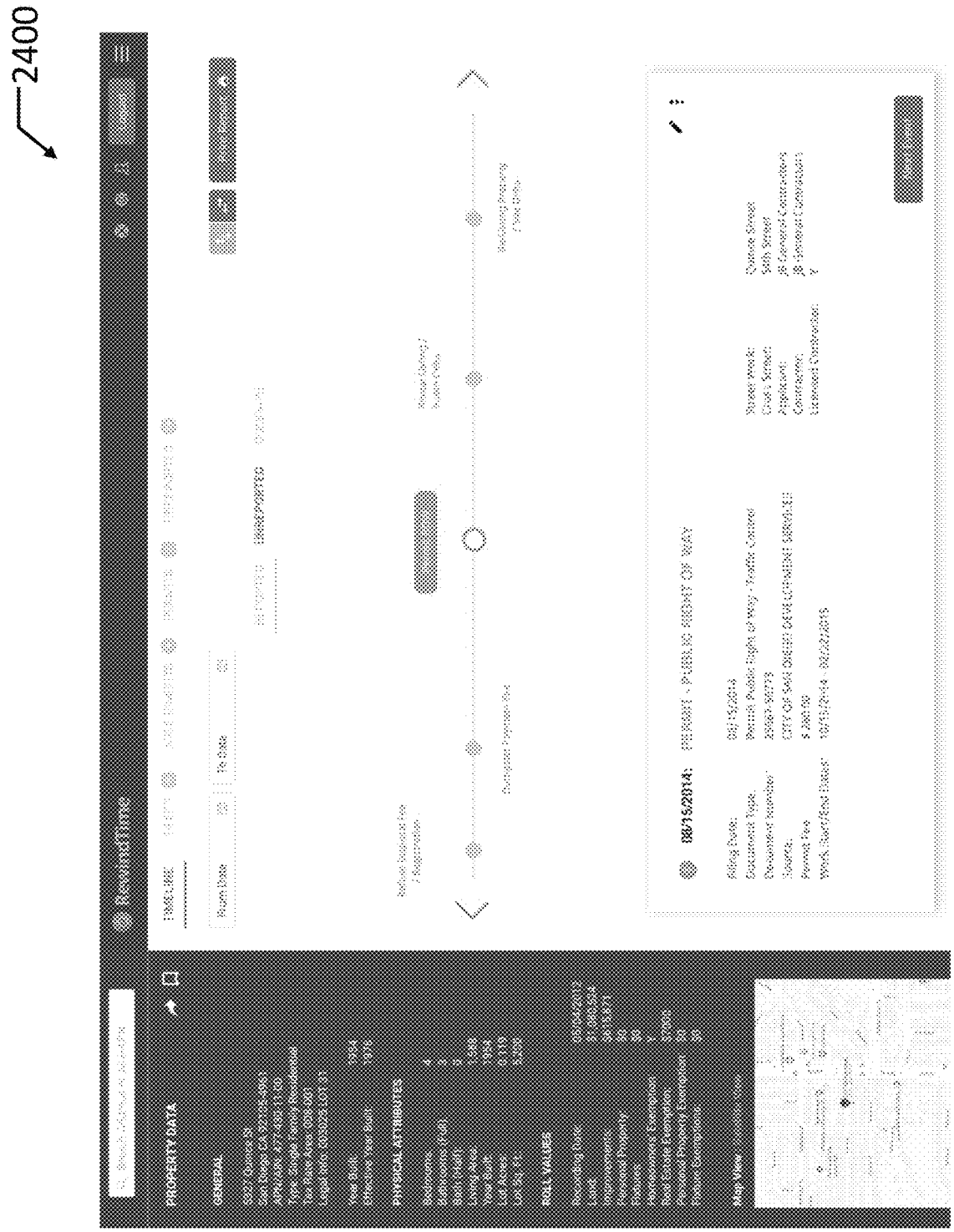
FIG. 24 is a non-limiting example of a graphic user interface; in this case, a module for toggling the timeline view.

FIG. 24 is a non-limiting example of a graphic user interface; in this case, a module for toggling the timeline view 2401. In some embodiments, the timeline can be presented in a horizontal view. In other embodiments, the timeline can be presented in a vertical view.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by 10%, 5%, or 1%, including increments therein.

As used herein, the term "natural language task process" refers to a computer process of configured to efficiently and accurately recognize contextual information from natural language data.

EXAMPLES

The following illustrative examples are representative of embodiments of the software applications, systems, and methods described herein and are not meant to be limiting in any way. While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein can be employed in practicing the disclosure.

Example 1—Detection of an Unpermitted Renovation by a Corporation

In a first example herein, a renovation detection module receives a list of known flipper corporations from the database comprising a list of known "flipper" corporations. When the renovation detection module receives an indication that the square footage of the building on 123 Main Street has increased by 250 square feet from an MLS external data source, and as no permit has been requested for that address, it identifies that 123 Main Street is an initial candidate property with a baseline unpermitted renovation probability of 50%. The renovation probability module determines that 123 Main Street was recently bought by Corporation A and increases the probability that the change in the square footage of 123 Main Street is due to an unpermitted renovation to 55%. Further, because Corporation A is a known "flipper" corporation, the unpermitted renovation probability is again increased to 60%. As the unpermitted renovation probability for 123 Main Street is above the threshold of 55%, the property is further screened.

Since it was determined that 123 Main Street is owned by Corporation A, the renovation probability module further determines that its corporate officers are Ben and Charlie and checks their social media for indicia of renovations. As both Ben and Charlie have posted construction pictures to social media the renovation probability is increased to 65%. Further, because Ben, as a corporate officer of Corporation A, has been previously associated with flipping houses, the renovation probability is additionally increased to 70%. By reviewing data from MLS and other sources the renovation probability module further confirms that renovations have or are occurring at 123 Main Street, and the renovation probability is additionally increased to 70%. With a final renovation probability of 70%, above the T2 threshold of 65%, an indication of a highly probable unpermitted renovation, the renovation probability module sends an instruction to the candidate validation module to inspect 123 Main Street.

City officials visit 123 Main Street to determine that renovations are being made, and issue a warning or fine for the unpermitted renovations. The candidate validation module then sends an indication to the renovation probability module and the renovation detection module to validate the learning and processing parameters therein.

Example 2—Detection of an Unpermitted Renovation by an Owner

In a second example herein, a renovation detection module receives an indication that a social media image with the description "Brand New Carport!" was tagged at 123 Birch Lane, and as no permit has been requested for that address, it identifies that 123 Birch Lane is an initial candidate property with a baseline unpermitted renovation probability of 55%. The renovation probability module determines that 123 Birch Lane was recently bought by Jane and Jim, who have no previous history of house flipping or unpermitted renovations, and maintains the unpermitted renovation probability of 55%. As the unpermitted renovation probability for 123 Birch Lane meets the threshold of 55%, the property is further screened.

Since it was determined that 123 Birch Lane is owned by Jane and Jim, the renovation probability module checks other social media sources for posts by Jane and Jim, determines that both have displayed renovation and/or construction related information and increases the renovation probability to 62.5%. With a renovation probability of 62.5%, an indication of a moderately probable unpermitted renovation, below the T2 threshold of 65%, the renovation probability module then determines that the renovation probability is greater than the T3 probability of 60% and searches for further evidence from social media, MLS, and other sources. As further research of the MLS listing shows that the property has been put up for sale, the unpermitted renovation probability is increased to 67.5% and above the T2 threshold of 65%. The renovation probability module then sends an instruction to the candidate validation module to inspect 123 Birch Lane Street.

City officials visit 123 Birch Lane Street to determine that renovations are being made, and issue a warning or fine for the unpermitted renovations. The candidate validation module then sends an indication to the renovation probability module and the renovation detection module to validate the learning and processing parameters therein.

Example 3—Assignment of Inspectors to Properties

In a third example herein, the machine learning and filtering engine recommends that an inspector be sent to properties at 111 A Street and at 222 B Street. Current renovation indicia shows that 111 A Street and 222 B Street were sold within the last two months and the last two years, respectively, and that the owner of 111 A Street has recently flipped houses. Social media shows that the owner of 111 A Street posted images yesterday of a new refrigerator appliance. Further, as recent street view images of 111 A Street show a mostly complete extension not seen in the original MLS listing, the renovation on that property is estimated to conclude within one month. Social media images by the owners of 222 B Street with bags of concrete and waste bins and recent wood purchases indicate that the renovations at that address will conclude in at least 4 months. Inspector C, who lives closest to 111 A Street, is assigned to inspect that property immediately. Inspector W, who has a free schedule next month, is assigned to inspect 222 B Street within that period of time.

Example 4—Assignment of a Plurality of Inspectors to Properties

In a fourth example herein the city of Flipville has 5 inspectors, and they can typically visit 3 sites per day. 200 active, unpermitted, and uninspected renovations are determined from data mining techniques. The various data sources are further examined to estimate how close that property is to finishing the renovation, wherein a value F corresponding to the estimated days to completion is assigned to each property. The list is then sorted from smallest to largest F, whereby the first property is assigned to the first inspector. The inspector can be selected randomly, or based on where the inspector lives, closer to the property being better, assuming that they go directly to the property at the start of the working day, or other criteria. A formula, such as one maximizing 1/(F+D) is used to select another 4 properties for that inspector to visit that day, whereby grouping the properties geographically allows the inspector to visit more properties per day. The assigned properties are removed from the list and the process is repeated for the remaining inspectors, thus assigning 25 properties to be inspected. This process is repeated each day, with newly discovered properties being added to the list, inspected properties being removed and data from the inspection being incorporated into the learning algorithms, and the list being re-sorted and re-processed.

Example 5—Detecting an Improper Real Estate Transfer Event

In a fifth example herein brothers A, B, and C were each bequeathed a third of the property at 333 D Street, valued at 30 million dollars. The improper transfer detection module determines that 333 D street is a potential candidate once the data ingestion interface receives a real estate transfer indicia related to the bequeathment through a sales trust, the value of the property, and a real estate transfer indicia comprising a sale by brother A of his portion of the real estate. The improper real estate transfer probability calculation module then determines that the initial candidate has a high probability of an improper real estate transfer, as the sale occurred through a sales trust, and as brother A sold his $\frac{1}{3}^{rd}$ share, valued at 10 million dollars, to brother C for only 1 million dollars. An inspection of the highly probable initial candidate finds that the 30 million dollar valuation is accurate, and that as such, an improper real estate transfer by brother A has occurred.

Example 6—Detecting an Improper Real Estate Transfer Event Using Historical Data In a sixth example herein brothers D, E, and F were each bequeathed a third of the property at 444 G Street. The ingestion interfaces receive notice of the bequeathment and the proper taxes, fees, and forms filled out by each brother for their respective share of the property, and store this information in the historical transfer database. One year later brother D sells his $\frac{1}{3}^{rd}$ share to brother F, but because less than 50% of the ownership of the property has changed, this change of ownership is not reported and a re-appraisal is not performed. The sale by brother D is appended to the previously stored data regarding 444 G Street in the historical transfer database. Subsequently brother E also sells his $\frac{1}{3}^{rd}$ share to brother F. Brother D did not report the change in ownership or request a re-appraisal during his sale. Once the data ingestion interfaces detect the sale by brother E of his $\frac{1}{3}^{rd}$ share, the improper transfer detection module recalls the previous sale by brother D of his $\frac{1}{3}^{rd}$ share (i.e., remembers the sequence of transfers), and determines that, as the change in ownership is now greater than 50%, an improper transfer has occurred.

Example 7—Determining when One or More Unpermitted Renovation Events has Taken Place In a seventh example herein 123 B Street is determined to be a candidate of an unpermitted renovation. The set of first data ingestion interfaces determines that as the last government documented assessment of 123 B Street on January 2012 does not include the unpermitted renovation, that the renovation must have occurred since then. The set of second data ingestion interfaces determines the unpermitted renovation timing indicia that a dumpster delivery request was made for two dumpsters to the address of the candidate location in February 2001 and that a manufacturer warrantee is documented as citing a refrigerator installation date in June 2013. The renovation timing estimation module then applies a machine learning algorithm to present a refined renovation time range of between March 2001 and June 2013 based on the detected initial time range and the detected unpermitted renovation timing indicia. An administrative user then employs a set of third data ingestion interfaces which determines that the owner of 123 B Street ordered a carpet installation in April 2002 and granite installation in March of 2013. The renovation timing estimation module then applies a machine learning algorithm to determine that, based on the unpermitted renovation timing indicia from the set third of third data ingestion interfaces two renovations took place from February 2001 and June 2013; a bedroom addition within a further refined renovation time range of March 2001 and April 2002 and a kitchen remodeling within a further refined renovation time range of February of 2013 and June 2013. The owners are then charged the appropriate back taxes for the difference in property value since March 2001.

Example 8—Detecting an Improper Residency Status

In an eighth example herein Bob has a primary residence in Minnesota and a vacation home in California. Upon his retirement, Bob decides to move permanently to a warmer climate, but to keep his Minnesota residence for visiting his family. Bob continues to file interest deductions on his tax returns for his Minnesota property for the amount commensurate with a primary residence. The improper residency detection module that identifies Bob's Minnesota house as an initial candidate based on an improper residency indicia of a significant increase in his California utility bill and a significant decrease in his Minnesota utility bill. The residency probability calculation module then calculates a high probability of an improper residence status. After inspection and confirmation of the change of Bob's primary and vacation residence, the confirmation is feed back to the improper residency probability calculation module to improve its calculation over time.

What is claimed is:

1. A non-transitory computer-readable storage media encoded with a computer program including instructions executable by a processor to create an application to train a neural network for detecting an improper residency tax status for a real estate property, the application performing at least the following:
   a) collecting data from one or more data sources and determining one or more improper residency indicia from the data;
   b) performing distant supervision training on a recurrent neural network with a first machine learning algorithm with a training dataset comprising at least a portion of the improper residency indicia, the first machine learning algorithm comprising one of, a naïve Bayes classification, a random forest, and deep learning wherein the distant supervision training comprises positive-unlabeled learning with the training dataset as the positive class;

c) running the first machine learning algorithm on a plurality of real estate documents to determine a plurality of commonly associated real estate properties for at least a portion of the plurality of real estate documents, wherein at least one of the commonly associated real estate properties comprises a primary residence;

d) training a second machine learning algorithm with regression modeling by constructing an initial model by assigning probability weights to predictor variables wherein relationships between the predictor variables and dependent variables are determined and weighted based on the plurality of commonly associated real estate properties and adjusting the probability weights based on verified data;

e) running the second machine learning algorithm on the plurality of commonly associated real estate properties; and f) determining an improper residency tax status probability of the commonly associated real estate properties.

2. The media of claim 1, wherein the plurality of real estate documents are collected from the one or more data sources based on at least one of an area within a set radial distance from a location, coordinates set by one or more satellites, an area within a set driving distance of a location, a GPS point, or an area defined by at least three GPS points.

3. The media of claim 1, wherein the data source comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, and portable restroom orders.

4. The media of claim 1, wherein the predictor variable comprises a water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change, a frequency of phone calls, and a frequency of credit card purchase.

5. The media of claim 3, wherein the rental listings comprise a home listing, an AirBnB® listing, a VRBO® listing, or any combination thereof.

6. The media of claim 1, wherein the improper residency tax status probability comprises an improper occupancy tax probability.

7. The media of claim 4, wherein the predictor variable comprises a predictor tax variable.

8. The media of claim 1, wherein the verified data is acquired by a public official inspecting the commonly associated real estate properties.

9. The media of claim 1, further comprising creating an ordered list of initial candidates based on improper residency probability.

10. The media of claim 9, further comprising assigning a public inspector to one or more candidates with the highest improper residency probability.

11. The media of claim 10, further updating the residency tax status of the inspected candidate and sending an updated residency tax bill.

12. The media of claim 1, wherein the commonly associated real estate properties further comprise a primary residence associated with an individual and a rental listing associated with the individual.

13. A non-transitory computer-readable storage media encoded with a computer program including instructions executable by a processor to train a neural network for determining an improper residency tax status for a real estate property, the application performing at least the following:

a) collecting a set of data from one or more data sources;

b) applying a data mining task process to the set of data to identify a set of improper residency status indicia within the set of data;

c) creating a first training dataset comprising the collected set of data, the improper residency status indicia, and a set of digital proper residency status indicia;

d) training a first neural network with the first training dataset;

e) creating a second training dataset comprising the first training dataset and one or more proper residency status indicia incorrectly detected as improper residencies after training the first neural network and;

f) training the first neural network with the second training dataset.

14. The media of claim 13, wherein the set of data is collected by a plurality of data source ingestion interfaces.

15. The media of claim 14, wherein the one or more data source comprise city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, and the Internet.

16. A computer-implemented method of training a neural network for detecting an improper residency tax status, the method comprising:

a) collecting data from one or more data sources and determining one or more improper residency indicia from the data;

b) performing distant supervision training on a recurrent neural network with a first machine learning algorithm with a training dataset comprising at least a portion of the improper residency indicia, the first machine learning algorithm comprising one of a naïve Bayes classification, a random forest, and deep learning wherein the distant supervision training comprises positive-unlabeled learning with the training dataset as the positive class;

c) running the first machine learning algorithm on a plurality of real estate documents to determine a plurality of commonly associated real estate properties for at least a portion of the plurality of real estate documents, wherein at least one of the commonly associated real estate properties comprises a primary residence;

d) training a second machine learning algorithm by constructing an initial model by assigning probability weights to predictor variables wherein relationships between the predictor variables and dependent variables are determined and weighted based on the plurality of commonly associated real estate properties and adjusting the probability weights based on verified data; and e) running the second machine learning algorithm on the plurality of commonly associated real estate properties; and f) determining an improper residency tax status probability of the commonly associated real estate properties.

17. The method of claim 16, wherein a collection module collects the plurality of real estate documents from the one or more data sources based on at least one of a street address, a parcel, a street, a lot, a zip code, a county, a state, an area drawn on a map, an area within a set radial distance from a location, coordinates set by one or more satellites, an area within a set driving distance of a location, a GPS point, an area code, or an area defined by at least three GPS points.

18. The method of claim 16, wherein the verified data is acquired by a public official inspecting the commonly associated real estate properties.

19. The method of claim 16, wherein the data source comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, the Internet, or any combination thereof.

20. The method of claim 16, wherein the predictor variable comprises a water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change, a frequency of phone calls, and a frequency of credit card purchase.

21. The method of claim 16, wherein the improper residency tax status probability comprises an improper occupancy tax status, and the predictor variables comprise predictor tax variables.

22. The method of claim 19, wherein the rental listings comprise a home leasing website, AirBnB®, VRBO®, or any combination thereof.

23. The method of claim 16, further comprising creating an ordered list of initial candidates based on improper residency tax status probability.

24. The method of claim 23, further comprising assigning a public inspector to one or more candidates with the highest improper residency tax status probability.

25. The method of claim 24, further updating the residency tax status of the inspected candidate sending an updated residency tax bill.

26. The method of claim 16, wherein the commonly associated real estate properties further comprise a primary residence associated with an individual and a rental listing associated with the individual.

* * * * *